US012018787B2

(12) United States Patent
Ulmer et al.

(10) Patent No.: US 12,018,787 B2
(45) Date of Patent: Jun. 25, 2024

(54) CONNECTOR AND CONNECTION ASSEMBLY

(71) Applicant: Intel Corporation, Santa Clara, CA (US)

(72) Inventors: Alexis Ulmer, Chandler, AZ (US);
Michael June, Chandler, AZ (US);
Peter Davison, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 17/363,046

(22) Filed: Jun. 30, 2021

(65) Prior Publication Data

US 2021/0324989 A1     Oct. 21, 2021

(51) Int. Cl.
| | |
|---|---|
| *F16L 43/02* | (2006.01) |
| *B67D 7/02* | (2010.01) |
| *B67D 7/34* | (2010.01) |
| *F16L 33/00* | (2006.01) |
| *F16L 43/00* | (2006.01) |

(52) U.S. Cl.
CPC ............ *F16L 43/02* (2013.01); *B67D 7/0288* (2013.01); *B67D 7/344* (2013.01)

(58) Field of Classification Search
CPC ....... F16L 43/02; F16L 41/08; F16L 2201/10; F16L 2201/20; B67D 7/0288; B67D 7/344

See application file for complete search history.

(56) References Cited

U.S. PATENT DOCUMENTS

| | | | | |
|---|---|---|---|---|
| 4,595,110 A | * | 6/1986 | Herr | .......................... B26F 1/18 |
| | | | | 215/252 |
| 4,598,833 A | * | 7/1986 | Herr | .................. B65D 41/3423 |
| | | | | 215/258 |

(Continued)

FOREIGN PATENT DOCUMENTS

GB     2385321 A    *    8/2003    ......... B65D 41/3447

OTHER PUBLICATIONS

Entegris. Inc., "Delivering your critical materials with purity, safety, and process efficiency", retrieved on Jun. 30, 2021 on https://www.entegris.com, 18 pages; NOWPak® Bottle System.

(Continued)

*Primary Examiner* — Donnell A Long
(74) *Attorney, Agent, or Firm* — VIERING, JENTSCHURA & PARTNER MBB

(57) ABSTRACT

There may be provided a connector for a liquid container. The connector may include a connector body, and a through-hole for fitting on a neck portion of the liquid container. The connector may further include a restraining arrangement positioned proximal to the through-hole. The restraining arrangement may include a first restraining member and a second restraining member extending towards a central axis of the connector body. The first restraining member may have a distal end that extends further than a distal end of the second restraining member. The distal end of the first restraining member may engage the neck portion of the liquid container at a first position, and the distal end of the second restraining member may engage the neck portion of the liquid container at a second position. The connector may further include a connector-to-key-interface arrangement configured to mate with a corresponding surface of a key member.

17 Claims, 36 Drawing Sheets

(56) References Cited

U.S. PATENT DOCUMENTS

| | | | | | |
|---|---|---|---|---|---|
| 5,465,858 | A | * | 11/1995 | Gargione | B65D 41/3438 |
| | | | | | 215/253 |
| 5,597,021 | A | * | 1/1997 | Crossdale | B67D 7/0288 |
| | | | | | 141/346 |
| 6,015,068 | A | * | 1/2000 | Osgar | B67D 7/344 |
| | | | | | 222/105 |
| 8,302,794 | B2 | * | 11/2012 | Russell | B65D 41/3423 |
| | | | | | 215/258 |
| 2001/0015341 | A1 | * | 8/2001 | Higgins | B29C 45/33 |
| | | | | | 425/441 |

OTHER PUBLICATIONS

Intel, "Power Probe Discovery Meeting with ThinkTank, KM ACT & MMT", dated Jun. 19, 2014, 25 pages.

\* cited by examiner

CONNECTOR AND CONNECTION ASSEMBLY

TECHNICAL FIELD

Various aspects generally relate to a connector and a connection assembly, which includes the connector, for ensuring a correct or desired connection to a liquid container. In particular, various aspects generally relate to a connector that is mountable to a neck portion of the liquid container.

BACKGROUND

Various semiconductor processes require the use of liquid chemicals, such as photoresists, bases, solvents, dopants, pharmaceuticals, biological solutions, organics, inorganics, radioactive chemicals and acids. Often, a specific liquid chemical is required for each process. The liquid chemical may be stored in a liquid container and may be drawn from the liquid container by way of a liquid dispensing apparatus connected to a mouth of the liquid container. Most liquid dispensing apparatuses may be compatible for use with various types of liquid containers (e.g., plastic, glass etc.) to create a fluid connection therebetween. A liquid chemical may be drawn from the liquid container by the liquid dispensing apparatus and delivered to an equipment used in a semiconductor process.

Successful operation of a semiconductor process relies heavily on various human factors. One such human factor is personnel correctly connecting a liquid dispensing apparatus to an intended liquid container containing a specific liquid chemical. In an unfortunate scenario where the liquid dispensing apparatus is erroneously connected to a liquid container containing an incompatible liquid chemical for a given semiconductor process, that process may not only fail, but the erroneous connection between the liquid dispensing apparatus and the liquid container may also result in a hazardous situation for personnel in the immediate vicinity. Moreover, if a liquid chemical that is incompatible for use with a semiconductor equipment is delivered to that equipment, that equipment may become severely damaged.

To ensure a liquid dispensing apparatus may be connected to an intended liquid container containing a correct or compatible liquid chemical for a given process or equipment, it may be useful to have liquid container systems that come with a locking element adapted to interlock with a corresponding liquid dispensing apparatus. Such liquid container systems are generally formed of various disparate components or parts. However, because of the high number of components or parts involved with these systems, the cost, complexity and time required to assemble these systems may be significantly high. Moreover, in these systems, the locking element may not be easily fitted (or, in other words, cannot be installed in a simple manner) to the liquid container, and would generally require aid from machinery. The locking element in these systems may also not be capable of being removed from the liquid container such that the locking element can be recycled or reused. These considerations may also contribute to higher costs and longer time required to make or use these systems.

In addition, some liquid containers are made of polytetrafluoroethylene (PTFE). However, it has been found that PTFE liquid containers may have a potential to contribute to defects, i.e., trace metals may leach out of such PTFE liquid containers to contaminate a semiconductor process.

Therefore, there may be a need to develop alternatives for PTFE containers, and a need to provide a connector for a liquid container (e.g., glass bottles) as well as a connection assembly, which includes the connector, which may be easily restrained or attached to existing liquid containers, and which may be efficient and low-cost to produce or manufacture, to thereby address the above-mentioned issues.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects are described with reference to the following drawings, in which.

DETAILED DESCRIPTION

Figure 1A:
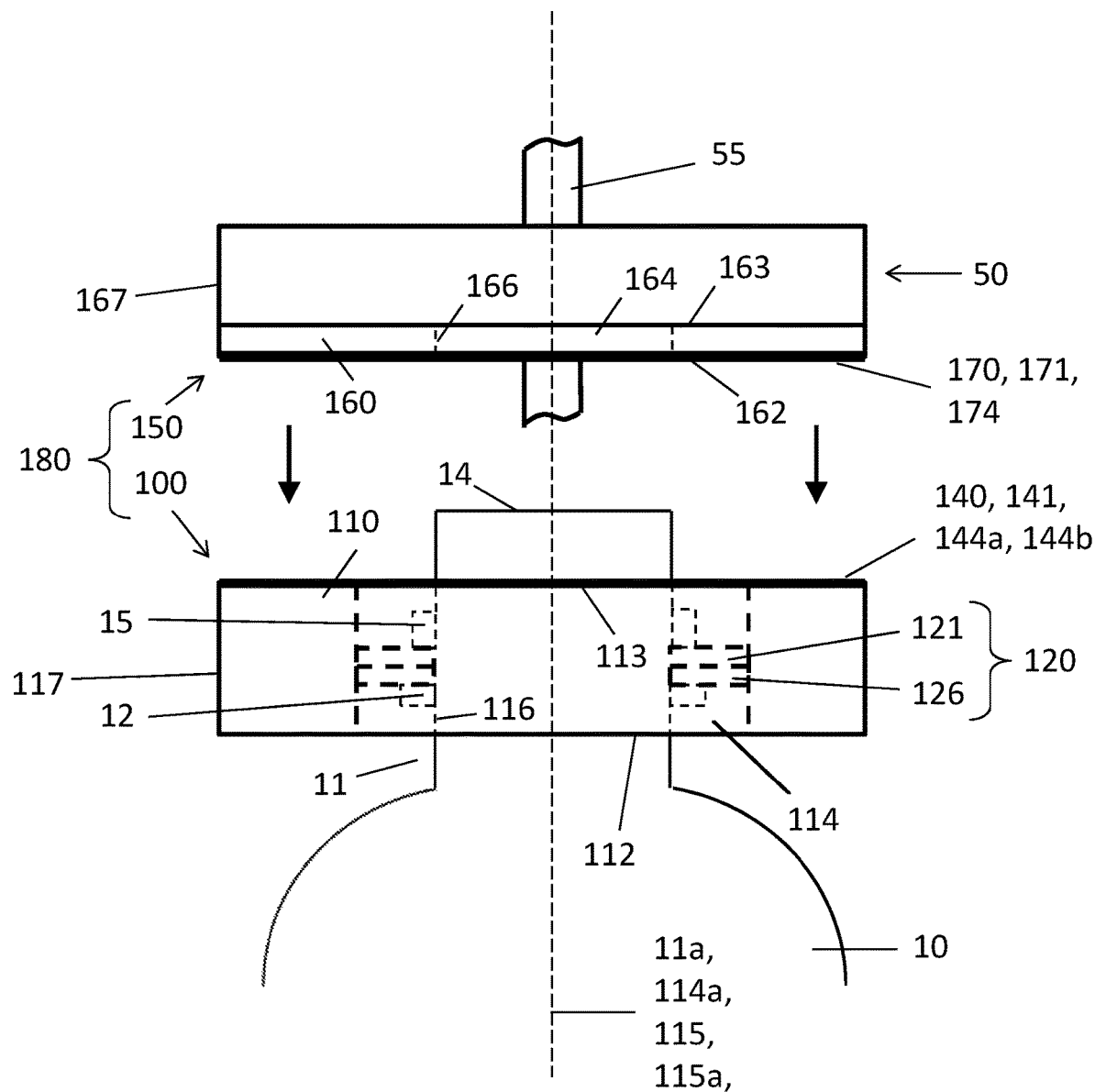
FIG. 1A shows a side schematic view of a connector restrained to a liquid container, and a liquid dispensing assembly with a key member attached to the liquid dispensing assembly, according to an aspect of the present disclosure.

It will be understood that the aspects described below may be combined, for example, a part of one aspect may be combined with a part of another aspect.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various aspects of the present disclosure generally relate to a bottle key (e.g., a connector having a mechanical pattern or code) and a key member (having a corresponding or matching mechanical pattern or code) which may mate or interface with the bottle key, which may together form a connection assembly. The bottle key may be positioned on a neck portion of a liquid container (e.g., a glass bottle), and may be unique (e.g., have a unique or different mechanical pattern for each specific liquid chemical which may be held in each liquid container). Additionally, the bottle key may also include a part/product number that may be easily identifiable to provide information, for example, relating to the liquid chemical in the bottle and/or relating to the bottle key.

Various other aspects also seek to provide a bottle key that may be restrainably attachable to the neck portion of the liquid container while still enabling continued use of the liquid container's capping or sealing means (e.g., a bottle cap, a travel cap, a threaded cap, a snap-fit cap etc.).

In an aspect, the bottle key may be manufactured or produced separately from the liquid container. For example, the bottle key may be made via an injection molding process. The injection molding process may be carried out in a clean room, and the molded bottle key may be double-bagged in the clean room right at the molding machine. No post-mold cleaning may be required. Moreover, mold inserts may be "hot swappable" (e.g., requiring less than 5 minutes) in the press machine for efficient molding or production of bottle keys.

In an aspect, the bottle key may further include a restrainable arrangement, e.g., having a plurality of retainers and backstops, which enables the bottle key to be easily restrained or attached to a neck portion of an existing liquid container (e.g., existing glass bottle). Accordingly, with the bottle key having the restrainable arrangement according to an aspect of the present disclosure, it may be possible to have alternatives for systems such as PTFE liquid containers having a fixed (i.e., unremovable) locking element, and use glass bottles, since the bottle key according to an aspect of the present disclosure may be restrained or attached to glass bottles with ease and in a convenient manner.

Various aspects also seek to avoid the use of threaded fasteners between a liquid container and a locking element, by replacing such systems with the bottle key having the present restrainable arrangement. By shifting away from threaded fasteners, existing capping or sealing means (e.g., bottle cap, travel cap, threaded cap, snap-fit cap etc.) of a liquid container may be used or employed simultaneously with the bottle key restrained or attached to the liquid container. Thus, if the capping or sealing means are fitted with a handle, the liquid container may be easily lifted even with the bottle key restrained to the liquid container.

Furthermore, with the present restrainable arrangement according to an aspect of the present disclosure, the bottle key may be configured to be easy to attach or mount or restrained to the neck portion of the liquid container, while being more difficult to separate from the liquid container.

The cost and speed of producing the bottle key, according to an aspect of the present disclosure, and installing the bottle key to a liquid container may be improved, since only a single process (e.g., an injection molding process) may be required to manufacture the bottle key. Furthermore, a bottle supplier may only be required to assemble or put together two to three components (i.e., the bottle key, the liquid container and/or a capping means). In this respect, the bottle supplier may utilize machinery (e.g., a capping machine) to first mount the bottle key to the neck portion of the liquid container, followed by covering a mouth of the liquid container with the capping or sealing means over the bottle key.

In an aspect, a key member may be attached or fixed to a portion (e.g., a base) of a liquid dispensing assembly, which may be typically provided by a supplier, to form a "keyed stinger". For example, a stinger plate of an existing liquid dispensing assembly may be removed and replaced with the key member to form the keyed stinger, according to an aspect of the present disclosure. Accordingly, the keyed stinger may only be connected to and form a seal with a liquid container which has the bottle key having a mechanical code that mateably matches the mechanical code of the key member.

If mechanical codes between the bottle key and the key member do not match, a proper seal cannot be made between the bottle key and the key member, and pressure (e.g., using nitrogen) cannot be created in an internal volume of the liquid container to dispense a liquid chemical from the liquid container. The bottle key and key member according to an aspect of the present disclosure, therefore, ensure the safety of personnel (e.g., technicians) in-charge of changing chemistries (e.g., liquid chemicals) for any given process (e.g., semiconductor process), and may provide a guard-band protecting any given process (e.g., lithography process) which requires liquid chemicals to be dispensed from liquid containers.

Figure 1B:
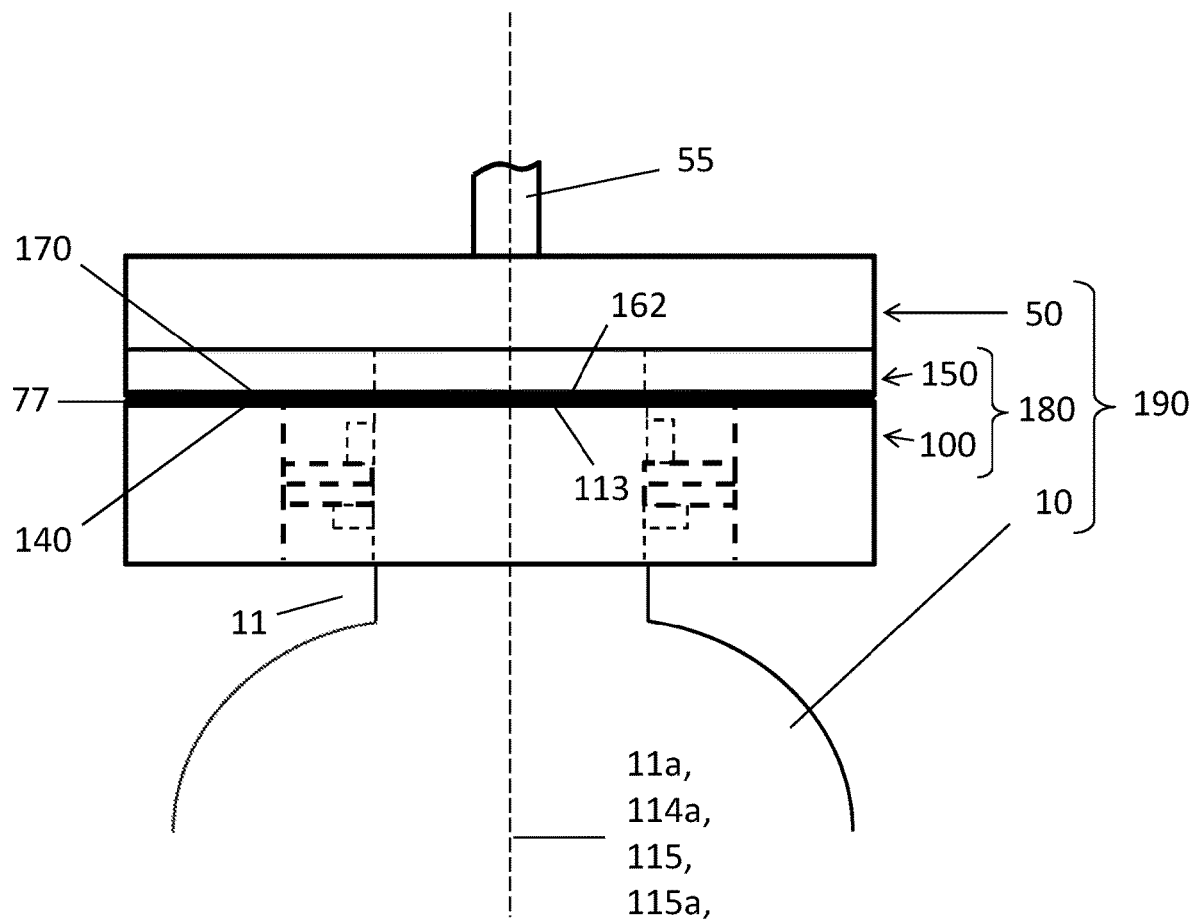
FIG. 1B shows a side schematic view of FIG. 1A, with the connector mated with the key member, according to an aspect of the present disclosure.

FIG. 1A shows a side schematic view of a connector 100 restrained to a liquid container 10, and a liquid dispensing assembly 50 with a key member 150 attached to the liquid dispensing assembly 50, according to an aspect of the present disclosure; and FIG. 1B shows a side schematic view of FIG. 1A, with the connector 100 mated with the key member 150, according to an aspect of the present disclosure.

According to an aspect of the present disclosure, there may be provided the connector 100 which may be restrainably attachable or couplable or mountable or fitted to the liquid container 10. The liquid container 10 may be, for example, a glass bottle for containing a liquid chemical. Particularly, the connector 100 may be restrainably attachable or couplable or mountable or fitted to a neck portion 11 of the liquid container 10, for permitting or so as to permit connection of the liquid container 10 to an intended (e.g., predetermined) liquid dispensing assembly 50.

In another aspect, a key member 150 having a key-to-connector-interface arrangement 170, which may be configured to interface or mate or cooperate with a mechanical pattern or code on a surface of the connector 100, may be fixed to a base of the liquid dispensing assembly 50, to enable proper connection between the liquid dispensing assembly 50 and the liquid container 10. In an aspect, the key member 150 may be included in the connector 100.

The neck portion 11 of the liquid container 10 may include (i) an upper fastening element 15 (e.g., external thread, collar, neck ring etc.) and (ii) a lower fastening element 12 (e.g., external thread, collar, neck ring, transfer bead etc.), disposed on an outer surface of the neck portion 11.

According to the present disclosure, the upper fastening element 15 of the liquid container 10 may be, but is not limited to, an external thread extending along an outer surface of the neck portion 11 of the liquid container 10. The lower fastening element 12 may be, but is not limited to, a neck ring surrounding the outer surface of the neck portion 11 and disposed below the upper fastening element 15, with a space (or gap) between the upper fastening element 15 and the lower fastening element 12. An outer diameter of the upper fastening element 15 may be substantially equal to or may be narrower (or smaller) than an outer diameter of the lower fastening element 12.

With reference to FIG. 1A, the connector 100 may include a connector body 110. In an aspect, the connector body 110 may be or may include a property of being rigid (in other words, inflexible, or unable to bend or be forced out of shape, e.g., by human intervention/force applied by a human). For example, the connector body 110 may be composed of or may include, but is not limited to, a plastic material (e.g., polypropylene (PP), Polybutylene Terephthalate (PBT), Polyetherimide (PEI), Polyether ether ketone (PEEK), Perfluoroalkoxy (PFA) etc.). As shown, the connector body 110 may include a first axial surface 112 (e.g., base, or downward-facing surface), and a second axial surface 113 (e.g., deck, or upward-facing surface) opposite the first axial surface 112. In an aspect, the connector body 110 may further define a through-hole 114 extending between (or from) the first axial surface 112 and (or to) the second axial surface 113 of the connector body 110. The through-hole 114 of the connector body 110 may be fitted on or over the neck portion 11 of the liquid container 10 in a manner such that the connector body 110 surrounds the neck portion 11. In other words, the connector body 110 may be in sliding engagement with the neck portion 11, with the neck portion 11 within the through-hole 114. Accordingly, the connector body 110 may include an inner surface or inner side wall 116 (e.g., defining the through-hole 114) and an outer surface or outward-facing side wall 117 opposite the inner surface 116.

In an aspect, each of the inner surface or wall 116 and the outer surface or wall 117 of the connector body 110 may include a respective a shape (i.e., a cross-sectional profile across a lateral/horizontal plane of the connector body 110, perpendicular with respect to a central axis 115 of the connector body 110) which may include, but is not limited to, a circle or a circular shape. For example, in an aspect, the connector body 110 may have or may include a disc shape, a doughnut shape, an annular shape, etc.

In another aspect, each of the inner surface 116 and the outer surface 117 of the connector body 110 may include a variety of shapes which may include, but is not limited to a square, a polygon, etc.

In an aspect, at least the second axial surface 113 (e.g., upward-facing surface) of the connector body 110 may be or may include a flushed or level surface for forming a seal with another flushed or level or flat surface (e.g., a flushed or level first axial surface 162 of a key-member body 160 of the key member 150, described later below). In other words, at least the second axial surface 113 of the connector body 110 may be or may include a substantially flat or planar surface, without (in other words, free from) any raised element, protrusion etc. and without any curvature or curved (e.g., convex) portion. Further, the first axial surface 112 (e.g., downward-facing surface) of the connector body 110 may be or may include another flushed or level surface. Each flushed or level surface of the first and/or the second axial surface(s) 112 and/or 113 of the connector body 110 may be demarcated by the outer surface or wall 117 of the connector body 110.

In an aspect, the first and the second axial surfaces 112 and 113 (e.g., downward-facing and upward-facing surfaces) of the connector body 110 may be parallel with each other.

In an aspect, the connector body 110 may have a uniform thickness between the first and the second axial surfaces 112 and 113, measured along a direction perpendicular to the first and the second axial surfaces 112 and 113.

In an aspect, the connector body 110 may have a longitudinal plane 115a that is parallel with and that intersects the central axis 115 of the connector body 100. In an aspect, the longitudinal plane 115a may additionally intersect a hole axis 114a of the through-hole 114. In an aspect, the connector body 110 may be symmetrical about the longitudinal plane 115a.

In an aspect, the connector 100 may further include a restraining arrangement 120 extending towards the central axis 115 of the connector body 110. The restraining arrangement 120 may be configured to restrain the connector body 110 to the upper fastening element 15 and/or to the lower fastening element 12 on the neck portion 11 of the liquid container 10. For example, with the connector body 110 surrounding the neck portion 11 of the liquid bottle 10, the restraining arrangement 120 may be either (i) disposed between the upper fastening element 15 and the lower fastening element 12 on the neck portion 11 (see, for example, FIG. 1A), or (ii) fitted over only the lower fastening element 12 on the neck portion 11 of the liquid container 10 (see, for example, FIG. 3F), to restrain the connector body 110 to the neck portion 11 of the liquid container 10. In an aspect, the restraining arrangement 120 may inhibit (or prevent) the connector body 110 from sliding longitudinally (e.g., vertically) on the neck portion 11. Accordingly, the restraining arrangement 120 may be configured to hold or restrain the connector 100 (i.e., to either both the upper fastening element 15 and the lower fastening element 12, or to only the lower fastening element 12) at a fixed location on the neck portion 11. In an aspect, the connector 100 may be free to rotate about a longitudinal axis 11a of the neck portion 11, while the connector 100 is restrained to the neck portion 11 at the fixed location on the neck portion 11.

In an aspect, the restraining arrangement 120 may be positioned proximal to the through-hole 114.

In an aspect, the restraining arrangement 120 may extend away from the inner surface or wall 116 of the connector body 110. As an example, in an aspect, with the restraining arrangement 120 on the inner surface or wall 116 of the connector body 110, the inner surface or wall 116 may be free of a threaded fastener (e.g. internal thread(s)) on the inner surface or wall 116 of the connector body 110.

In an aspect, the restraining arrangement 120 may include a first restraining member 121 and a second restraining member 126. Each of the first restraining member 121 and the second restraining member 126 may extend from the inner surface or wall 116 of the connector body 110 towards the central axis 115 of the connector body 110.

In an aspect, the first restraining member 121 may be longer than the second restraining member 126. In particular, a length of the first restraining member 121 may be longer than a length of the second restraining member 126, when measured, respectively, from the inner surface or wall 116 (at a point of intersection between the first/second restraining member 121/126 and the inner surface 116 of the connector body 110) to a free end (e.g., distal free end or tip) of the first/second restraining member 121/126. Accordingly, in an aspect, the first restraining member 121 may have a distal end that extends further than a distal end of the second restraining member 126 (i.e., from the inner surface or wall 116).

Figure 2A:
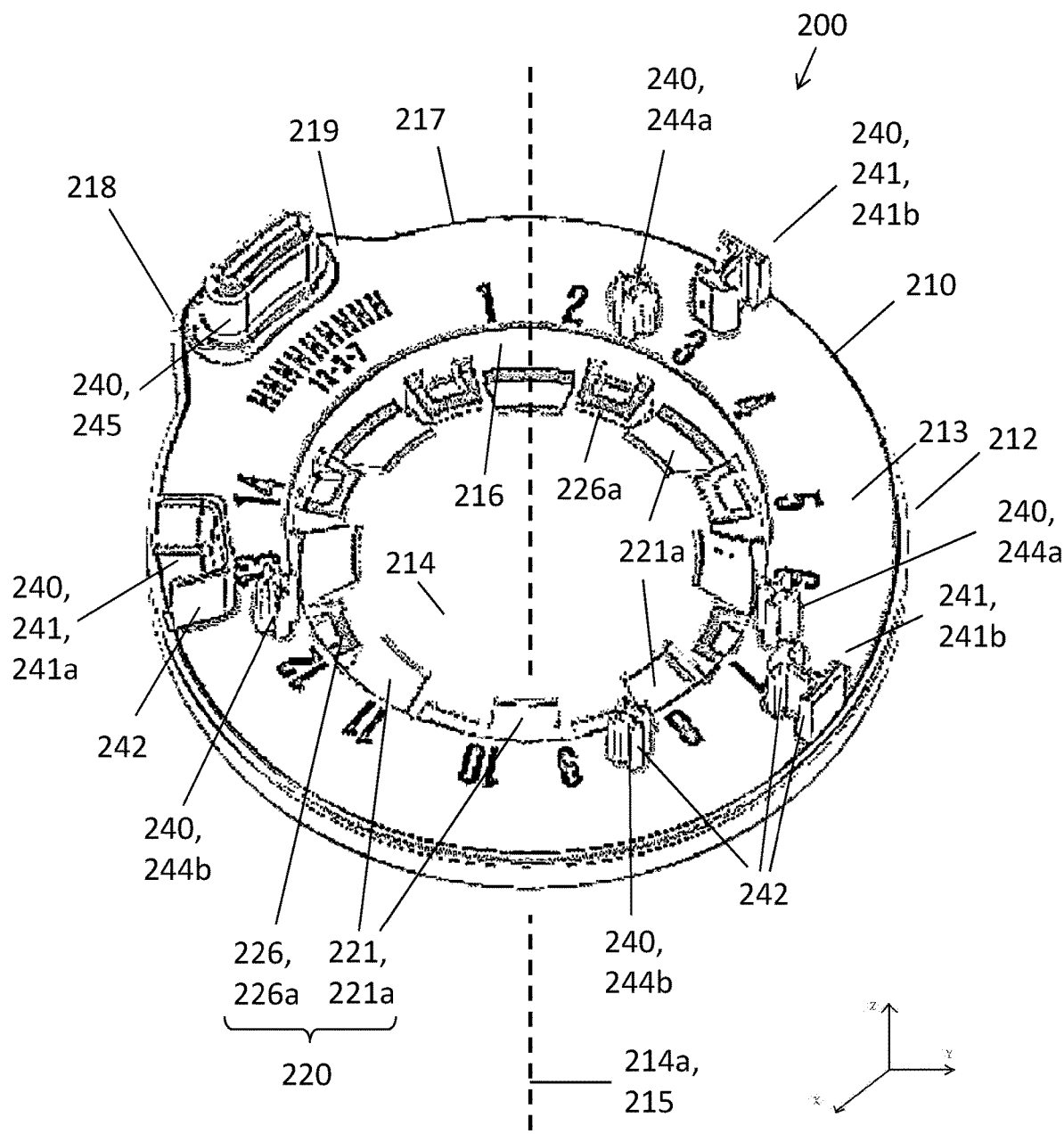
FIG. 2A shows a perspective view of a connector, according to an aspect of the present disclosure.

In an aspect, the first restraining member 121 may be in a form of a plurality of elongated structures which may include, but is not limited to, a plurality of teeth-like structures (as described in FIG. 2A).

According to the scope of the present disclosure, the plurality of elongated structures of the first restraining member 121 may, additionally or alternatively, include a plurality of rod-like or shaft-like structures (not shown).

In an aspect, the first restraining member 121 may engage or abut against the upper fastening element 15 at a free end or free end portion of the first restraining member 121. For example, in an aspect, the first restraining member 121 may abut or engage or contact or push against a side or a surface (e.g., underneath/bottom/downward-facing side or surface) of the upper fastening element 15 on the neck portion 11 of the liquid container 10. Accordingly, a free end or free end portion of the first restraining member 121 may be configured to engage the neck portion 11 of the liquid container 10 at a first position, and may be capable of restraining or inhibiting the connector body 110 from sliding longitudinally on the neck portion 11 towards the mouth 14 of the liquid container 10 (in other words, in an upward direction towards the mouth 14).

In an aspect, a direct distance between two (or a pair of) directly and/or immediately opposing free ends (or tips) of the first restraining member 121 may be narrower (or smaller) than an outer diameter of the upper fastening element 15 of the liquid container 10. In an aspect, a length of each elongated structure of the plurality of elongated structures of the first restraining member 121 (i.e., measured from the inner surface 116 of the connector body 110 to a free end or tip of the elongated structure) may be shorter (or smaller) than a radius of the through-hole 114 (i.e., measured from the hole axis 114a of the through-hole 114).

Figure 2B:
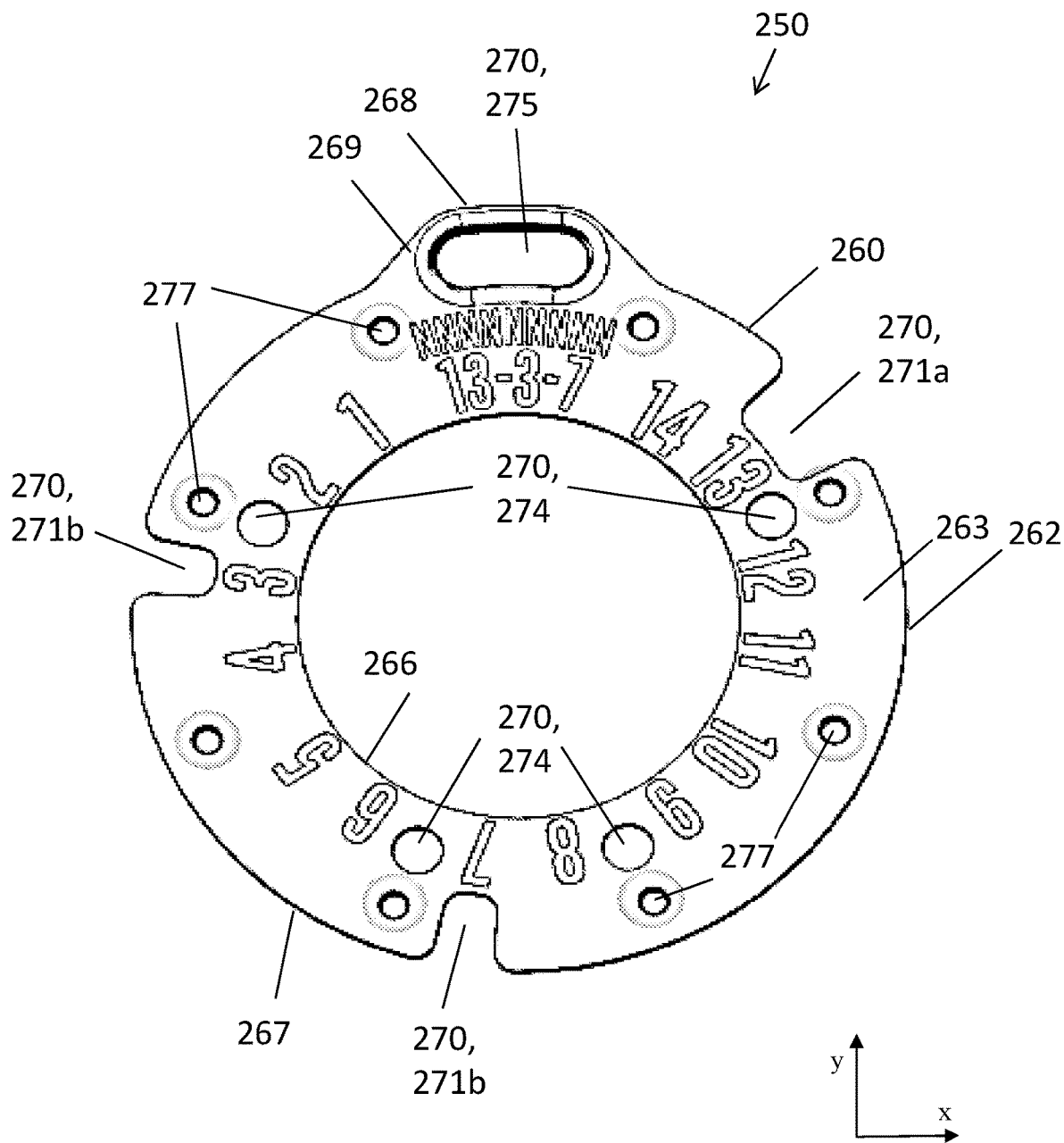
FIG. 2B shows a top view of a key member, according to an aspect of the present disclosure.
Figure 2C:
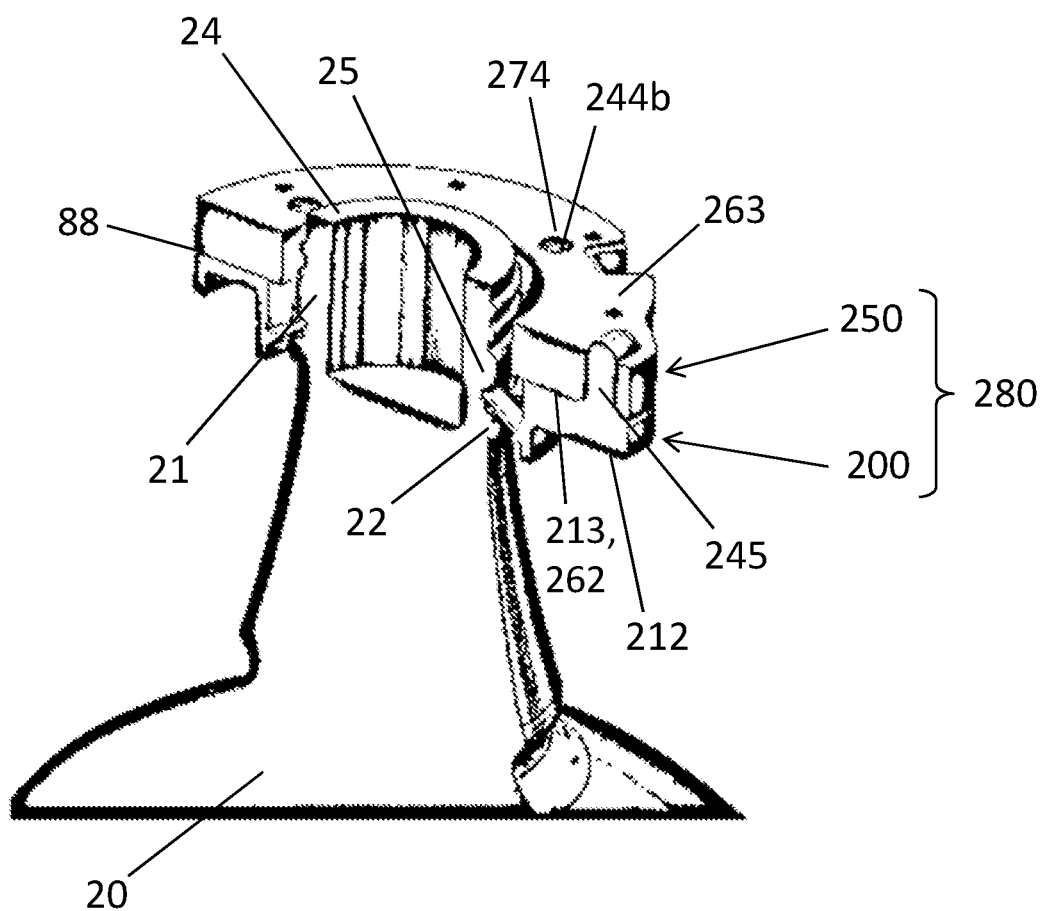
FIG. 2C shows a cross-sectional perspective view of the connector of FIG. 2A restrained to a neck portion of a liquid container, with the key member of FIG. 2B mated with the connector of FIG. 2A, according to an aspect of the present disclosure.
Figure 2D:
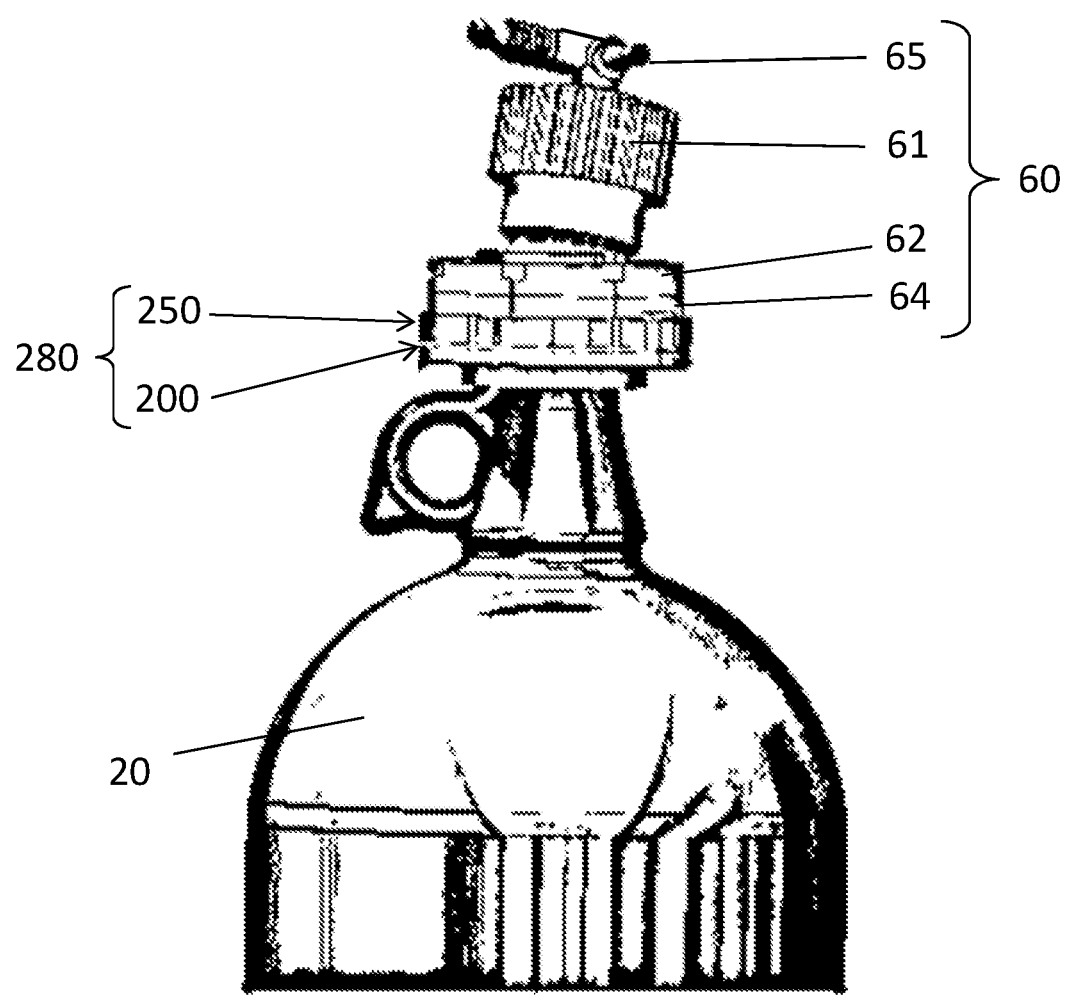
FIG. 2D shows a side view of a liquid dispensing assembly with the key member and the connector of FIG. 2C, according to an aspect of the present disclosure.
Figure 2E:
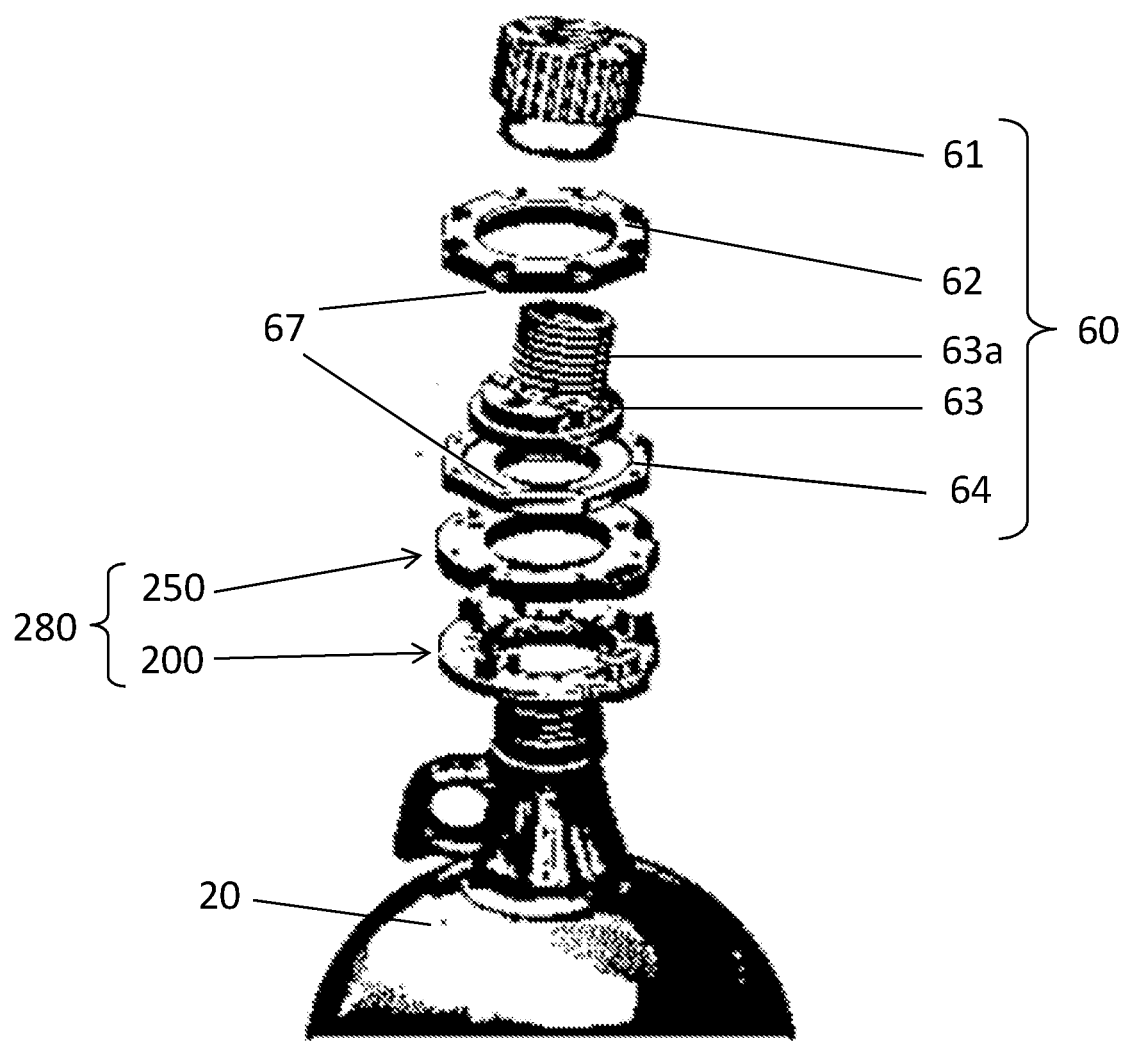
FIG. 2E shows a partial exploded perspective view of the liquid dispensing assembly of FIG. 2D, without a liquid dispensing probe, according to an aspect of the present disclosure.
Figure 2F:
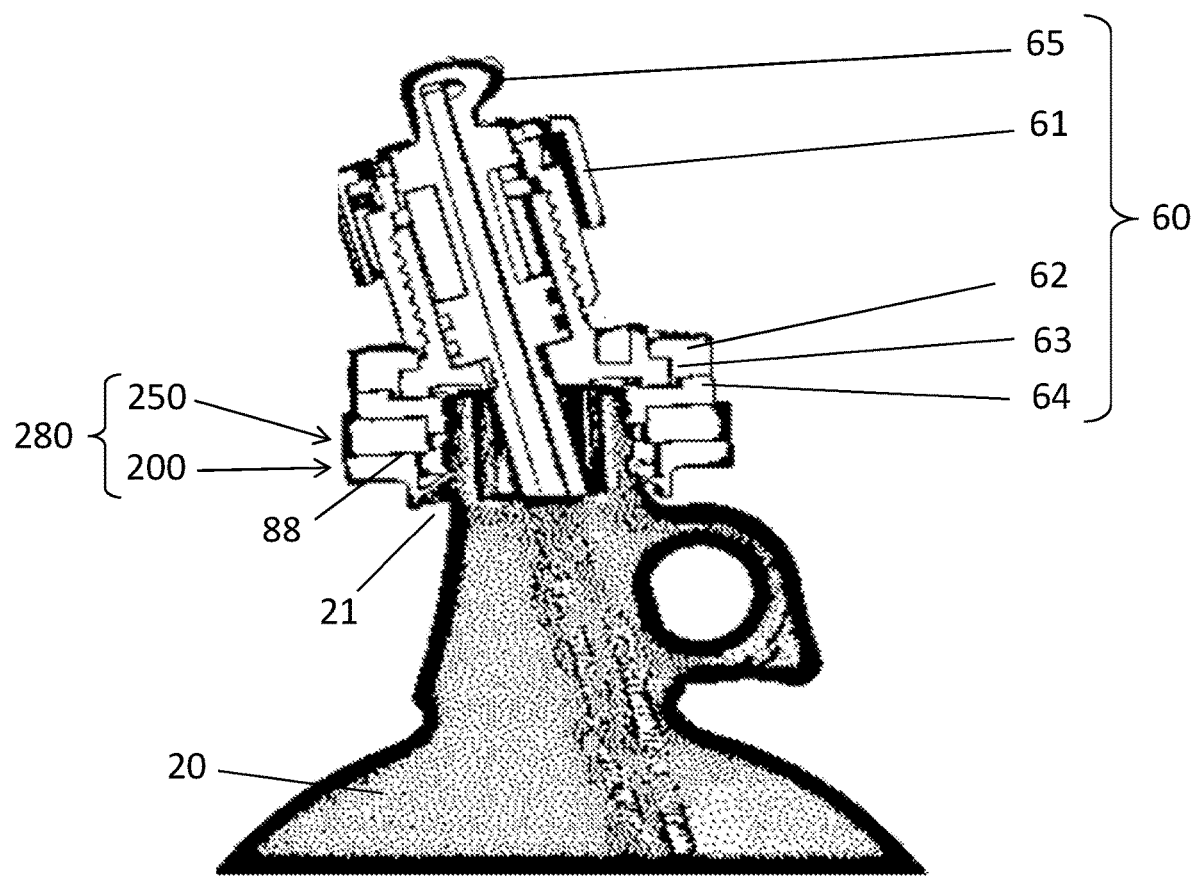
FIG. 2F shows a cross-sectional side view of FIG. 2D, according to an aspect of the present disclosure.
Figure 2G:
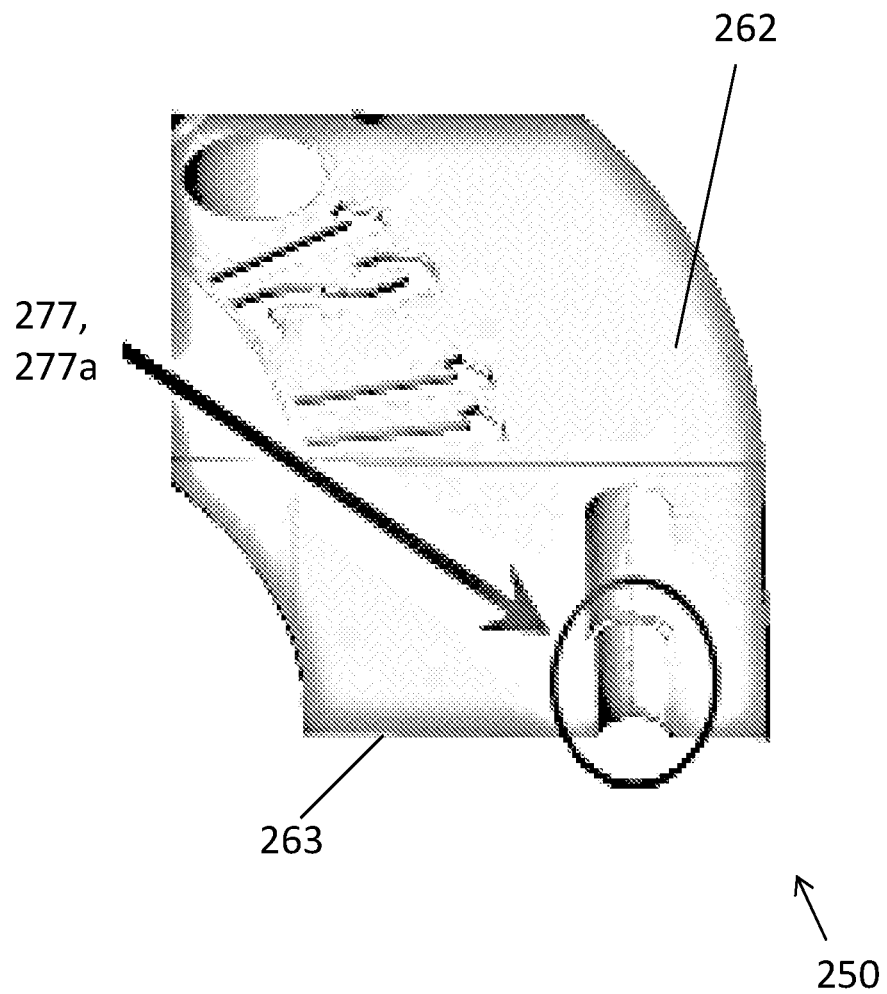
FIG. 2G shows a close-up view of a fastener-receiving through-hole of the key member of FIG. 2B, according to an aspect of the present disclosure.
Figure 2H:
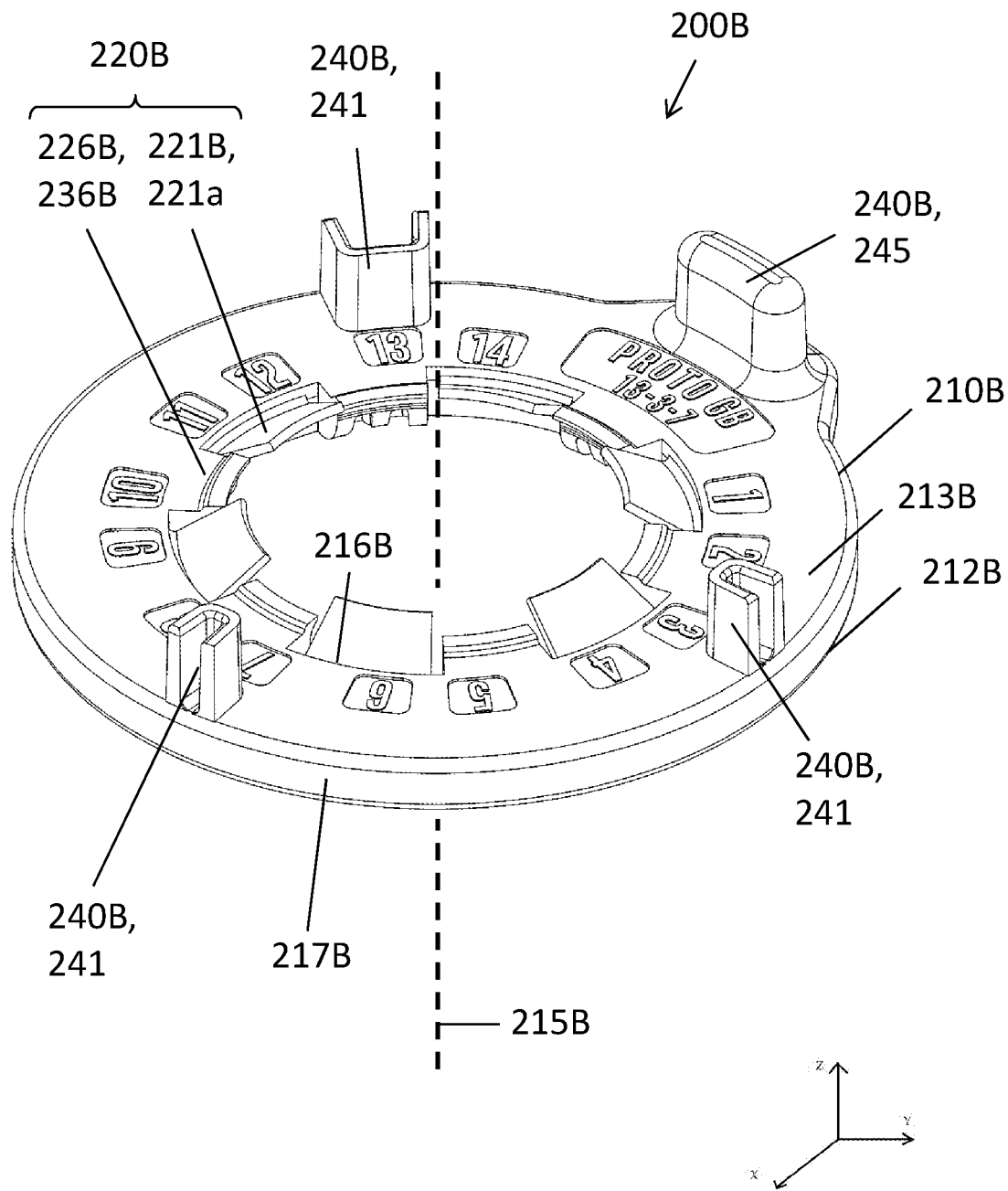
FIG. 2H shows a perspective view of a connector, without any secondary guide posts, and having a second restraining member which includes a plurality of overhanging catch members, according to an aspect of the present disclosure.
Figure 2I:
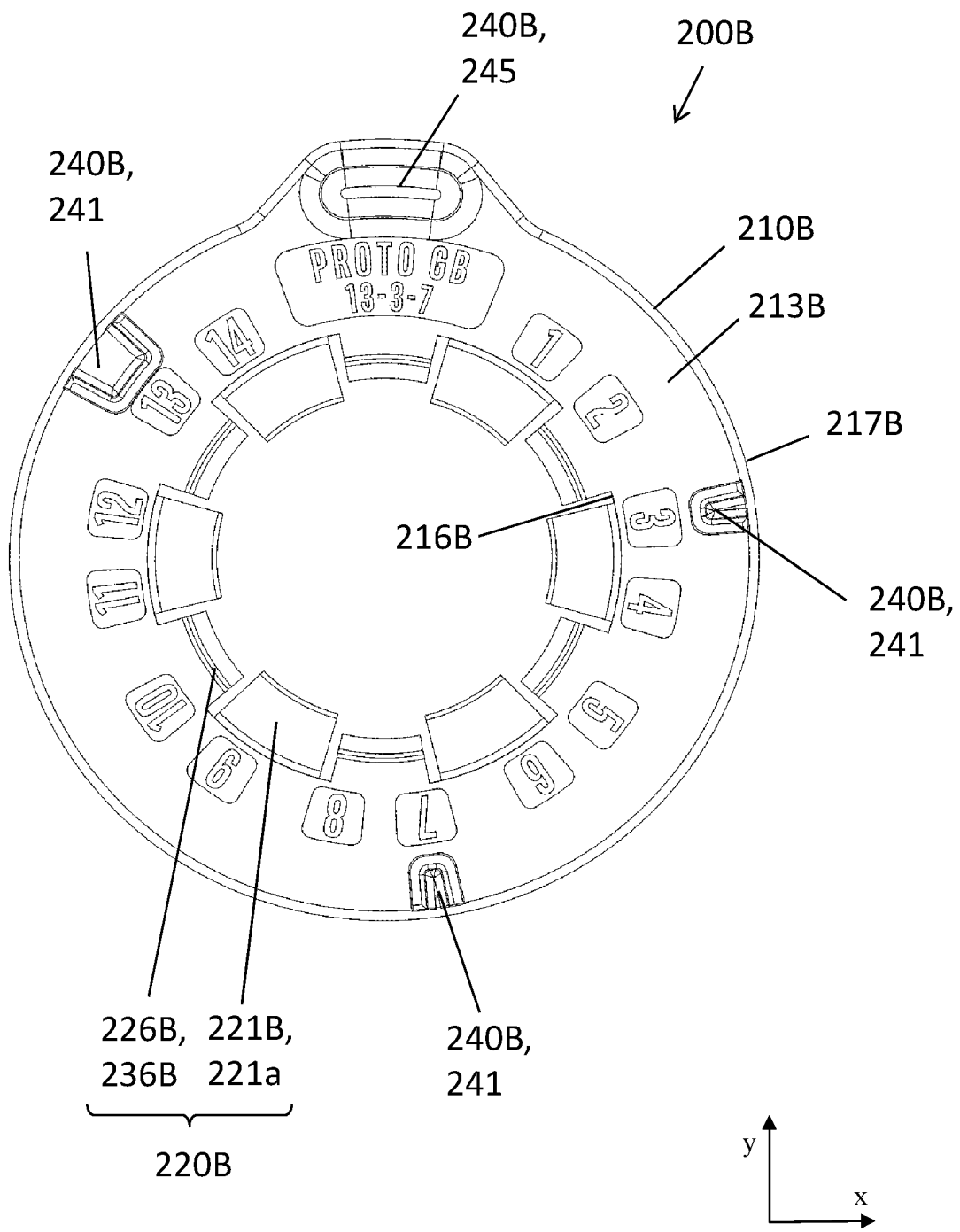
FIG. 2I shows a top view of the connector of FIG. 2H, according to an aspect of the present disclosure.
Figure 2J:
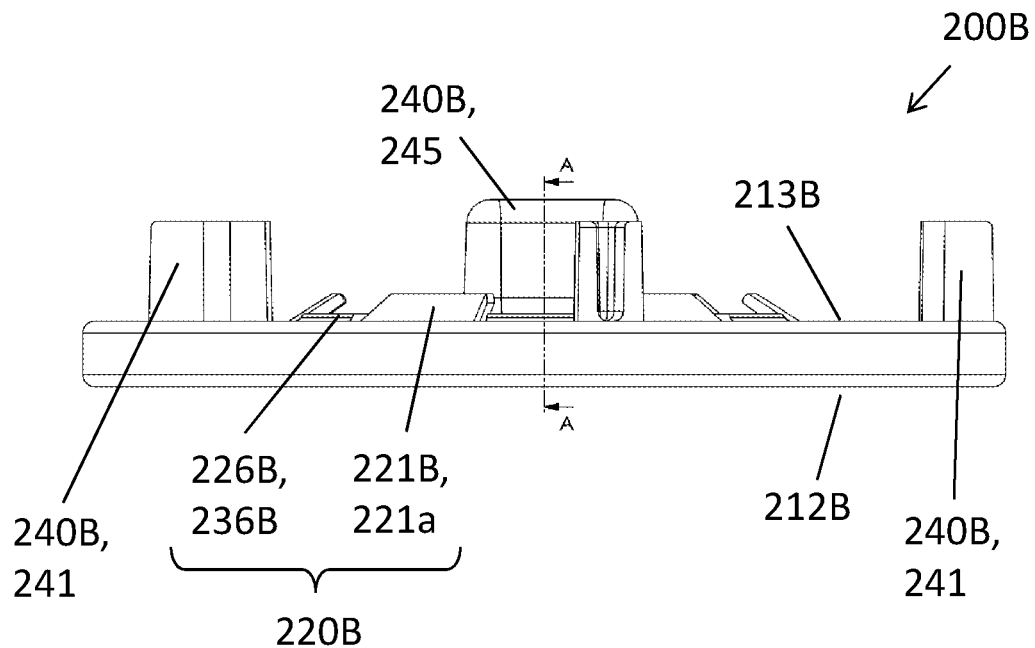
FIG. 2J shows a side view of the connector of FIG. 2H, according to an aspect of the present disclosure.
Figure 2K:
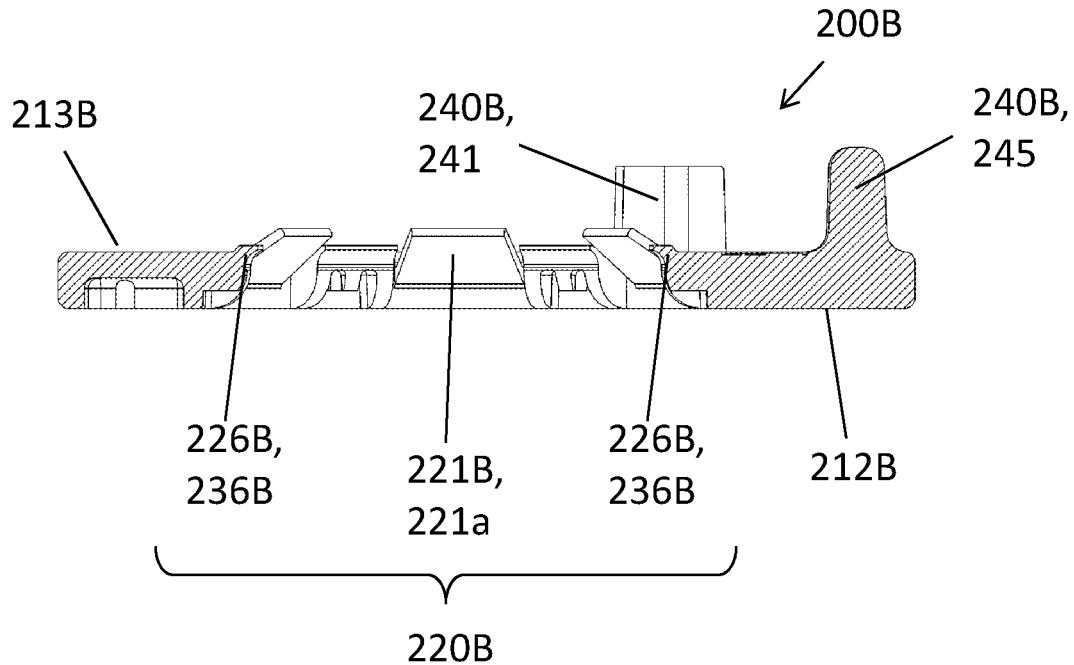
FIG. 2K shows a cross-sectional side view of the connector of FIG. 2J taken along A-A, according to an aspect of the present disclosure.
Figure 3A:
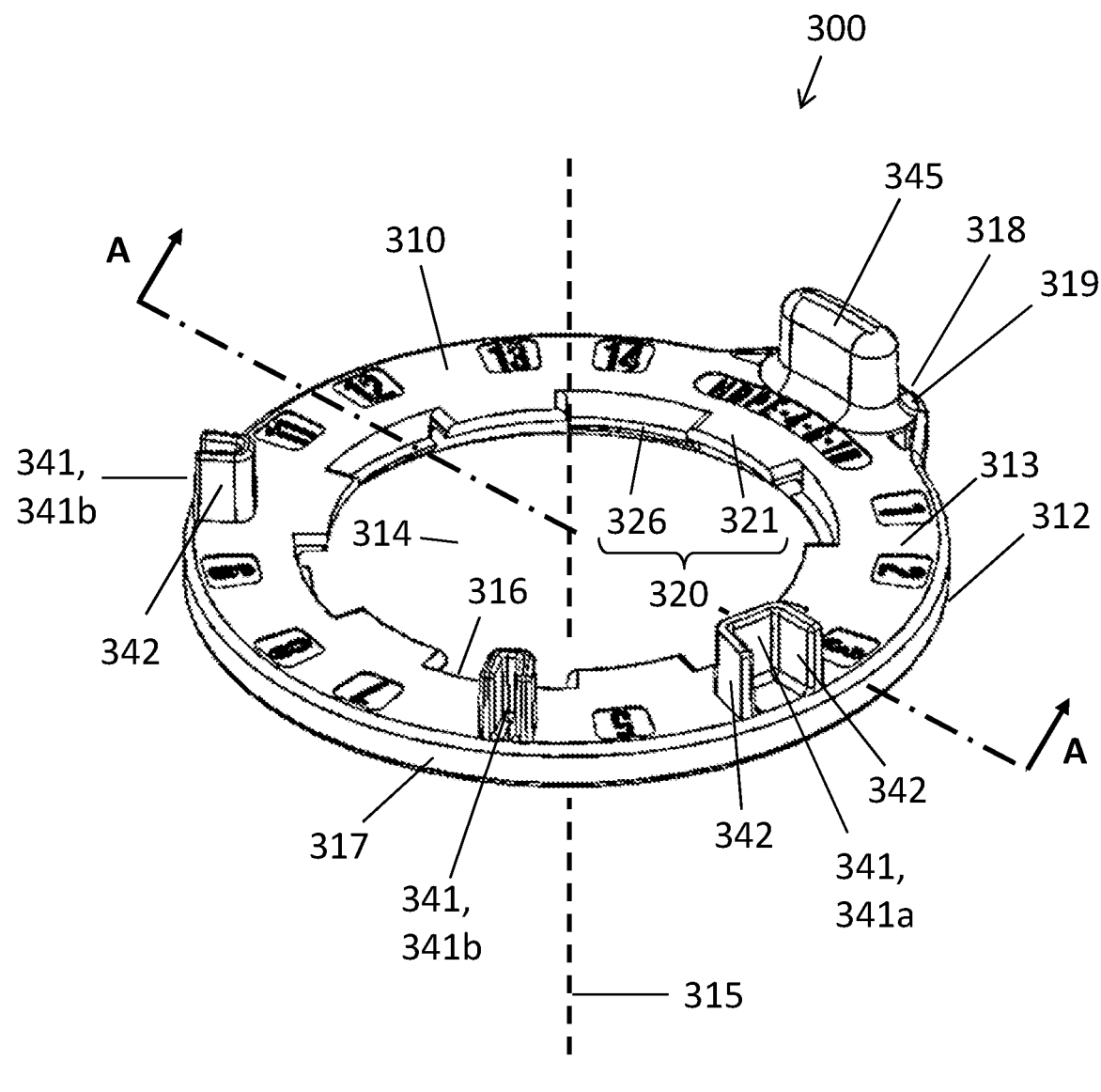
FIG. 3A shows a perspective view of a connector, without any secondary guide posts, and having a first and a second restraining members for sandwiching a lower fastening element therebetween, according to an aspect of the present disclosure.
Figure 3B:
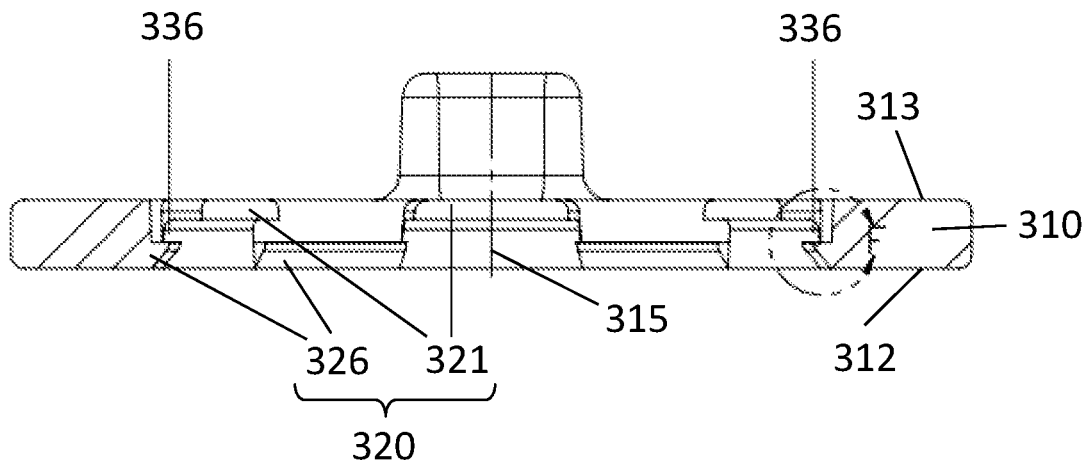
FIG. 3B shows a cross-sectional view of the connector of FIG. 3A taken along A-A, according to an aspect of the present disclosure.
Figure 3C:
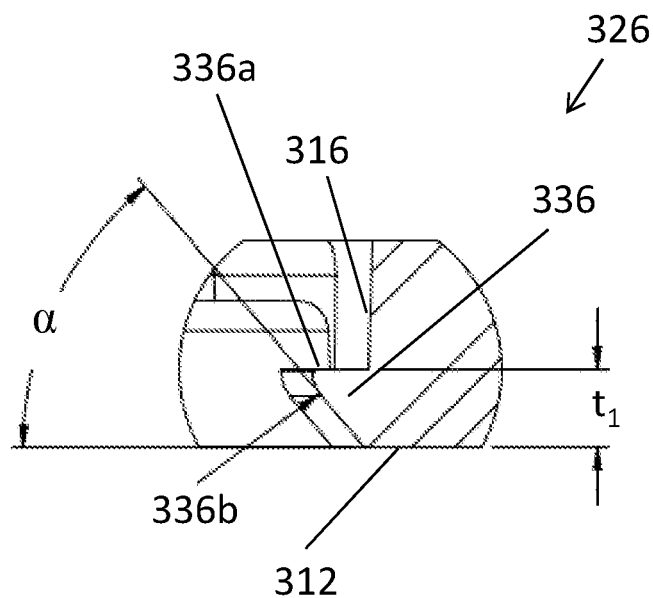
FIG. 3C shows a close-up view of a single foot catch member of a second restraining member of the connector of FIG. 3B, according to an aspect of the present disclosure.

In an aspect, the second restraining member 126 may be in a form of at least one support structure, which may include, but is not limited to, at least one support member (as described in FIG. 2A) and/or at least one catch member (as described in FIG. 2K and FIG. 3C).

According to the scope of the present disclosure, the at least one support structure of the second restraining member 126 may, additionally or alternatively, include a plurality of rod-like or shaft-like structures (not shown), or a unitary support structure (not shown) including, but is not limited to, a unitary ring-like structure, for example, a unitary annular ring having (i) an outer diameter of the annular ring that is equal to an inner diameter of the through-hole 114 (or diameter of the inner surface or wall 116) and (ii) an inner diameter of the annular ring that is narrower (or smaller) than an outer diameter of the lower fastening element 12.

In an aspect, the second restraining member 126 may engage or contact or rest on/above/upon the lower fastening element 12 (e.g., on an upward-facing side or surface of the lower fastening element 12) at a free end or free end portion of the second restraining member 126. Accordingly, a free end or free end portion of the second restraining member 126 may be configured to engage the neck portion 11 of the liquid container 10 at a second position, and may be capable of restraining or inhibiting the connector body 110 from sliding longitudinally on the neck portion 11, in a direction away from the mouth 14 of the liquid container 10 (in other words, in a downward direction towards a base of the liquid container 10).

In an aspect, a direct distance between two (or a pair of) directly and/or immediately opposing points on the second restraining member 126 may be narrower (or smaller) than an outer diameter of the lower fastening element 12 of the liquid container 10. In an aspect, a length of the at least one support structure of the second restraining member 126 (i.e., measured from the inner surface or wall 116 of the connector body 110 to a free end or tip of the at least one support structure) may be shorter (or smaller) than a radius of the through-hole 114.

In an aspect, the first restraining member 121 of the restraining arrangement 120 may be arranged at a first distance away from the second axial surface 113 (e.g., upward-facing surface) of the connector body 110, and the second restraining member 126 of the restraining arrangement 120 may be arranged at a second distance away from the second axial surface 113 of the connector body 110.

In other words, in an aspect, each elongated structure of the first restraining member 121 may be positioned at the (same) first distance away from the second axial surface 113 of the connector body 110, and each support structure of the second restraining member 126 may be positioned at the (same) second distance away from the second axial surface 113 of the connector body 110.

In an aspect, the first distance may be substantially equal to the second distance. In other words, the first restraining member 121 and the second restraining member 126 may be arranged along the inner surface 116 in a side-by-side manner, and both the first and the second restraining members 121 and 126, respectively, may lie on a same lateral/horizontal plane extending parallel with the second axial surface 113 of the connector body 110 (or extending perpendicular with respect to the central axis 115).

In another aspect, the first distance may be shorter than the second distance. In other words, the first restraining member 121 may be disposed closer to (or on a same level as, e.g., flushed with) the second axial surface 113 of the connector body 110 than (or in comparison to) the second restraining member 126.

In yet another aspect, the first distance may be longer than the second distance.

In an aspect, the first restraining member 121 may extend in an upward manner towards the central axis 115 of the connector body 110, to engage the neck portion 11 of the liquid container 10 at the first position, and the second restraining member 126 may extend in a substantially horizontal manner towards the central-axis 115, to engage the neck portion 11 of the liquid container 10 at the second position. In other words, in an aspect, the first restraining member 121 may be extending away from the inner surface or wall 116 in a slant and upward manner, (i) towards the second axial surface 113, or (ii) both towards the central axis 115 and an entrance of the through-hole 114 at the second axial surface 113. Further, the second restraining member 126 may be extending laterally away from the inner surface 116, in a direction substantially perpendicular with respect to the central axis 115 of the connector body 110.

Thus, in an aspect, the first and the second restraining members 121 and 126, respectively, may be inclined or positioned at different angles (i.e., with respect to the central axis 115 of the connector body 110) from each other.

Accordingly, when the liquid container 10 includes both the lower fastening element 12 and the upper fastening element 15 on the neck portion 11, the restraining arrangement 120 may be disposed between (e.g., sandwiched between) the lower fastening element 12 and the upper fastening element 15, (i) with the second restraining member 126 inclined at an angle (e.g., right angle) with respect to the central axis 115 such that the free end portion of the second restraining member 126 rests on/above/upon an upward-facing side or surface of the lower fastening element 12 (e.g., an upward-facing side or surface of a neck ring) and (ii) with the first restraining member 121 inclined at another angle (i.e., acute angle, less than 90°) with respect to the central axis 115 such that the free end (e.g., distal end or tip) of the first restraining member 121 abuts or pushes against a downward-facing side or surface of the upper fastening element 15 (e.g., a downward-facing side or surface of an external thread, or bottom-most or lower-most thread segment of an external thread having a series of thread segments), thereby restraining the connector 100 to the neck portion 11 of the liquid container 10 from sliding longitudinally on the neck portion 11.

In another aspect, the first restraining member 121 may extend in a substantially horizontal manner towards the central axis 115 of the connector body 110, to engage the neck portion 11 of the liquid container 10 at the first position, and the second restraining member 126 may extend in a substantially horizontal manner towards the central-axis 115, to engage the neck portion 11 of the liquid container 10 at the second position. In other words, in another aspect, both the first restraining member 121 and the second restraining member 126 may be extending laterally (e.g., in a direction substantially perpendicular with respect to the central axis 115 of the connector body 110) away from the inner surface or wall 116.

Accordingly, in another aspect, the restraining arrangement 120 may be disposed between (e.g., sandwiched between) the upper fastening element 15 and the lower fastening element 12, (i) with the free end portion of the second restraining member 126 engaged or resting on/above an upward-facing side or surface of the lower fastening element 12 and (ii) with the free end portion of the first restraining member 121 engaged or in contact with a downward-facing side or surface of the upper fastening element 15, to restrain the connector 100 to the neck portion 11 of the liquid container 10 from sliding longitudinally on the neck portion 11.

In yet another aspect, the restraining arrangement 120 may be fitted over only the lower fastening element 12, in a manner such that the first and the second restraining members 121 and 126 clamp or sandwich the lower fastening element 12 therebetween. For example, the restraining arrangement 120 may be fitted over only the lower fastening element 12 in a manner such that the free end portion of the first restraining member 121 engages or rest on/above/upon an upward-facing side or surface of the lower fastening element 12 and the free end portion of the second restraining member 126 engages or contacts a downward-facing side or surface of the lower fastening element 12, thereby clamping or sandwiching the lower fastening element 12 between the first and the second restraining member 121 and 126 (see, for example, FIG. 3F).

In an aspect, when the restraining arrangement 120 is restrained to (ii) both the upper and lower fastening elements 15 and 12, or (ii) to only the lower fastening element 12, the restraining arrangement 120 would not obstruct or prevent an upper fastening element 15 of the liquid container 10 from receiving a capping member (e.g., bottle cap, travel cap etc.) thereto. For example, the first restraining member 121 of the restraining arrangement 120 of the connector 100 may engage or push against only a downward-facing side or surface of the upper fastening element 15 (e.g., against only the bottom-most or lower-most thread segment of an external thread having a series of thread segments) while remaining portions (e.g., higher portions) of the upper fastening element 15 are unobstructed by the restraining arrangement 120 or are free or exposed for allowing a capping member to be connected thereto. Moreover, by way of the restraining arrangement 120 extending inwardly (i.e., in a direction towards the central axis 115) away from the inner surface or wall 116, according to an aspect of the present disclosure, the connector body 110 (in particular, the inner surface 116 of the connector body 100) may be spaced apart from the neck portion 11 of the liquid container 10 to define a gap (or space) between the neck portion 11 and the inner surface 116 of the connector body 110 (i.e., when the connector body 110 is surrounding the neck portion 11), which may be used to receive or position a capping member therebetween or therein. Thus, according to an aspect of the present disclosure, a capping member may be connected to the neck portion 11 of the liquid container 10, while the connector 100 is restrained to the neck portion 11.

In an aspect, the first restraining member 121 may be or may include a property of being resilient (in other words, flexible, or capable of bending or flexing under an external force applied to the first restraining member 121, and thereafter returning or biasing or springing back to its original form after the external force is released). In other words, according to an aspect of the present disclosure, the first restraining member 121 may be or may include a resilient or flexible restraining member (e.g., a plurality of resilient or flexible elongated structures). In an aspect, the resilient or flexible first restraining member 121 may enable the connector body 110 to slide longitudinally along the neck portion 11, from the mouth 11 of the liquid container 10 towards the base of the liquid container 10, until the restraining arrangement 120 is either (i) disposed between the upper fastening element 15 and the lower fastening element 12 or (ii) fitted over only the lower fastening element 12. For example, in an aspect, when the upper fastening element 15 includes an external thread having a series of thread segments, the first restraining member 121, being a resilient or flexible member, may enable the connector body 110 to slide past the series of thread segments from the mouth 14 of the liquid container 10 towards the base of the liquid container 10.

In an aspect, the second restraining member 126 may be or may include a property of being rigid. In other words, according to an aspect of the present disclosure, the second restraining member 126 may be or may include a rigid restraining member (e.g., rigid at least one support structure).

In an aspect, a thickness (i.e., measured from a downward-facing side to an upward-facing side) of the second restraining member 126 may be thicker than a thickness (i.e., measured from a downward-facing side to an upward-facing side) of the first restraining member 121. Accordingly, even when the first restraining member 121 and the second restraining member 126 may be composed or formed of a same material, according to an aspect of the present disclosure, the second restraining member 126 may be capable of being rigid (or more rigid than the first restraining member 121) while the first restraining member 121 may be capable of being resilient/flexible (or more resilient/flexible than the second restraining member 126). In an aspect, the first restraining member 121 which may have a form of a plurality of sub-structures (as opposed to a single, unitary and larger structure) may further aid or contribute to the first restraining member 121 being resilient or flexible.

In an aspect, the first and the second restraining members 121 and 126 of the restraining arrangement 120, as described above, may enable the connector 100 to be restrained or attached to the neck portion 11 of the liquid container 10 in a single step, without requiring significant force and time. For example, the connector body 110 may be simply slid along the neck portion 11, from the mouth 14 towards the base of the liquid container 10, until the restraining arrangement 120 is either (i) disposed between the upper fastening element 15 and the lower fastening element 12 or (ii) fitted over only the lower fastening element 12. Moreover, once the connector 100 is restrained to the neck portion 11 of the liquid container 10 via the restraining arrangement 120, the restraining arrangement 120 of the connector 100 may inhibit or prevent the connector 100 from dislodging from the neck portion 11 easily. For example, as the resilient or flexible first restraining member 121 may be extending in a slant and upward (i.e., inclined) manner, according to an aspect of the present disclosure, the connector body 110 may be slid (relatively effortlessly) along the neck portion 11, from the mouth 14 towards the base of the liquid container 10, until the free end (or tip) of the first restraining member 121 abuts or pushes against a downward-facing side or surface of the upper fastening element 15. Thereafter, due to the inclined orientation of the first restraining member 121 relative to the central axis 115, the connector body 110 cannot be easily removed from the neck portion 11 by an upward sliding movement (i.e., towards the mouth 14) unless the first restraining member 121 is tempered with, for example, flexed to disengage the free end (or tip) of the first restraining member 121 away from the downward-facing side or surface of the upper fastening element 15.

In an aspect, the connector 100 may further include a connector-to-key-interface arrangement 140 (e.g., a unique mechanical pattern or code) arranged on or along the second axial surface 113 (e.g., upward-facing surface) of the connector body 110. In an aspect, the connector-to-key-interface arrangement 140 may be configured to mate with a corresponding key-to-connector-interface arrangement 170 of the key member 150 arranged on or along a first axial surface 162 (e.g., downward-facing surface) of the key member 150, in a manner such that the second axial surface 113 (e.g., upward-facing surface) of the connector body 110 may be mated with or in contact with or separated by a small gap/space from the first axial surface 162 (e.g., downward-facing surface) of the key member 150.

In an aspect, the connector-to-key-interface arrangement 140 of the connector 100 may include at least one protrusion element 141 (e.g., pin, rod, tongue etc.), respectively extending away from the second axial surface 113 of the connector body 110 (e.g., extending in a perpendicular direction relative to the second axial surface 113 of the connector body 110). In an aspect, each of the at least one protrusion element 141 of the connector-to-key-interface arrangement 140 may be receivable within at least one corresponding or matching protrusion-receiving hole 171 (e.g., blind hole, through-hole, recess, groove, channel etc.) of (e.g., belonging to) the key-to-connector-interface arrangement 170 of the key member 150. In an aspect, each of the at least one protrusion element 141 of the connector-to-key-interface arrangement 140 of the connector 100 may have or may include a unique shape (i.e., cross-sectional profile across a lateral/horizontal plane extending parallel with the second axial surface 113 of the connector body 110) that differs from any one or more or all other remaining protrusion element(s) 141 of the connector-to-key-interface arrangement 140 of the connector 100.

Accordingly, in an aspect, the key member 150 may include the key-to-connector-interface arrangement 170 having at least one protrusion-receiving hole 171 (e.g., blind hole, through-hole, recess, groove, channel etc.) respectively sized and/or positioned (or arranged) on or along the first axial surface 162 of the key member 150 and configured to receive the at least one protrusion element 141 of the connector-to-key-interface arrangement 140.

In another aspect, the connector-to-key-interface arrangement 140 of the connector 100 may, additionally or alternatively, include at least one hole (e.g., blind hole, through-hole, recess, groove, channel etc.) (not shown) extending inwardly from the second axial surface 113 of the connector body 110 towards or to the first axial surface 112 of the connector body 110.

Accordingly, in another aspect, the key-to-connector-interface arrangement 170 of the key member 150 may, additionally or alternatively, include at least one protrusion element (e.g., pin, rod, tongue etc.) configured to be insertable or received in the at least hole (e.g., blind hole, through-hole, recess, groove, channel etc.) of the connector-to-key-interface arrangement 140 of the connector 100.

In yet another aspect, the connector-to-key-interface arrangement 140 of the connector 100 may be a substantially flushed or level or flat surface. For example, the connector-to-key-interface arrangement 140 may include a planar surface substantially parallel with the second axial surface 113 of the connector body 110. In yet another aspect, the connector-to-key-interface arrangement 140 may be or may include the second axial surface 113 (e.g., upward-facing surface) of the connector body 110.

In an aspect, each of the at least one protrusion element 141 of the connector-to-key-interface arrangement 140 of the connector 100 may include a reinforcing rib portion protruding laterally (e.g., along a direction substantially parallel with the second axial surface 113) from a side surface or wall of the protrusion element 141, for enhancing a rigidity of the protrusion element 141 (described later below).

In an aspect, the connector-to-key-interface arrangement 140 of the connector 100 may further include a first set of at least one guide post 144a and a second set of at least one guide post 144b, respectively extending (e.g., perpendicularly) from the second axial surface 113 away from the connector body 110 to guide or for guiding or aligning the key member 150 towards the second axial surface 113 of the connector body 110.

Accordingly, the key-to-connector-interface arrangement 170 of the key member 150 may include at least one alignment opening 174 (e.g., channel, blind hole or through-hole) arranged (i.e., along the key member 150) and sized to receive a corresponding guide post 144a and 144b therein.

In an aspect, when the connector-to-key-interface arrangement 140 includes at least one protrusion element 141, each guide post 144a and 144b may be taller or longer than each of the at least one protrusion element 141 (i.e., measured from the second axial surface 113 of the connector body 110 to a respective free end or tip of the guide post 144a and 144b/protrusion element 141) such that the guide post 144a and 144b may be enabled or may be capable of making a first contact or be first to interface or interact with the key member 150 (e.g., at a free end portion of the guide post 144a and 144b) before the at least one protrusion element 141 of the connector-to-key-interface arrangement 140 interfaces or interacts or receives or mates with the key member 150. Thus, for example, each guide post 144a and 144b may serve as an alignment aid to align the key member 150 with the connector 100.

In an aspect, the first set of at least one guide post 144a may include an equal number of guide post(s) as the second set of at least one guide post 144b.

In an aspect, the first set of at least one guide post 144a and the second set of at least one guide post 144b may share at least one guide post.

In an aspect, the first set of at least one guide post 144a may be positioned between a first edge of the outer surface or wall 117 of the connector body 110 and the longitudinal plane 115a of the connector body 110, and the second set of at least one guide post 144b may be positioned between a second edge of the outer surface 117 (e.g., immediately/directly across or opposite the first edge) and the longitudinal plane 115a. In an aspect, the first set of at least one guide post 144a and the second set of at least one guide post 144b may be symmetrical about the longitudinal plane 115a.

In an aspect, the connector 100 may be formed of a single, unitary or monolithic piece. For example, (i) the connector body 110, (ii) the restraining arrangement 120 and (iii) the connector-to-key-interface arrangement 140, as described above, may be integrally formed via an injection molding process. Thus, only a (single) operation (e.g., an injection molding process) may be required to manufacture or make the connector 100, thereby resulting in time and cost savings in manufacturing or making the connector 100.

Accordingly, in an aspect, the connector body, the restraining arrangement, and the connector-to-key-interface arrangement may be made of a plastic material (e.g., PP, PBT, PEI, PEEK, PFA etc.).

With reference to FIG. 1A and FIG. 1B, according to an aspect of the present disclosure, there may be provided the key member 150 which may be configured to be detachably connectable (e.g., slidably connectable, or in sliding engagement, or freely slidable) with or to the connector 100, from one side or surface of the key member 150, and detachably connectable or attachable to the liquid dispensing assembly 50 from another side or surface of the key member 150. For example, the key member 150 may include a key-member body 160 having opposite first and second axial surfaces 162 and 163. The first axial surface 162 (e.g., base, or downward-facing surface) of the key-member body 160 of the key member 150 may be configured to interface with (e.g., connect, or slidably engage) the second axial surface (e.g., upward-facing surface) of the connector body 110 of the connector 100, and the second axial surface 163 (e.g., deck, or upward-facing surface) of the key-member body 160 may be attached to a base of the liquid dispensing assembly 50.

In an aspect, the first and the second axial surfaces 162 and 163 of the key-member body 160 may be parallel with each other.

In an aspect, the first axial surface 162 (e.g., downward-facing surface) of the key-member body 160 may be or may include a flushed or level surface for forming a seal with a flushed or level second axial surface 113 (e.g., upward-facing surface) of the connector body 110 of the connector 100. Further, the second axial surface 163 (e.g., upward-facing surface) of the key-member body 160 may be or may include another flushed or level surface. In other words, the first and/or the second axial surface(s) 162 and 163 of the key-member body 160 may be or may include a substantially flat or planar surface, without (in other words, free from) any raised element, protrusion etc. and without any curvature or curved portion. Each flushed or level surface of the first and/or the second axial surface(s) 162 and 163 of the key-member body 160 may be demarcated by an outer surface or outward-facing side wall 167 of the key-member body 160.

In an aspect, the key-member body 160 may define a through-hole 164 for enabling or allowing a liquid dispensing probe 55 of the liquid dispensing assembly 50 to extend therethrough. Accordingly, the key-member body 160 may include an inner surface or inner side wall 166 (i.e., facing the through-hole 164) and the outer surface 167.

In an aspect, each of the inner surface or wall 166 and the outer surface or wall 167 of the key-member body 160 may include a respective a shape (i.e., cross-sectional profile across a lateral/horizontal plane of the key-member body 160) which may include, but is not limited to, a circle or a circular shape. For example, according to an aspect of the present disclosure, the key-member body 160 may have or may include, but is not limited to, a disc shape, a doughnut shape, an annular shape etc.

In another aspect, each of the inner surface 166 and the outer surface 167 of the key-member body 160 may include a respective a shape (i.e., cross-sectional profile across a lateral/horizontal plane of the connector body 110) which may include, but is not limited to a square, a polygon etc.

Accordingly, in an aspect, the key-member body 160 may be configured to have a similar or identical shape as the connector body 110 of the connector 100.

In an aspect, the key member 150 may further include the key-to-connector-interface arrangement 170 arranged on or along the first axial surface 162 (e.g., downward-facing surface) of the key-member body 160. The key-to-connector-interface arrangement 170 may be configured to interface or mate with the connector-to-key-interface arrangement 140 of the connector 100 to form an interface joint 77 (see FIG. 1B), between the connector-to-key-interface arrangement 140 and the key-to-connector-interface arrangement 170, with the second axial surface 113 of the connector body 110 in contact with or separated by a small gap/space from the first axial surface 162 of the key member 150.

For example, the key-to-connector-interface arrangement 170 of the key member 150 may include at least one protrusion-receiving hole 171 (e.g., blind hole, through-hole, recess, groove, channel etc.) extending inwardly from the first axial surface 162 towards (or to) the second axial surface 163 of the key-member body 160 for receive a corresponding protrusion element 141 of the connector-to-key-interface arrangement 140 of the connector 100. Accordingly, in an aspect, each protrusion-receiving hole 171 of the key-to-connector-interface arrangement 170 may be sized and/or positioned (or arranged along the key member 150) to receive a corresponding protrusion element 141 of the connector-to-key-interface arrangement 140 of the connector 100.

In another aspect, the key-to-connector-interface arrangement 170 of the key member 150 may, alternatively or additionally, include at least one protrusion element (e.g., pin, rod, tongue etc.) configured to interface with or be received in at least hole (e.g., blind hole, through-hole, recess, groove, channel etc.) of the connector-to-key-interface arrangement 140 of the connector 100.

In yet another aspect, the key-to-connector-interface arrangement 170 of the key member 150 may be a substantially flushed or level or flat surface. For example, the key-to-connector-interface arrangement 170 may include a planar surface substantially parallel with the first axial surface 162 of the key-member body 160. In yet another aspect, the key-to-connector-interface arrangement 170 may be or may include the first axial surface 162 (e.g., downward-facing surface) of the key-member body 160.

In an aspect, the key-to-connector-interface arrangement 170 may further include at least one alignment opening 174 (e.g., channel, blind hole or through-hole) positioned (e.g., along the key-member body 160) and sized to receive a corresponding guide post 144*a* and 144*b* of the connector-to-key-interface arrangement 140 of the connector 100 therein. In an aspect, the at least one alignment opening 174 may be an opening (e.g., channel, blind hole or through-hole) on the first axial surface 162 of the key-member body 160 that aligns the key member 169 with the connector 100.

With reference to FIG. 1B, in an aspect, the connector 100 and the key member 150 may be part of a connection assembly 180. In other words, there may be provided the connection assembly 180 which may include the connector 100 and the key member 150 as described above. Accordingly, the connection assembly 180, in an aspect, may include the connector 100 which may be restrainably attachable to the neck portion 11 of the liquid container 10, and the key member 150 which may be detachably connectable to the connector 100.

In an aspect, the connection assembly 180 and the liquid dispensing assembly 50 may be part of a liquid dispensing system 190. In an aspect, the liquid dispensing system 190 may further include the liquid container 10. The liquid dispensing assembly 50 may be in fluid connection with an internal volume of the liquid container 10, when the connector-to-key-interface arrangement 140 of the connector 100 and the key-to-connector-interface arrangement 170 of the key member 150 mates or interfaces with each other to form the interface joint 77, between the connector-to-key-interface arrangement 140 and the key-to-connector-interface arrangement 170.

FIG. 2A shows a perspective view of a connector 200, according to an aspect of the present disclosure.

According to an aspect of the present disclosure, there may be provided the connector 200 which may be restrainably attachable or couplable or mountable or fitted to a neck portion 21 of a liquid container 20 (as shown in FIG. 2C), for permitting or so as to permit connection of the liquid container 20 to an intended (e.g., predetermined) liquid dispensing assembly 60 (see, for example, FIG. 2D).

In an aspect, the connector 200 may contain any or all the features and/or limitations of the connector 100 of FIG. 1A and FIG. 1B. In the following, the connector 200 is described with like reference characters generally referring to the same or corresponding parts/features of the connector 100 of FIG. 1A and FIG. 1B. The description of the parts/features made with respect to the connector 200 is also applicable with respect to the connector 100, and vice versa.

As shown in FIG. 2A, the connector body 210 may have or may include a circular shape, such as a disc shape or a doughnut shape, with an inner circumferential surface 216 and an outer circumferential surface 217. As an example, the inner circumferential surface 216 of the circular connector body 210 may have a diameter of approximately 45 to 50 mm, and the outer circumferential surface 217 of the circular connector body 210 may have a diameter of approximately 70 to 80 mm.

As shown, in an aspect, a second axial surface 213 (e.g., upward-facing surface) of the connector body 210 may be or may include a flushed or level surface adapted to form a seal with another flushed or level or flat surface (e.g., a first axial surface 262 of a key-member body 260 of a corresponding key member 250 of FIG. 2B). Further, in an aspect, a first axial surface 212 (e.g., downward-facing surface) of the connector body 210 may be or may include another flushed or level surface.

In an aspect, the connector 200 may, similar to the connector 100 of FIG. 1A and FIG. 1B, include a restraining arrangement 220 extending from the inner circumferential surface 216 of the connector body 210 towards the central axis 215 of the connector body 210 or towards the hole axis 214a of the through-hole 214. The restraining arrangement 220 may, similar to the restraining arrangement 120 of the connector 100 of FIG. 1A and FIG. 1B, include a first restraining member 221 and a second restraining member 226.

With reference to FIG. 2A, the first restraining member 221 of the restraining arrangement 220 of the connector 200 may include a plurality of teeth members 221a (i.e., elongated structures) extending away from the inner circumferential surface 216, in an inward direction towards the central axis 215. The plurality of teeth members 221a may, similar to the first restraining member 121 of the restraining arrangement 120 of the connector 100 of FIG. 1A and FIG. 1B, be configured to abut against an upper fastening element 25 (e.g., an external thread) of the liquid container 20 (see, for example, FIG. 2C), at a free end (e.g., distal end or tip) of each tooth member 221a of the plurality of teeth members 221a. With reference to FIG. 2A, each tooth member 221a of the plurality of teeth members 221a may be a respective tooth-shaped structure having tapered side surfaces or walls extending between a first end of the tooth member 221a (i.e., that is adjoining the inner circumferential surface 216 of the connector body 210) and a free end (e.g., distal end or tip) of the tooth member 221a. As shown, each tooth member 221a of the plurality of teeth members 221a may have or may include a frustum (e.g., truncated pyramid) shape, with a wider end of the frustum shape adjoined to the inner circumferential surface 216 of the connector body 210.

The second restraining member 226 of the restraining arrangement 220 of the connector 200 may include a plurality of support members 226a extending away from the inner circumferential surface 216, in an inward direction towards the central axis 215 of the connector body 210 or towards the hole axis 214a of the through-hole 214. The plurality of support members 226a may, similar to the second restraining member 126 of the restraining arrangement 120 of the connector 100 of FIG. 1A and FIG. 1B, be configured to engage or rest on/above/upon an upward-facing side or surface of a lower fastening element 22 (e.g., a neck ring) of the liquid container 20 (see, for example, FIG. 2C). With reference to FIG. 2A, each support member 226a of the plurality of support members 226a may have or may include a conical shape (i.e., conical cross-sectional profile along a vertical plane intersecting the support member 226a between a proximal end to a distal end of the support member 226a).

As shown, the plurality of teeth members 221a of the first restraining member 221 and the plurality of support members 226a of the second restraining member 226, of the restraining arrangement 220 of the connector 200, may be arranged circumferentially along the inner circumferential surface 216 of the connector body 210. Further, as shown, the plurality of teeth members 221a and the plurality of support members 226a may be arranged in a side-by-side and alternating manner. In an aspect, by way of the side-by-side and alternating arrangement of the first restraining member 221 and the second restraining member 226, the first restraining member 221 and the second restraining member 226 may be arranged at a same level or height with respect to the first or the second axial surface 212 or 213 of the connector body 210, thereby enabling the connector body 210 to be relatively thin (e.g., having a thickness of approximately 2 to 6.5 mm), while adequately supporting the connector 200 on the liquid container 20 at uniform points along (or around) the connector body 210.

As shown in FIG. 2A, a length of each of the plurality of teeth members 221a may be longer than a length of each of the plurality of support members 226a (respectively measured from the inner circumferential surface 216, at a respective point of intersection between the teeth members 221a/support members 226a and the inner circumferential surface 216, to a respective free end (or tip) of the teeth members 221a/support members 226a).

With reference to FIG. 2A, according to an aspect of the present disclosure, when looking in a direction along the central axis 215 (e.g., when looking into the z-axis of FIG. 2A), a respective free end (or tip) of the first restraining member 221 may be further away from the inner circumferential surface 216 (in other words, closer to the central axis 215) than a respective free end (or tip) of the second restraining member 226. For example, as shown in FIG. 2A, when the length of each of the plurality of teeth members 221a is longer than the length of each of the plurality of support members 226a, the respective free end (or tip) of each of the plurality of teeth members 221a may be further away from inner circumferential surface 216 than the respective free end (or tip) of each of plurality of support members 226a (when looking into the z-axis of FIG. 2A).

As shown, each of the plurality of teeth members 221a may be extending in an upward manner towards the central axis 215. Further, as shown, each of the plurality of support members 226a may be extending in a substantially horizontal manner towards the central axis 215.

In an aspect, each of the plurality of teeth members 221a of the first restraining member 221 may include a property of being resilient or flexible. Further, each of the plurality of support members 226a of the second restraining member 226 may include a property of being rigid.

In an aspect, the connector 200 may, similar to the connector 100 of FIG. 1A and FIG. 1B, include a connector-to-key-interface arrangement 240. As shown in FIG. 2A, in an aspect, the connector-to-key-interface arrangement 240 of the connector 200 may, similar to the connector-to-key-interface arrangement 140 of the connector 100 of FIG. 1A and FIG. 1B, include at least one protrusion element 241 extending away from the second axial surface 213 of the connector body 210. As shown, the connector body 210 may include markings or engravings (e.g., numerals, e.g., "1" to "14", circumferentially positioned uniformly around the connector body 210, and/or a unique part number and/or identification number) on the first and/or the second axial surfaces 212 and 213 of the connector body 210, for serving as an identifier for where each of the connector-to-key-interface arrangement 240 (e.g., each protrusion element 241) may be positioned (e.g., with respect to the numerals "1" to "14") and/or for providing information about the connector 200 (e.g., by way of the unique part number and/or the identification number). As shown, the connector-to-key-interface arrangement 240 of the connector 200 may include three protrusion elements 241, respectively positioned in line with numeral markings "3", "7" and "13". A direct distance measured from the central axis 215 to a center of each protrusion element 241 may be, but is not limited to being, substantially the same or of equal value.

As shown in FIG. 2A, one of the protrusion elements 241a (e.g., which may be referred to as "primary protrusion element") of the connector-to-key-interface arrangement 240 may be larger than the remaining or other protrusion elements 241b (e.g., which may be referred to as "secondary protrusion element(s)") of the connector-to-key-interface arrangement 240 and/or may have a different shape (i.e., cross-sectional profile across a lateral/horizontal plane parallel with the second axial surface 213) from the secondary protrusion element(s) 241b. As shown, each protrusion element 241 of the connector-to-key-interface arrangement 240 may, similar to the connector-to-key-interface arrangement 140 of the connector 100, include a reinforcing rib portion 242 protruding laterally (e.g., along a direction substantially parallel with the second axial surface 213 of the connector body 210) from a side surface or wall of the protrusion element 241, for enhancing or improving rigidity of each protrusion element 241 of the connector-to-key-interface arrangement 240. For example, with the reinforcing rib portion 242, any one or more or all of the protrusion element(s) 241 of the connector-to-key-interface arrangement 240 may have or may include a "U" shape (as depicted by the primary protrusion element 241a in FIG. 2A, e.g., forming a bracket shape, which may have rounded/bevelled inner/inward-facing side/vertical corners), an "I" shape (as depicted by the secondary protrusion element(s) 241b, which may have rounded inner/inward-facing side/vertical surface(s)/wall(s)), or any other suitable shape. In an aspect, a respective one or more or all side (e.g., vertical) edge(s)/corner(s) and/or a respective one or more or all top (e.g., horizontal) edge(s)/corner(s) of each protrusion element 241 may be rounded or bevelled so as to reduce or minimize or eliminate stress concentration points on the protrusion element 241 and/or to improve manufacturability of the protrusion element 241 (e.g., via an injection molding process).

The present disclosure may include a connector 200 having any number of protrusion element(s) 241 in any position (e.g., arrangement) and/or distance (e.g., from the central axis 215) and/or size and/or shape, for forming or so as to form (various permutations of) the connector-to-key-interface arrangement 240 (e.g., the unique mechanical pattern or code of the connector-to-key-interface arrangement 240). In other words, one or a combination of (i) a position, (ii) a distance (e.g., from the central axis 215), (iii) a size, and (iv) a shape of any one or more or all protrusion element(s) 241 may be varied to contribute to or for forming or so as to form the unique mechanical pattern or code of the connector-to-key-interface arrangement 240 of the connector 200.

Referring to FIG. 2A, according to an aspect of the present disclosure, the connector-to-key-interface arrangement 240 of the connector 200 may, similar to the connector 100, include a first set of at least one guide post 244a (e.g., pin(s)) and a second set of at least one guide post 244b (e.g., pin(s)) extending (e.g., perpendicularly) from the second axial surface 213 away from the connector body 210, for guiding the key member 250 towards the second axial surface 213 of the connector 200. Accordingly, each guide post of the first and the second sets of at least one guide posts 244a and 244b may be taller or longer than each protrusion element 241 of the connector-to-key-interface arrangement 240 (i.e., measured from the second axial surface 213 to a respective free end or tip of the guide post 244a and 244b/protrusion element 241). For example, each guide post 244a and 244b may have a height of approximately 9.5 to 12 mm, while each protrusion element 241 may have a height of approximately 4 to 9 mm. As shown in FIG. 2A, the first set of at least one guide post 244a may include two guide posts 244a, respectively positioned between numeral markings "2" and "3" and between numeral markings "6" and "7", and the second set of at least one guide post 244b may include another two guide posts 244b, respectively positioned between numeral markings "8" and "9" and between numeral markings "12" and "13". Further, as shown, a direct distance measured from the central axis 215 to a center of each guide post 244a and 244b may be, but is not limited to being, substantially the same or equal value.

As shown, the direct distance from the central axis 215 to the center of each guide post 244a and 244b may be, but is not limited to being, shorter (or smaller) than the direct distance measured from the central axis 215 to the center of each protrusion element 241. For example, the direct distance from the central axis 215 to the center of each guide post 244a and 244b may be approximately 25 to 30 mm, and the direct distance measured from the central axis 215 to the center of each protrusion element 241 may be approximately 30 to 35 mm.

With reference to FIG. 2A, the guide posts of the first and the second sets of at least one guide posts 244a and 244b may be of the same or equal size and/or may have a similar or identical shape, with each other. As shown, each guide post 244a and 244b may, similar to each protrusion element 241, include a reinforcing rib portion 242 protruding laterally (e.g., along a direction substantially parallel with the second axial surface 213) from a side surface or wall of the guide post 244a and 244b, for enhancing or improving rigidity of the guide post 244a and 244b. For example, as shown, each guide post 244a and 244b may have or may include a "X" shape. In an aspect, a respective one or more or all side (e.g., vertical) edge(s)/corner(s) and/or a respective one or more or all top (e.g., horizontal) edge(s)/corner(s) of each guide post 244a and 244b may be rounded or bevelled so as to reduce or minimize or eliminate stress concentration points on the guide post 244a and 244b and/or improve manufacturability of the guide post(s) 244a and 244b.

The present disclosure may include a connector 200 having any number of guide posts 244a and 244b in any position (e.g., arrangement) and/or distance (e.g., from the central axis 215) and/or size and/or shape. In an aspect, one or a combination of (i) a position, (ii) a distance (e.g., from the central axis 215), (iii) a size, and (iv) a shape of any one or more or all guide post(s) of the first and/or the second sets of at least one guide post(s) 244a and 244b may be varied to contribute to or for forming or so as to form the unique mechanical pattern or code of the connector-to-key-interface arrangement 240 of the connector 200. Thus, one or a combination of (i) a position, (ii) a distance (e.g., from the central axis 215), (iii) a size, and (iv) a shape of any one or more or all guide post(s) 244a and 244b may be varied to form a unique mechanical pattern or code of the connector-to-key-interface arrangement 240, while recycling or re-using (in other words, without changing; in yet other words, while maintaining) a previous arrangement or adaptation or configuration (e.g., (i) a position, (ii) a distance (e.g., from the central axis 215), (iii) a size, and (iv) a shape) of the at least one protrusion element 241 of the connector-to-key-interface arrangement 240.

With reference to FIG. 2A, the connector body 210 may include a side protrusion 218 from a portion of the outer circumferential surface 217. The side protrusion 218 may serve to improve grip (e.g., a user's grip) on the circular connector body 210, by inhibiting or preventing the circular connector body 210 from rotating about the neck portion 21 of the liquid container 20 as the user handles the connector body 210. As shown, the side protrusion 218 of the connector body 210 may extend along a direction substantially perpendicular to the opposite first and second axial surfaces 212 and 213 of the connector body 210, such that a respective portion 219 of the first axial surface 212 and/or the second axial surface 213 (of the connector body 210) adjoins the side protrusion 218.

The connector-to-key-interface arrangement 240 of the connector 200 may further include a further guide post 245 (e.g., which may be referred as "primary guide post") extending away from the portion 219 of the second axial surface 213 of the connector body 210 adjoining the side protrusion 218 of the connector body 210. The further guide post 245 (i.e., primary guide post) may, similar to the first and the second sets of at least one guide post 244a and 244b, be longer or taller than each protrusion element 241 of the connector-to-key-interface arrangement 240 (i.e., measured from the second axial surface 213 to a respective free end or tip of the primary guide post 245/protrusion element 241) for serving as an alignment aid for the key member 250. With reference to FIG. 2A, the further guide post 245 (i.e., primary guide post) may be larger in size than each of the other remaining guide posts of the first and the second sets of at least one guide posts 244a and 244b (e.g., which may be referred as "secondary guide posts"). Accordingly, the primary guide post 245 may serve as a visual cue or identifier to a user regarding an orientation of the connector body 210 and/or may serve as a first point of engagement or interaction or interface with the key member 250 (e.g., with the key-to-connector-interface arrangement 270 of the key member 250).

As shown, the further guide post 245 may be elongate along a direction substantially parallel with the second axial surface 213 of the connector body 210. In other words, the further guide post 245 may have or may include an oblong shape. The further guide post 245 may further include rounded/bevelled edge(s)/corner(s) (i.e., no sharp edges or corners on the further guide post 245). Accordingly, the further guide post 245 may be easily manufacturable (e.g., via an injection molding process), and may improve a user's experience (or handling of the connector 200 by a user) since there may be few to no sharp edges/corners exposed on the further guide post 245.

In an aspect, the connector 200 may, similar to the connector 100, be formed of a single, unitary or monolithic piece.

With reference to FIG. 2C, when the connector 200 is restrained to the neck portion 21 of the liquid container 20, the entire connector 200 may rest or be disposed below the mouth 24 or opening of the liquid container 20, which may serve to minimize contamination to an internal volume of the liquid container 20. For example, with the entire connector 200 resting or disposed below the mouth or opening 24, the likelihood of any particles (or possible contaminants) from the connector 200 (e.g., connector body 210) travelling upwards to enter the liquid container 20, via the mouth or opening 24, may be reduced or eliminated.

FIG. 2B shows a top view of a key member 250, according to an aspect of the present disclosure.

According to an aspect of the present disclosure, there may be provided the key member 250 which may be detachably connectable to the connector 200.

In an aspect, the key member 250 may contain any or all the features and/or limitations of the key member 150 of FIG. 1A and FIG. 1B and is described with like reference characters generally referring to the same or corresponding parts/features of the key member 150 of FIG. 1A and FIG. 1B. The description of the parts/features made with respect to the key member 250 is also applicable with respect to the key member 150, and vice versa, including the key-to-connector-interface arrangement 270.

In an aspect, the key-to-connector-interface arrangement 270 of the key member 250 may, similar to the key-to-connector-interface arrangement 170 of the key member 150 of FIG. 1A and FIG. 1B, be arranged on or along a first axial surface 262 of the key-member body 260. For example, the key-to-connector-interface arrangement 270 of the key member 250 may include at least one channel, at least one recess, at least one notch, and/or at least one groove extending away from the first axial surface 262 towards (or to) a second axial surface 263 of the key-member body 260. The key-to-connector-interface arrangement 270 of the key member 250 may be configured to mate or interface or cooperate with the connector-to-key-interface arrangement 240 of the connector 200 to form an interface joint 88 (as shown in FIG. 2C), between the key-to-connector-interface arrangement 270 and the connector-to-key-interface arrangement 240, with the first axial surface 262 of the key-member body 260 in contact with or separated by a small gap/space from the second axial surface 213 of the connector body 210.

As shown in FIG. 2B, the key-member body 260 may have or may include a circular shape, such as a disc shape or a doughnut shape, corresponding (e.g., similar or identical) to the circular shape of the connector body 210. For example, an inner circumferential surface 266 of the circular key-member body 260 may have a diameter of approximately 40 to 50 mm, and the outer circumferential surface 267 of the circular key-member body 260 may have a diameter of approximately 60 to 90 mm.

Further, as shown, the key-member body 260 may, similar to the connector body 210, include markings or engravings (e.g., numerals, e.g., "1" to "14", circumferentially positioned uniformly around the key-member body 260, and/or a unique part number and/or identification number) on the first and/or the second axial surfaces 262 and 263 of the key-member body 260, for serving as an identifier for where each of the key-to-connector-interface arrangement 270 (e.g., each channel, notch, recess, groove etc.) may be positioned (e.g., with respect to the numerals "1" to "14") and/or for providing information about the key member 250 (e.g., by way of the unique part number and/or the identification number). As shown, the key-to-connector-interface arrangement 270 of the key member 250 may include three notches 271, respectively extending inwardly from the outer surface 267 of the key-member body 260 and also extending axially between the first and the second axial surfaces 262 and 263 of the key-member body 260. As shown, each notch may have a shape and/or size configured to receive a corresponding protrusion element 241 of the connector-to-key-interface arrangement 240 of the connector 200. As shown, each notch may include rounded inner edge(s)/corner(s) for reducing or minimizing or eliminating stress concentration points on the key-member body 260 and/or to improve manufacturability (e.g., via an injection molding process) of the key member 250. As shown, the three notches 271 may be positioned in line with numeral markings "3", "7" and "13", respectively. In order words, a position of each notch may correspond to an arrangement (in other words, position) of the protrusion elements 241 (e.g., primary and secondary protrusion elements 241a and 241b) of the connector-to-key-interface arrangement 240 of the connector 200. Further, as shown, one of the notches 271a (e.g., which may be referred to as "large key") may have a wider width and size than the remaining notches 271b (e.g., which may be referred to as "small key(s)"). The large key 271a may be sized and shaped to be capable of receiving the primary protrusion element 241a, and each of the small keys 271b may be sized and shaped to be capable of receiving a corresponding secondary protrusion element 241b of the connector-to-key-interface arrangement 240 of the connector 200.

The present disclosure may include the key member 250 having any other number of channel, notch, recess, groove in any other positions with any other sizes and/or shapes for forming or so as to form the key-to-connector-interface arrangement 270 which may engage or interact or interface or mate with the corresponding connector-to-key-interface arrangement 240 (e.g., with a corresponding unique mechanical pattern or code of the connector-to-key-interface arrangement 240) of the connector 200.

With reference to FIG. 2B, the key-to-connector-interface arrangement 270 of the key member 250 may further include at least one alignment opening 274, shown as, but not limited to, at least one through-hole, for receiving a corresponding guide post 244a and 244b therein. Accordingly, in an aspect, each alignment opening 274 of the key member 250 may be a through-hole extending between the first and the second axial surfaces 262 and 263 of the key-member body 260, and may be a straight or linear through-hole extending along a direction perpendicular (e.g., substantially perpendicular) to the opposite first and second axial surfaces 262 and 263 of the key-member body 260. In an aspect, each alignment opening 274 may be configured such that a size (e.g., width, diameter, shape etc.) and a position of the alignment opening 274 may receive a corresponding or matching guide post 244a and 244b therein. For example, each alignment opening 274 may be sized to loosely or snugly receive the corresponding matching guide post 244a and 244b therein.

With reference to FIGS. 2B and 2C, the key-to-connector-interface arrangement 270 of the key member 250 may include two alignment openings 274, respectively positioned between numeral markings "2" and "3" and between numeral markings "6" and "7", for receiving the first set of at least one guide post 244a (e.g., two guide posts). The key-to-connector-interface arrangement 270 may further include another two alignment openings 274, positioned respectively between numeral markings "8" and "9" and between "12" and "13", for receiving the second set of at least one guide post 244b (e.g., another two guide posts). Accordingly, the key-member body 260 may be provided with a number of alignment openings 274 on the key-member body 260 equal to a sum of a number of the first and the second sets of at least one guide posts 244a and 244b on the connector body 210.

With reference to FIG. 2B, the key-member body 260 of the key member 250 may, similar to the connector body 210 of the connector 200, include a side protrusion 268 from a portion of the outer circumferential surface 267 of the key-member body 260. As shown, the side protrusion 268 of the key-member body 260 may extend along a direction substantially perpendicular to the opposite first and second axial surfaces 262 and 263 of the key-member body 260 (or along a direction substantially perpendicular to the central axis 215 of the connector body 210), such that a respective portion 269 of the first axial surface 262 and/or the second axial surface 263 of the key-member body 260 adjoins the side protrusion 268 of the key-member body 260.

Further, as shown, the key-to-connector-interface arrangement 270 of the key member 250 may further include a further alignment opening 275 (e.g., which may be referred to as "primary alignment opening") extending across (or longitudinally through) the side protrusion 268 of the key-member body 260 of the key member 250, in a direction perpendicular (e.g., substantially perpendicular) to the opposite first and second axial surfaces 262 and 263 of the key-member body 260 of the key member 250. The further alignment opening 275 (i.e., primary alignment opening 275) may be a blind or through-hole which may be larger in size than the at least one alignment opening 274 (e.g., which may be referred to as "secondary alignment opening"), and may be configured to receive the primary guide post 245 therein.

In an aspect, the key-member body 260 and the key-to-connector-interface arrangement 270 may be made of a metal, an alloy (e.g., stainless steel), or a plastic/polymer (e.g., PEEK, PEI, PBT).

FIG. 2C shows a cross-sectional perspective view of the connector 200 of FIG. 2A restrained to a neck portion 21 of the liquid container 20, with the corresponding key member 250 of FIG. 2B mated with the connector 200 of FIG. 2A, according to an aspect of the present disclosure.

With reference to FIG. 2C, the connector 200 and the key member 250, as described above, may together form a connection assembly 280. As shown, the connector-to-key-interface arrangement 240 of the connector 200 and the key-to-connector-interface arrangement 270 of the key member 250 may be configured to mate with each other to form the interface joint 88, between the connector-to-key-interface arrangement 240 and the key-to-connector-interface arrangement 270, with the second axial surface 213 of the connector body 210 in contact with or separated by a small gap/space from the first axial surface 262 of the key-member body 260.

FIG. 2D shows a side view of the liquid dispensing assembly 60 with the key member 250 and the connector 200, according to an aspect of the present disclosure; FIG. 2E shows a partial exploded perspective view of the liquid dispensing assembly 60 of FIG. 2D, without a liquid dispensing probe 65, according to an aspect of the present disclosure; and FIG. 2F shows a cross-sectional side view of FIG. 2D, according to an aspect of the present disclosure.

With reference to FIG. 2D to FIG. 2F, the liquid dispensing assembly 60 may include, for example, (i) an adjustment knob 61 (e.g., primary adjustment knob), (ii) a top nut 62, (iii) a flange 63 (e.g., bottle flange), (iv) a middle nut 64, and (v) the liquid dispensing probe 65. The flange 63 may be supported between the top nut 62 and the middle nut 64. The adjustment knob 61 may be threaded to a threaded post 63a extending from the flange 63. The liquid dispensing probe 65 may be extending across and within the top nut 62, the flange 63, and the middle nut 64.

In an aspect, the key member 250 may be configured to be connectable or attachable to a liquid dispensing assembly 60, for example, via screws, bolts etc.

As an example, with reference to FIG. 2B, the key member 250 may include at least one fastener-receiving through-hole 277 for receiving a corresponding screw or bolt therethrough. With reference to FIG. 2E, the liquid dispensing assembly 60 may further include at least one further fastener-receiving through-hole 67 (e.g., through each of the top nut 62 and the middle nut 64) for receiving the corresponding screw or bolt therethrough.

A base portion of the liquid dispensing assembly 60 (e.g., the middle nut 64) may be placed or stacked on the second axial surface 263 (e.g., upward-facing surface) of the key-member body 260 with the at least one fastener-receiving through-hole 277 of the key member 250 aligned with the at least one further fastener-receiving through-hole 67 of the liquid dispensing assembly 60. At least one screw or bolt may then be respectively inserted (from the first axial surface 262 of the key-member body 260) into the aligned at least one fastener-receiving through-hole 277 of the key member 250 and at least one further fastener-receiving through-hole 67 of the liquid dispensing assembly 60, to fasten the key member 250 to the liquid dispensing assembly 60. Accordingly, a bottom component (e.g., originally a plate; not shown) of the liquid dispensing assembly 60 may be replaced by the key member 250 having the key-to-connector-interface arrangement 270 on the first axial surface 262 (e.g., downward-facing surface) of the key-member body 260 that may be configured to mate with the connector-to-key-interface arrangement 240 on the second axial surface 213 (e.g., upward-facing surface) of the connector 200.

FIG. 2G shows a close-up view of a single fastener-receiving through-hole 277 of the key member 250, according to an aspect of the present disclosure.

With reference to FIG. 2G, the at least one fastener-receiving through-hole 277 of the key-member body 260 may be, but is not limited to, a counterbore 277a. In another aspect, the at least one fastener-receiving through-hole 277 of the key-member body 260 may be, but is not limited to, a countersink (not shown). Each counterbore 277a or countersink may be oriented with the larger opening (e.g., for receiving/positioning a bolt head or screw head) at the first axial surface 262 of the key-member body 260. Accordingly, even with at least one bolt or screw respectively inserted through the at least one fastener-receiving through-hole 277 of the key-member body 260, to fasten the key member 250 to the liquid dispensing assembly 60, the key-member body 260 may still have a flushed or level or substantially flat (i.e., without any raised element) first axial surface 262 (e.g., downward-facing surface) for forming a proper seal with the second axial surface 213 (e.g., upward-facing surface) of the connector body 210 of connector 200.

In an aspect, the at least one fastener-receiving through-hole 277 of the key-member body 260, being a counterbore 277a or a countersink, may not include (in other words, may be free of) any thread element (e.g., internal thread(s)). Thus, only the at least one further fastener-receiving through-hole 67 of the liquid dispensing assembly 60 may be threaded. Accordingly, the key member 250 may be easily manufacturable via an injection molding process.

FIG. 2H shows a perspective view of a connector 200B, without any secondary guide posts, and having a second restraining member 226B which includes a plurality of overhanging catch members 236B, according to an aspect of the present disclosure; FIG. 2I shows a top view of the connector 200B of FIG. 2H, according to an aspect of the present disclosure; FIG. 2J shows a side view of the connector 200B of FIG. 2H, according to an aspect of the present disclosure; and FIG. 2K shows a cross-sectional side view of the connector 200B of FIG. 2J taken along A-A, according to an aspect of the present disclosure.

Figure 2L:
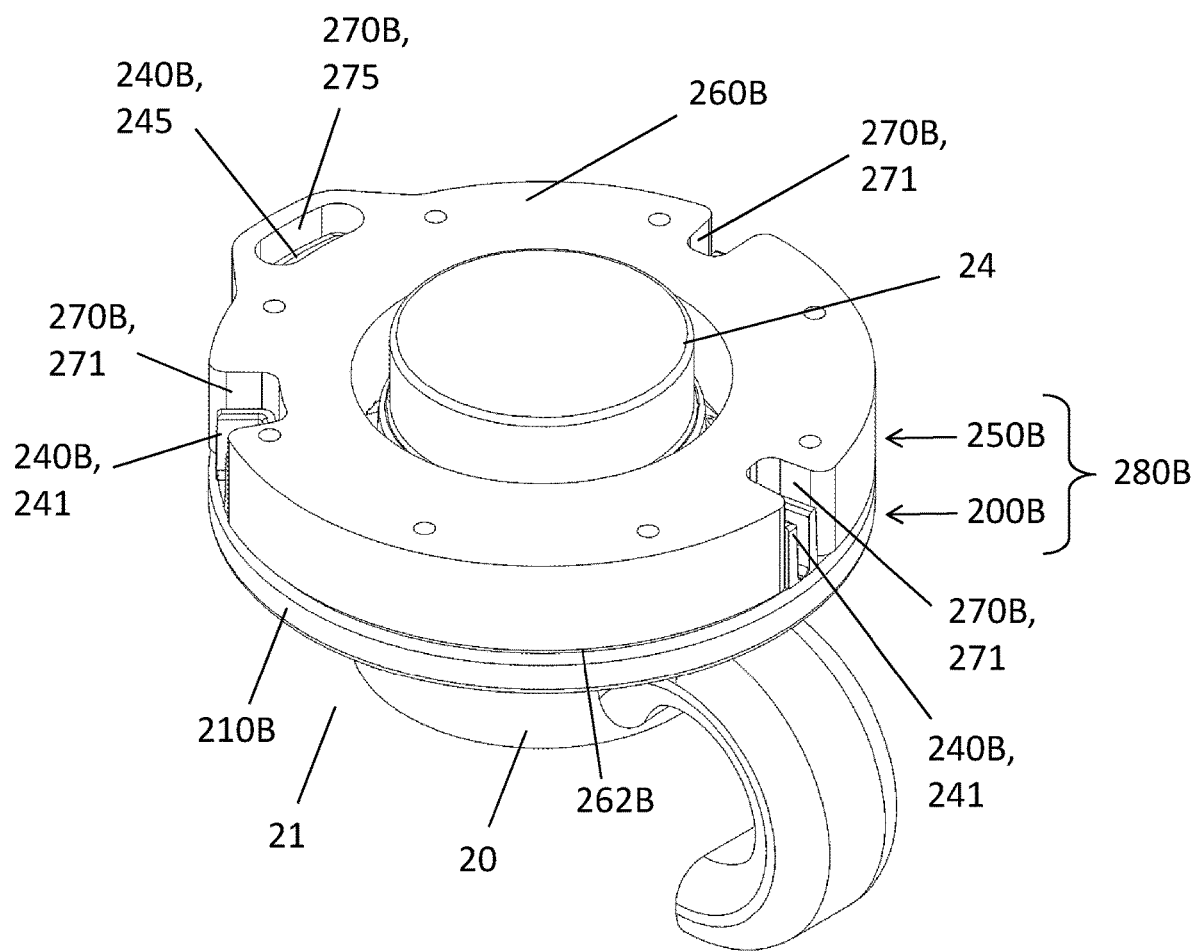
FIG. 2L shows a perspective view of the connector of FIG. 2H restrained to a neck portion of a liquid container, with a corresponding key member mated with the connector, according to an aspect of the present disclosure.
Figure 2L:
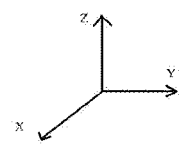
Figure 2M:
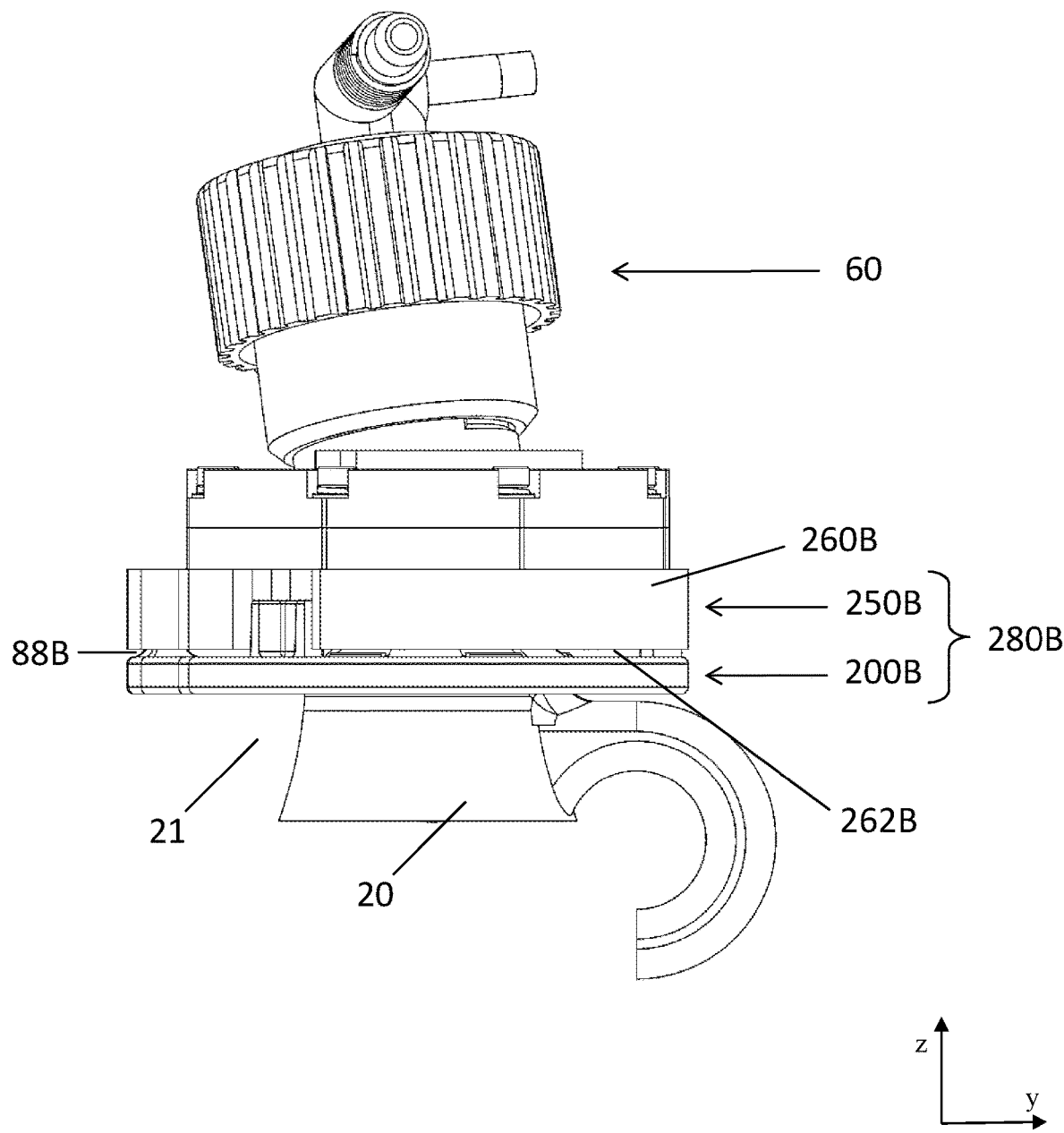
FIG. 2M shows a side view of a liquid dispensing assembly, together with the corresponding key member of FIG. 2H mated with the connector of FIG. 2H, according to an aspect of the present disclosure.

With reference to FIG. 2H to FIG. 2K, in an aspect, there may be provided the connector 200B which may, similar to connector 200 of FIG. 2A, be restrainably attachable or couplable or mountable or fitted to the neck portion 21 of the liquid container 20, for permitting or so as to permit connection of the liquid container 20 to an intended (e.g., predetermined) liquid dispensing assembly 60 (see, for example, FIG. 2M).

In an aspect, the connector 200B may contain any or all the features and/or limitations of the connector 100 of FIG. 1A and FIG. 1B and/or the connector 200 of FIG. 2A, and FIGS. 2C to 2F. In the following, the connector 200B is described with like reference characters generally referring to the same or corresponding parts/features of the connector 100 of FIG. 1A and FIG. 1B and/or the connector 200 of FIG. 2A, and FIGS. 2C to 2F. The description of the parts/features made with respect to the connector 200B is also applicable with respect to the connector 100 of FIG. 1A and FIG. 1B and/or the connector 200 of FIG. 2A, and FIGS. 2C to 2F, and vice versa.

As shown in FIG. 2H, the connector 200B may, similar to the connector 100 of FIG. 1A and FIG. 1B and/or the connector 200 the connector 200 of FIG. 2A, and FIGS. 2C to 2F, include a connector body 210B having a circular shape, for example, a disc shape or a doughnut shape, with an inner circumferential surface 216B and an outer circumferential surface 217B.

As shown, in an aspect, a second axial surface 213B (e.g., upward-facing surface) of the connector body 210B may be or may include a flushed or level surface adapted to form a seal with another flushed or level or flat surface (e.g., a first axial surface 262B of a key-member body 260B of a corresponding key member 250B as shown in FIG. 2L). Further, in an aspect, a first axial surface 212B (e.g., downward-facing surface) of the connector body 210B may be or may include another flushed or level surface.

As shown in FIG. 2H, in an aspect, the connector 200B may include a connector-to-key-interface arrangement 240B extending from the second axial end surface 213B of the connector body 210B. In an aspect, the connector-to-key-interface arrangement 240B of the connector 200B may, similar to the connector-to-key-interface arrangement 240 of the connector 200, include (i) the at least one protrusion element 241 (as described in FIG. 2A above) and (ii) the further guide post 245 (as described in FIG. 2A above) extending from the second axial end surface 213B of the connector body 210B.

In an aspect, the corresponding key member 250B (shown in FIG. 2L), which may be configured to mate with the connector 200B, may include a key-to-connector-interface arrangement 270B. The key-to-connector-interface arrangement 270B of the corresponding key member 250B may, similar to the key-to-connector-interface arrangement 270 of the key member 250, include (i) the notches 271 (as described in FIG. 2B above) configured to receive the corresponding protrusion element 241 of the connector-to-key-interface arrangement 240B and (ii) the further alignment opening 275 (as described in FIG. 2B above) configured to receive the further guide post 245 of the connector-to-key-interface arrangement 240B of the connector 200B, thereby enabling the corresponding key member 250B to mate with the connector 200B.

With reference to FIG. 2H to FIG. 2K, the connector 200B may, similar to the connector 100 of FIG. 1A and FIG. 1B and the connector 200 of FIG. 2A, and FIGS. 2C to 2F, include a restraining arrangement 220B extending from the inner circumferential surface 216B of the connector body 210B towards the central axis 215B of the connector body 210B. The restraining arrangement 220B may, similar to the restraining arrangement 120 of the connector 100 of FIG. 1A and FIG. 1B and the restraining arrangement 220 of the connector 200 of FIG. 2A, and FIGS. 2C to 2F, include a first restraining member 221B and a second restraining member 226B.

With reference to FIG. 2H and FIG. 2K, the first restraining member 221B of the restraining arrangement 220B of the connector 200B may, similar to the first restraining member 221 of the restraining arrangement 220 of the connector 200, include the plurality of teeth members 221a (as described in FIG. 2A above), extending from the inner circumferential surface 216B of the connector body 210B in an upward manner towards the central axis 215B of the connector body 210B.

Further, the second restraining member 226B of the restraining arrangement 220B of the connector 200B may include a plurality of overhanging catch members 236B, extending from the inner circumferential surface 216B of the connector body 210B in a substantially horizontal manner towards the central axis 215B of the connector body 210B.

With reference to FIGS. 2J and 2K, a free end (e.g., distal end or tip) of each of the plurality of teeth members 221a of the first restraining member 221B may be positioned at a higher level than (or above) a free end of each overhanging catch members 236B of the second restraining member 226B (i.e., when the connector 200B is viewed from the side, in an upright orientation of the connector 200B, as shown in FIGS. 2J and 2K).

Figure 2N:
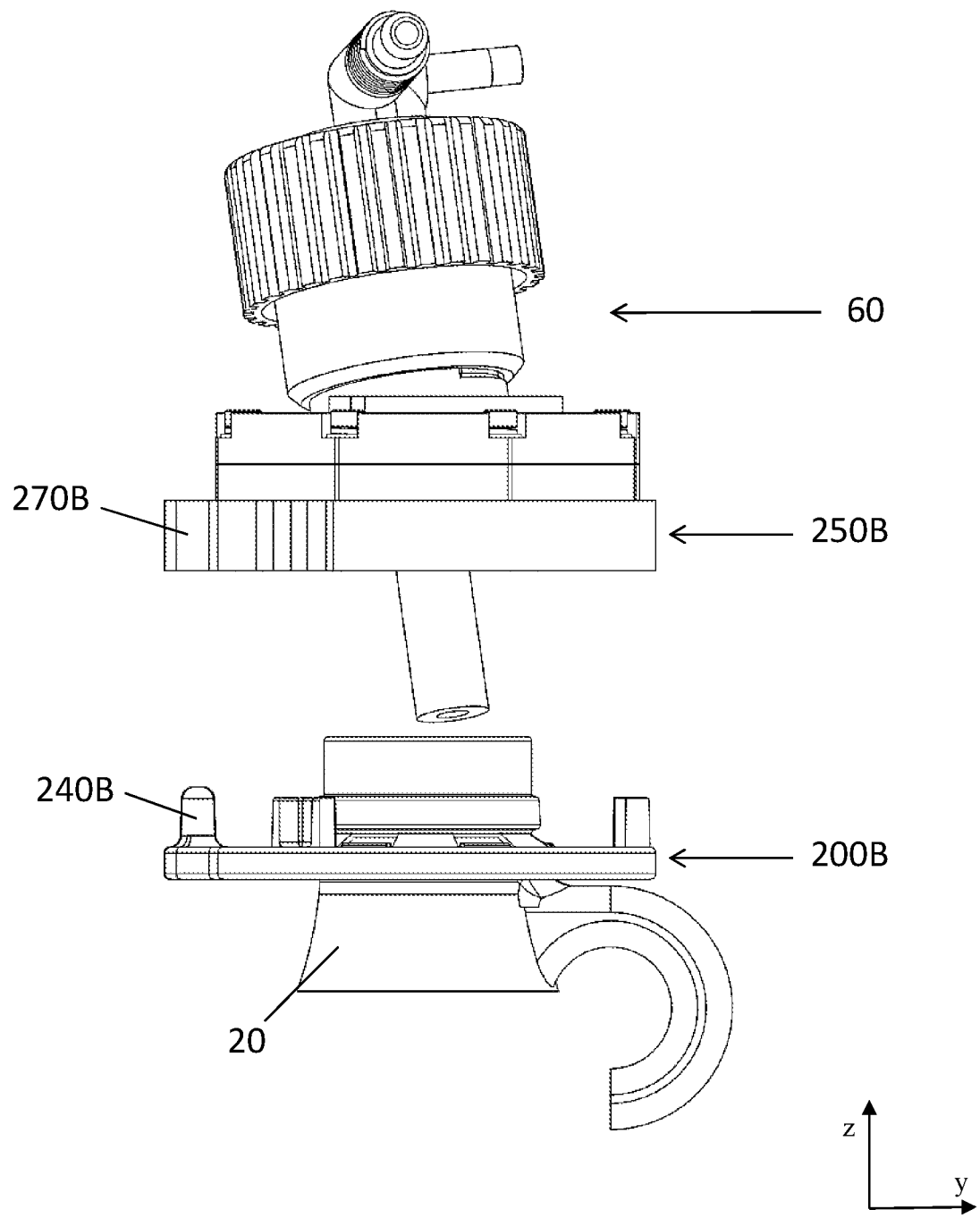
FIG. 2N shows a side view of the liquid dispensing assembly of FIG. 2M, with the corresponding key member detached from the connector, according to an aspect of the present disclosure.
Figure 2O:
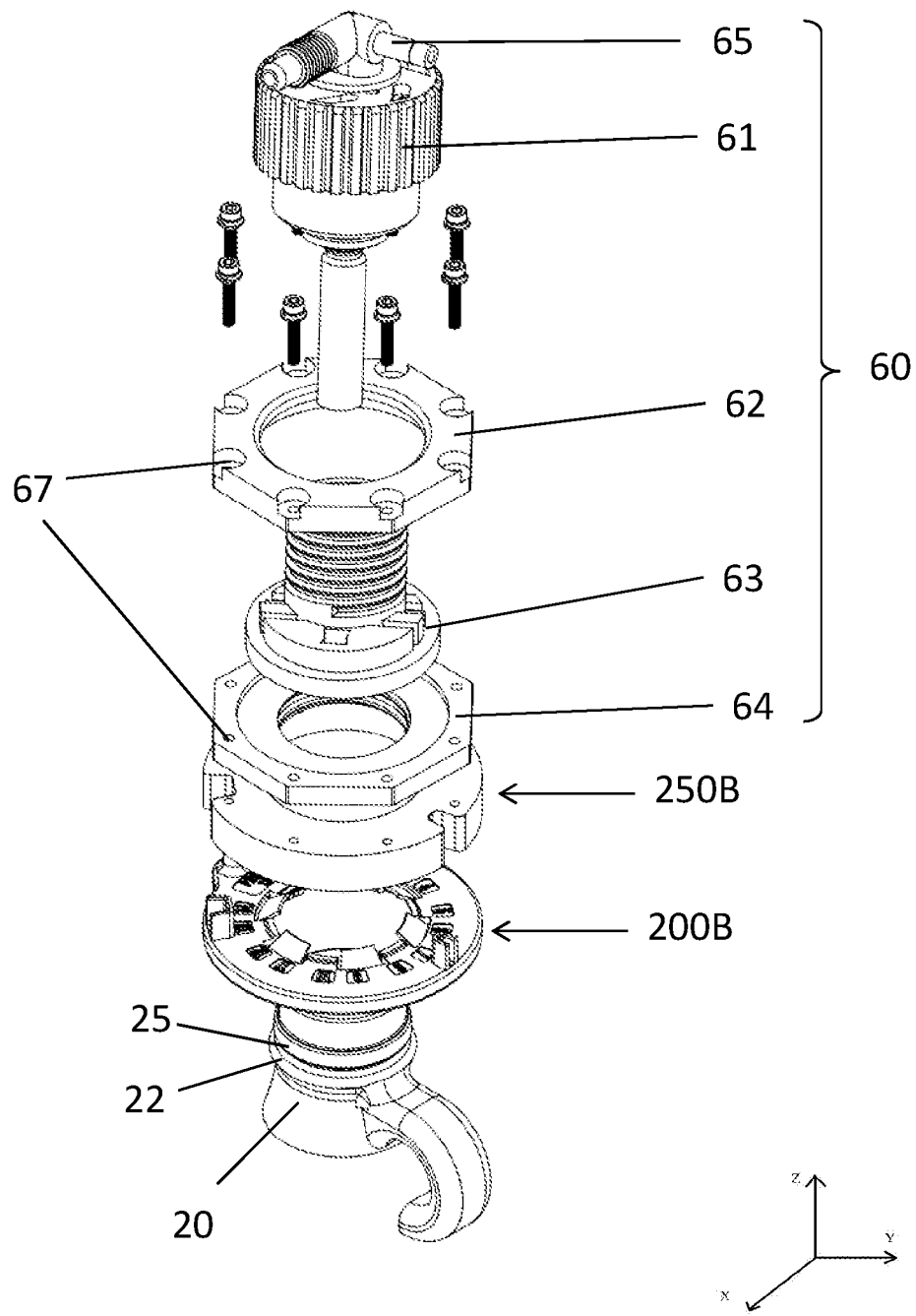
FIG. 2O shows an exploded perspective view of FIG. 2M, according to an aspect of the present disclosure.
Figure 2P:
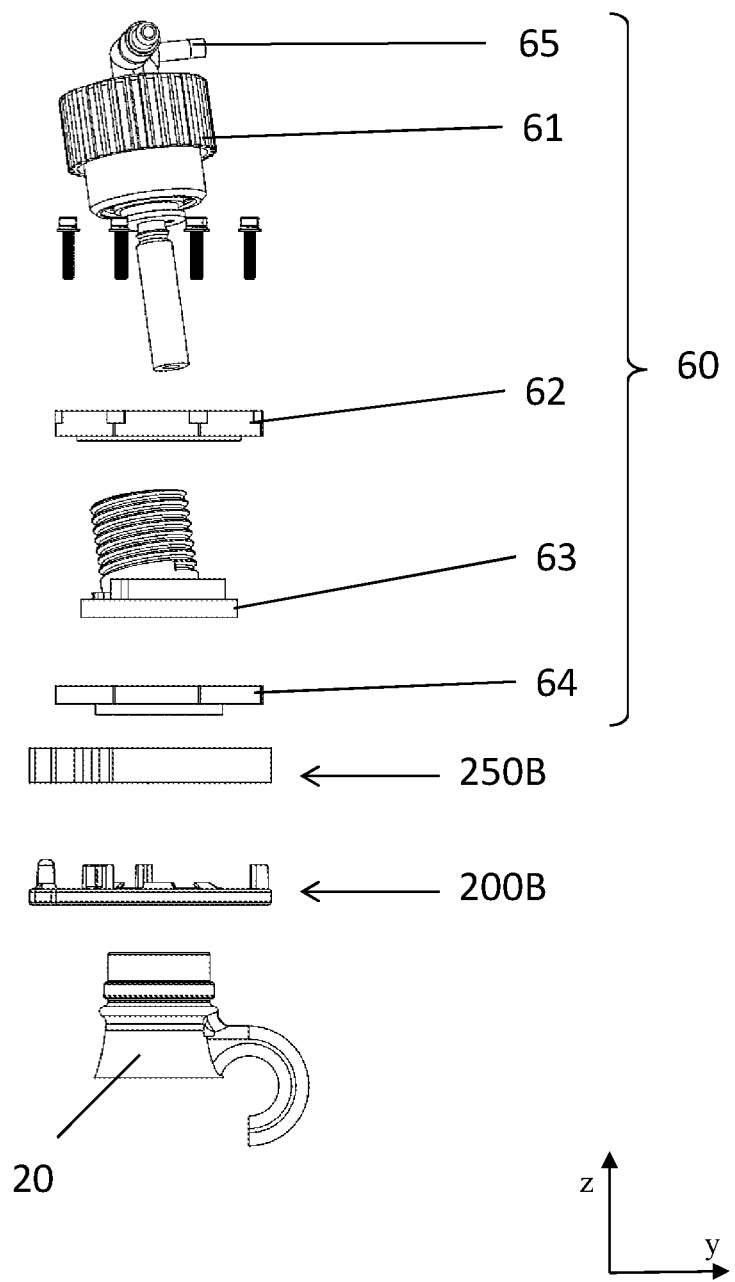
FIG. 2P shows a side view of FIG. 2O, according to an aspect of the present disclosure.

FIG. 2L shows a perspective view of the connector 200B restrained to the neck portion 21 of a liquid container 20, with the corresponding key member 250B mated with the connector 200B, according to an aspect of the present disclosure; FIG. 2M shows a side view of the liquid dispensing assembly 60, together with the corresponding key member 250B mated with the connector 200B, according to an aspect of the present disclosure; FIG. 2N shows a side view of the liquid dispensing assembly 60 of FIG. 2M, with the corresponding key member 250B detached from the connector 200B, according to an aspect of the present disclosure; FIG. 2O shows an exploded perspective view of FIG. 2M, according to an aspect of the present disclosure; FIG. 2P shows a side view of FIG. 2O, according to an aspect of the present disclosure; and FIG. 2Q shows a cross-sectional side view of FIG. 2M, according to an aspect of the present disclosure.

Figure 2Q:
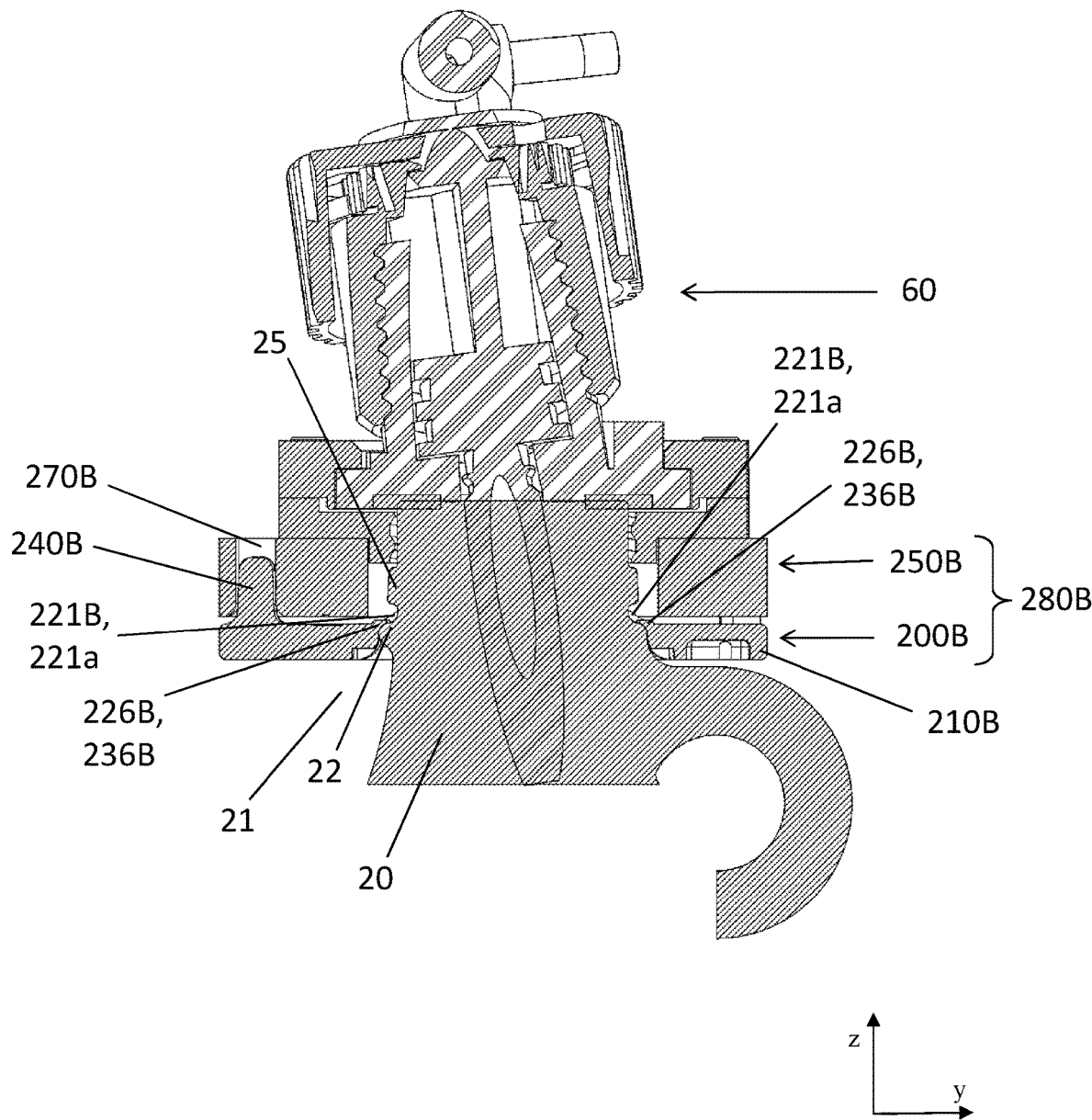
FIG. 2Q shows a cross-sectional side view of FIG. 2M, according to an aspect of the present disclosure.

With reference to FIG. 2Q, in an aspect, the free end of each of the plurality of teeth members 221a of the first restraining member 221B may abut or push against a downward-facing side or surface of the upper fastening element 25 of the liquid container 20, and further, a free end portion of each overhanging catch members 236B of the second restraining member 226B may engage or contact or rest on/above/upon an upward-facing side or surface of the lower fastening element 22 of the liquid container 20, thereby restraining the connector body 210B of the connector 200B to the neck portion 21 of the liquid container 20, at a fixed location on the neck portion 21 of the liquid container 20.

With reference to FIG. 2L, the connector 200B and the key member 250B may together form a connection assembly 280B.

With reference to FIG. 2M and FIG. 2N, the key member 250B may be attached to a base of the liquid dispensing assembly 60, while the connector 200B may be restrainably attached to the neck portion 21 of the liquid container 20. Accordingly, by way of the key-to-connector-interface arrangement 270B of the key member 250B, which may be configured to interface or mate with the connector-to-key-interface arrangement 240B (e.g., a unique mechanical pattern or code) of the connector 200B, thereby forming an interface joint 88B, the connection assembly 280B may permit connection of the liquid container 20 to an intended (e.g., to only an intended) liquid dispensing assembly 60.

FIG. 3A shows a perspective view of a connector 300, without any secondary guide posts, and having a first and a second restraining members 321 and 326 for sandwiching a lower fastening element therebetween, according to an aspect of the present disclosure.

According to an aspect of the present disclosure, there may be provided the connector 300 which may be restrainably attachable or couplable or mountable to a neck portion 31 of a liquid container 30 (described below), for permitting or so as to permit connection of the liquid container 30 to a corresponding key member 350 (as shown in FIG. 3G to FIG. 3J) having a key-to-connector-interface arrangement 370 that is configured to interface or mate with a connector-to-key-interface arrangement 340 of the connector 300.

In an aspect, the connector 300 may contain any or all the features and/or limitations of the connector 100 of FIG. 1A and FIG. 1B and/or the connector 200 of FIG. 2A, FIG. 2C to FIG. 2F and/or the connector 200B of FIG. 2H to FIG. 2K. In the following, the connector 300 is described with like reference characters generally referring to the same or corresponding parts/features of the connector 100 of FIG. 1A and FIG. 1B and/or the connector 200 of FIG. 2A, and FIGS. 2C to 2F and/or the connector 200B of FIG. 2H to FIG. 2K. The description of the parts/features made with respect to connector 300 is also applicable with respect to the connector 100 of FIG. 1A and FIG. 1B and/or the connector 200 of FIG. 2A, FIG. 2C to FIG. 2F and/or the connector 200B of FIG. 2H to FIG. 2K, and vice versa.

Figure 3D:
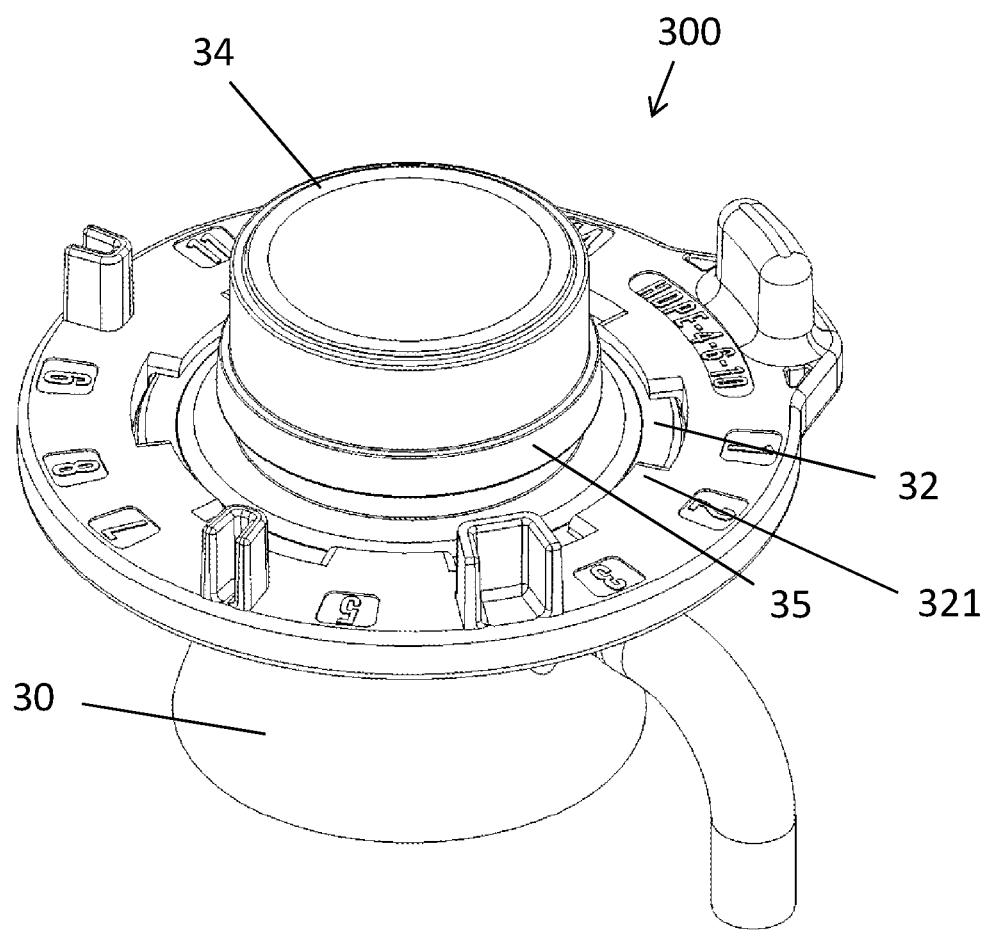
FIG. 3D shows a perspective view of the connector of FIG. 3A restrained to a neck portion of a liquid container, according to an aspect of the present disclosure.
Figure 3E:
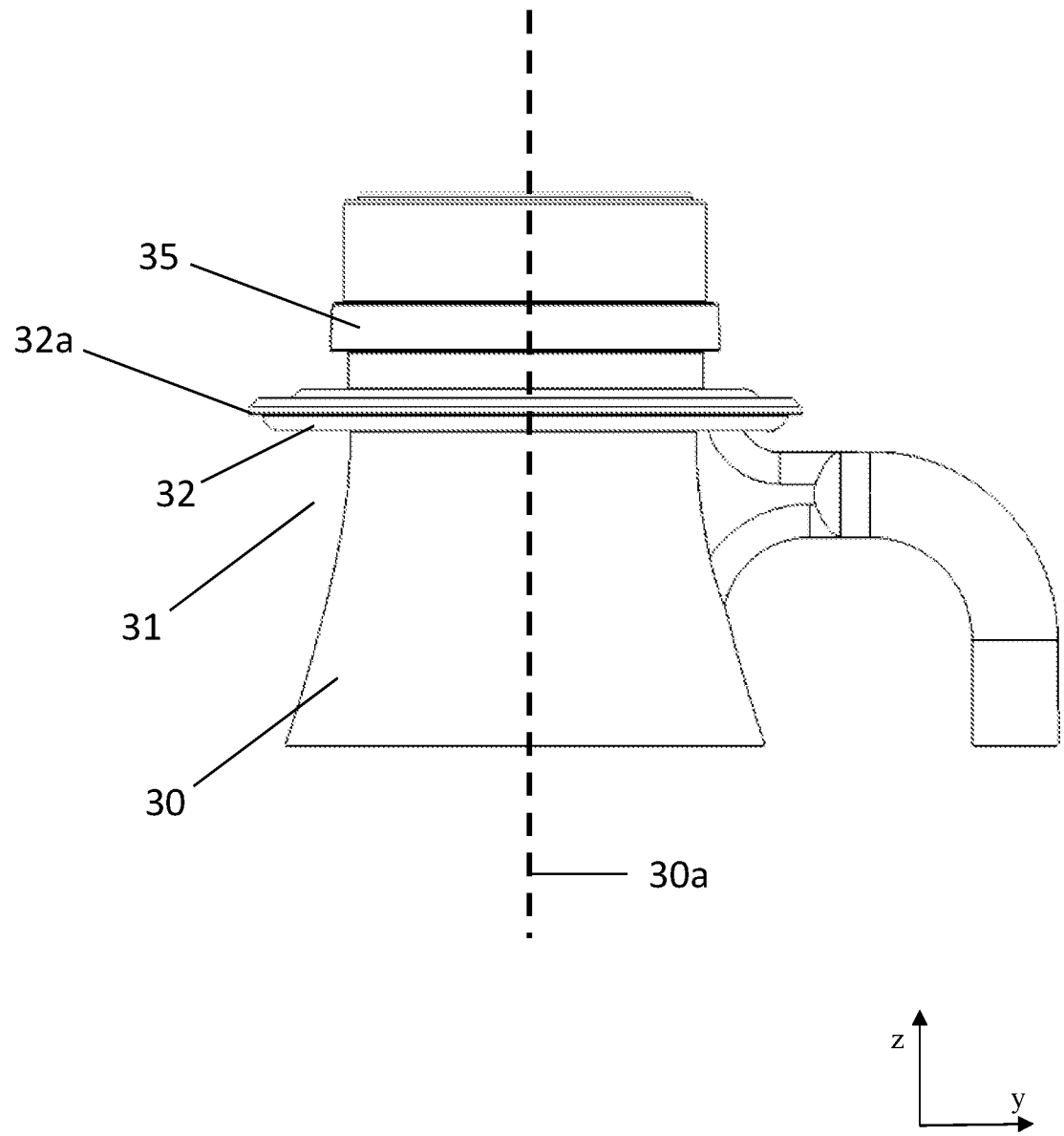
FIG. 3E shows a side view of the liquid container of FIG. 3D, according to an aspect of the present disclosure.
Figure 3F:
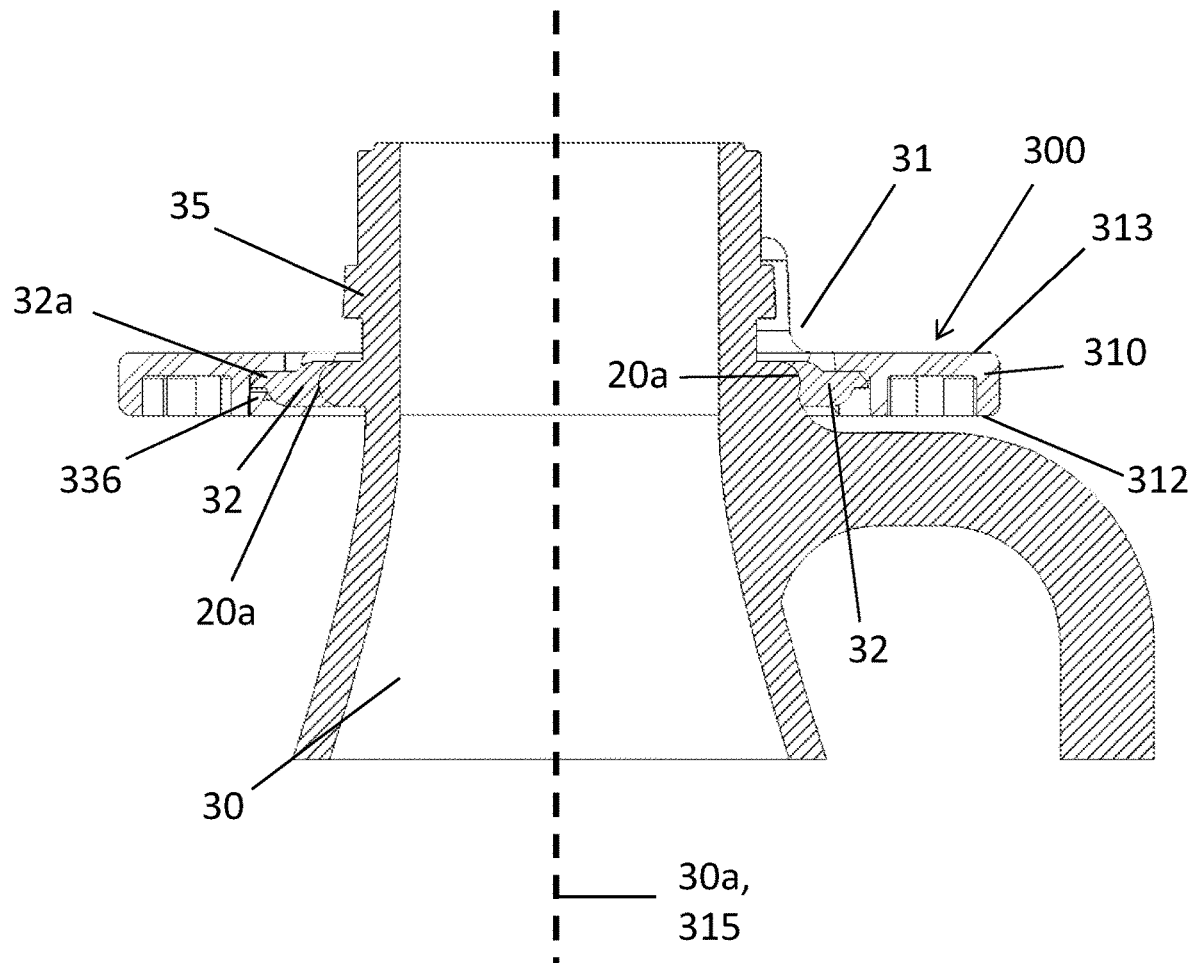
FIG. 3F shows a partial cross-sectional side view of the connector of FIG. 3A restrained to the liquid container of FIG. 3D, according to an aspect of the present disclosure.

FIG. 3E shows a side view of the liquid container 30, according to an aspect of the present disclosure; and FIG. 3F shows a partial cross-sectional side view of the connector 300 restrained to the liquid container 30, according to an aspect of the present disclosure.

With reference to FIG. 3E and FIG. 3F, the liquid container 30 may, similar to the liquid container 10 of FIG. 1A and FIG. 1B and/or the liquid container 20 of FIG. 2C to FIG. 2F, include an upper fastening element 35 and a lower fastening element 32. As shown, an outer diameter of the lower fastening element 32 of the liquid container 30 may be wider than an outer diameter of the upper fastening element 35. For example, the lower fastening element 32 may have an outer diameter of approximately 51 to 54 mm, and the upper fastening element 35 may have an outer diameter of approximately 35 to 38 mm. Further, as shown in FIG. 3E and FIG. 3F, the lower fastening element 32 of the liquid container 30 may include a catch element 32a at a free end region (e.g., distal end region) of the lower fastening element 32. As shown, the catch element 32a may include a first surface (e.g., lower or downward-facing surface) which may be substantially flat along a lateral/horizontal plane (or substantially perpendicular with respect to a central axis 30a of the liquid container 30), and a second surface (e.g., upper or upward-facing surface) which may include a curved or rounded upward-facing portion at a free end region (e.g., distal end region) of the second surface. As an illustration, the outer diameter of the lower fastening element 32 of the liquid container 30 may be wider than an outer diameter of the lower fastening element 22 of the liquid container 20 of FIG. 2C to FIG. 2F. Accordingly, as an example (with reference to FIG. 3F showing an outline 20a of the liquid container 20 against a cross-section of the liquid container 30), the liquid container 20 of FIG. 2C to FIG. 2F may be modified to the liquid container 30 of FIG. 3E and FIG. 3F by enlarging (or widening) the lower fastening element 22 of the liquid container 20 of FIG. 2C to FIG. 2F as well as incorporating the catch element 32a at a free end region (e.g., distal end region) of a modified lower fastening element of the liquid container 20 of FIG. 2C to FIG. 2F.

With reference to FIG. 3A, the connector 300 may include a connector body 310. The connector body 310 may have or may include a circular shape (e.g., disc shape or a doughnut shape) with an inner circumferential surface 316 and an outer circumferential surface 317. As an example, the inner circumferential surface 316 of the circular connector body 310 may have a diameter of approximately 50 to 60 mm, and the outer circumferential surface 317 of the circular connector body 310 may have a diameter of approximately 70 to 80 mm.

In an aspect, the connector 300 may, similar to the connector 100 of FIG. 1A and FIG. 1B and/or the connector 200 of FIG. 2A, FIG. 2C to FIG. 2F and/or the connector 200B of FIG. 2H to FIG. 2K, include a restraining arrangement 320 extending away from the inner circumferential surface 316 of the connector body 310, in an inward direction towards the central axis 315. The restraining arrangement 320 may, similar to the restraining arrangement 120 of the connector 100 of FIG. 1A and FIG. 1B and/or the restraining arrangement 220 of the connector 200 of FIG. 2A, FIG. 2C to FIG. 2F and/or the restraining arrangement 220B of the connector 200B of FIG. 2H to FIG. 2K, include a first restraining member 321 and a second restraining member 326.

As shown, the first restraining member 321 of the restraining arrangement 320 of the connector 300 may include a plurality of teeth members (e.g., tooth-shaped structures) extending laterally away from the inner circumferential surface 316 of the connector body 310 towards the central axis 315. In other words, the first restraining member 321 of the restraining arrangement 320 may extend in a substantially horizontal manner towards the central axis 315 of the connector body 110.

Further, as shown, the second restraining member 326 of the restraining arrangement 320 of the connector 300 may include a plurality of foot catch members 336 extending in a substantially horizontal manner towards the central axis 315.

FIG. 3C shows a close-up view of a single foot catch member 336 of the second restraining member 326 of the connector 300, according to an aspect of the present disclosure.

With reference to FIG. 3C, each foot catch member 336 may include a first surface 336a (e.g., upper or upward-facing surface) substantially parallel with the second axial surface 313 of the connector body 310 (or substantially perpendicular with respect to the central axis 315), and a second surface 336b (e.g., lower or downward-facing surface) positioned in an inclined or sloping manner with respect to the second axial surface 313 of the connector body 310. As shown, the first surface 336a (e.g., upper or upward-facing surface) may be a horizontally-positioned and substantially flat surface, and the second surface 336b (e.g., lower or downward-facing surface) may be inclinedly-positioned so as to be slopping downwards from a free end (e.g., distal end or tip) of the foot catch member 336 (or distal edge of the first surface 336a) towards the inner circumferential surface 316 of the connector body 310 (or towards the first axial surface 312). For example, the second surface 336b may be sloping at an acute angle, α (e.g., between 40° to 60°), with respect to the first axial surface 312 of the connector body 310. Each foot catch member 336 may have or may include, but is not limited to, a thickness, $t_1$ (e.g., approximately 2 mm). In an aspect, the second restraining member 326 (e.g., each of the plurality of foot catch members 336) may be shaped or configured in a manner to facilitate snapping (or fitting) of the restraining arrangement 320 of the connector 300 onto (or over) the lower fastening element 32 of the liquid container 30, by way of a downward motion of the connector body 310 along the neck portion 31 of the liquid container 30, from the mouth 34 of the liquid container 30 towards a base of the liquid container 30.

FIG. 3B shows a cross-sectional view of the connector 300 taken along A-A of FIG. 3A, according to an aspect of the present disclosure; and FIG. 3D shows a perspective view of the connector 300 restrained to the neck portion 31 of the liquid container 30, according to an aspect of the present disclosure.

With reference to FIG. 3B, the first restraining member 321 and the second restraining member 326 may be arranged in a longitudinally spaced apart manner (e.g., along a direction parallel with the central axis 315) from each other, such that the first restraining member 321 may be closer to the second axial surface 313 than the second restraining member 326. In other words, the first restraining member 321 may be positioned on a first plane (e.g., lateral/horizontal plane) relative to the central axis 315 and the second restraining member 326 may be positioned on a second plane (e.g., lateral/horizontal plane) relative to the central axis 315, with the first plane being closer to the second axial surface 313 of the connector body 310 than the second plane. In an aspect, the first restraining member 321 may be arranged to form a flush surface with the second axial surface 313 (e.g., upward-facing surface) of the connector body 310, and the second restraining member 326 may be arranged to form another flush surface with the first axial surface 312 (e.g., downward-facing surface) of the connector body 310. In particular, in an aspect, an upper surface of the first restraining member 321 (e.g., of each of the plurality of teeth members) may be immediately or directly adjoined to the second axial surface 313 of the connector body 310, and the lower surface of the second restraining member 326 (e.g., of each of the plurality of foot catch members 336) may be immediately or directly adjoined to the first axial surface 312 of the connector body 310. As an example, a thickness of the connector body 310 between the first axial surface 312 and the second axial surface 313 may be approximately 5 mm. The restraining arrangement 320 may define a gap or space (e.g., approximately 1.8 mm) between the first and the second restraining members 321 and 326 configured to or for or sized to clamp or grip or hold or sandwich the lower fastening element 32 of the liquid container 30 between the first restraining member 321 and the second restraining member 326 (as shown in FIG. 3D). Accordingly, the first restraining member 321 may be configured to engage the neck portion 31 of the liquid container 30 at a first position and the second restraining member 326 may be configured to engage the neck portion 31 of the liquid container 30 at a second position, with the lower fastening element 32 of the liquid container 30 sandwiched between the first restraining member 321 and the second restraining member 326.

With reference to FIG. 3A, in an aspect, a length of the first restraining member 321 (e.g., each of the plurality of teeth members) of the restraining arrangement 320 of the connector 300 may be longer than a length of the second restraining member 326 (e.g., each of the plurality of plurality of foot catch members 336). Accordingly, a respective free end (or tip) of the first restraining member 321 may be further away from the inner circumferential surface 316 (in other words, closer to the central axis 315) than a respective free end (or tip) of the second restraining member 326, for example, when looking in a direction along (e.g., parallel with and into) the central axis 315 (e.g., when looking into the z-axis of FIG. 3A).

Further, with reference to FIG. 3A, according to an aspect of the present disclosure, the connector 300 may, similar to the connector 100 of FIG. 1A and FIG. 1B and/or the connector 200 of FIG. 2A, FIG. 2C to FIG. 2F and/or the connector 200B of FIG. 2H to FIG. 2K, include the connector-to-key-interface arrangement 340. As shown in FIG. 3A, the connector-to-key-interface arrangement 340 of the connector 300 may, similar to the connector-to-key-interface arrangement 240 of the connector 200 of FIG. 2A, FIG. 2C to FIG. 2F, include at least one protrusion element 341 extending away from the second axial surface 313 of the connector body 310. As shown, the connector body 310 may, similar to the connector-to-key-interface arrangement 240 of the connector 200 of FIG. 2A, FIG. 2C to FIG. 2F, include markings or engravings (e.g., numerals, e.g., "1" to "14", and/or a unique part number and/or identification number) on the first and/or the second axial surfaces 362 and 363 of the connector body 310. As shown, the connector-to-key-interface arrangement 340 of the connector 300 may include three protrusion elements 341, respectively positioned along or adjacent to numeral markings "3", "7" and "13".

As shown, each protrusion element 341 of the connector-to-key-interface arrangement 340 of the connector 300 may, similar to the connector-to-key-interface arrangement 240 of the connector 200 of FIG. 2A, FIG. 2C to FIG. 2F, include a reinforcing rib portion 342 protruding laterally (e.g., along a direction substantially parallel with the second axial surface 313 of the connector body 310) from a side surface or wall of the protrusion element 341. As shown, each (or all) of the protrusion elements 341 of the connector-to-key-interface arrangement 340 of the connector 300 may include or may be in a form of a "U" shape. Accordingly, one or a combination of (i) a position, (ii) a distance (e.g., from the central axis 315), and/or (iii) a size of the "U" shaped protrusion element(s) 341 of the connector-to-key-interface arrangement 340 of the connector 300 may be varied to contribute to or for forming or so as to form the unique mechanical pattern or code of the connector-to-key-interface arrangement 340 of the connector 300.

As shown, one of the "U" shaped protrusion elements 341a (e.g., "primary protrusion element") may be larger than the remaining or other "U" shaped protrusion elements 341b (e.g., "secondary protrusion element(s)") of the connector-to-key-interface arrangement 340. In an aspect, the primary protrusion element 341a, being larger in size, may serve as a visual indicator with respect to an orientation of the connector-to-key-interface arrangement 340 on the second axial surface 313 of the connector body 310.

Further, as shown, each "U" shaped protrusion element 341 of the connector-to-key-interface arrangement 340 of the connector 300 may include at least one (e.g., a pair of) rounded or bevelled inner or inward-facing side corners/edges (e.g., vertically extending with respect to the second axial surface 313). Accordingly, the at least one (e.g., pair of) rounded or bevelled inner or inward-facing side corners/edges may serve to minimize stress concentration point(s) on the protrusion element 341.

With reference to FIG. 3A, the connector body 310 may include a side protrusion 318 from a portion of the outer circumferential surface 317. As shown, the side protrusion 318 of the connector body 310 may extend along a direction substantially perpendicular to the opposite first and second axial surfaces 312 and 313 of the connector body 310, such that a respective portion 319 of the first axial surface 312 and/or the second axial surface 313 (of the connector body 310) adjoins the side protrusion 318.

The connector-to-key-interface arrangement 340 of the connector 300 may, similar to the connector-to-key-interface arrangement 240 of the connector 200 of FIG. 2A, FIG. 2C to FIG. 2F, further include a guide post 345 (e.g., "primary guide post") extending away from the portion 319 of the second axial surface 313 of the connector body 310 adjoining the side protrusion 318 of the connector body 310, in a substantially perpendicular manner with respect to the second axial surface 313 of the connector body 310. Further, in an aspect, the guide post 345 (i.e., primary guide post) may be longer or taller than each protrusion element 341 of the connector-to-key-interface arrangement 340 (i.e., measured from the second axial surface 313 to a respective free end or tip of the primary guide post 345/protrusion element 341) for serving or to serve as a main alignment aid to the corresponding key member 350 (as shown in FIG. 3G to FIG. 3J). For example, the guide post 345 may have a height of approximately 8 to 15 mm, while the protrusion elements 341 may have a height of approximately 4 to 10 mm. As shown, the primary guide post 345 may, similar to the primary guide post 245 of the connector 200 of FIG. 2A, have or may include an oblong shape.

Figure 3G:
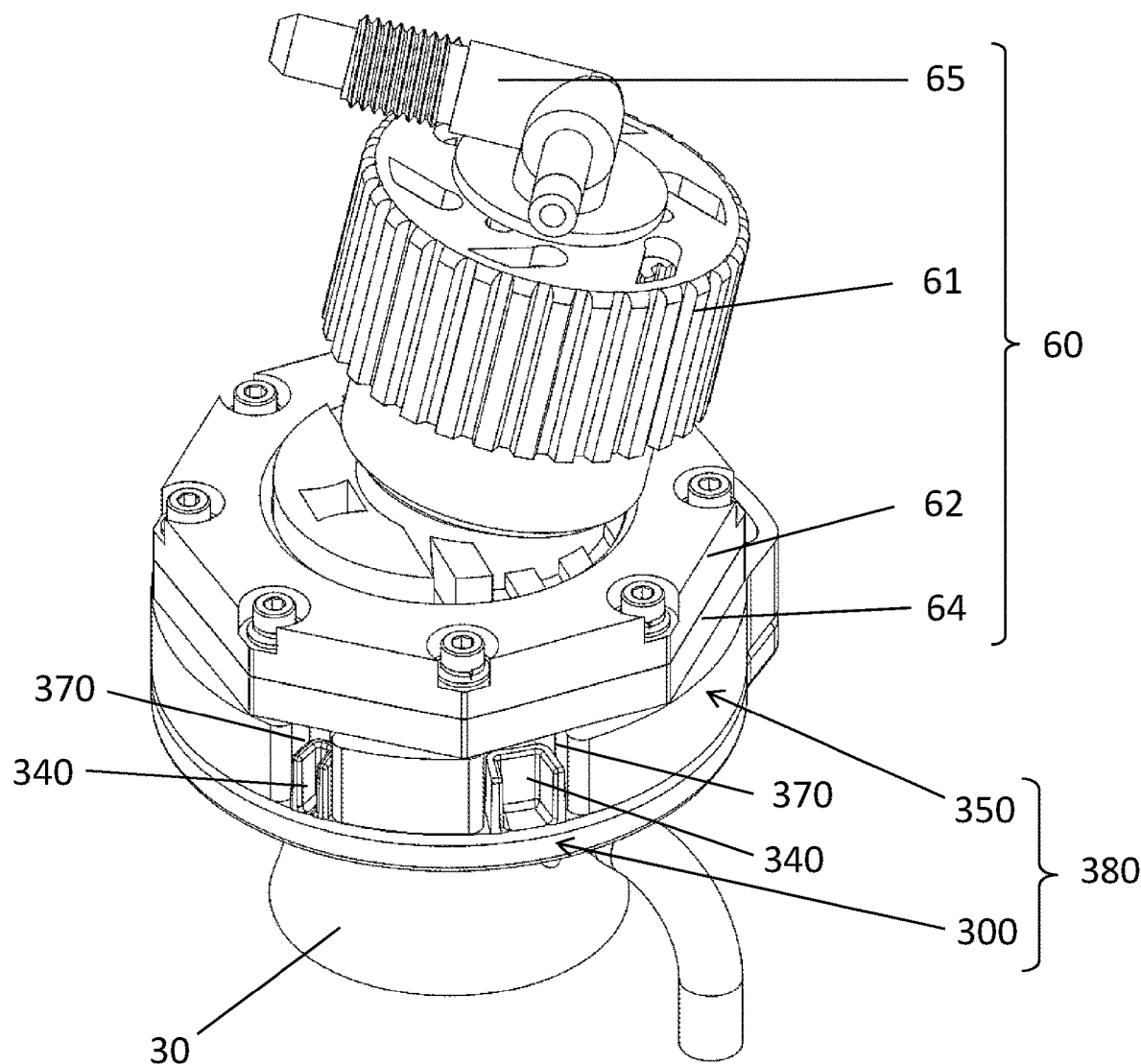
FIG. 3G shows a perspective view of a liquid dispensing assembly, together with a corresponding key member mated with the connector of FIG. 3A, according to an aspect of the present disclosure.
Figure 3H:
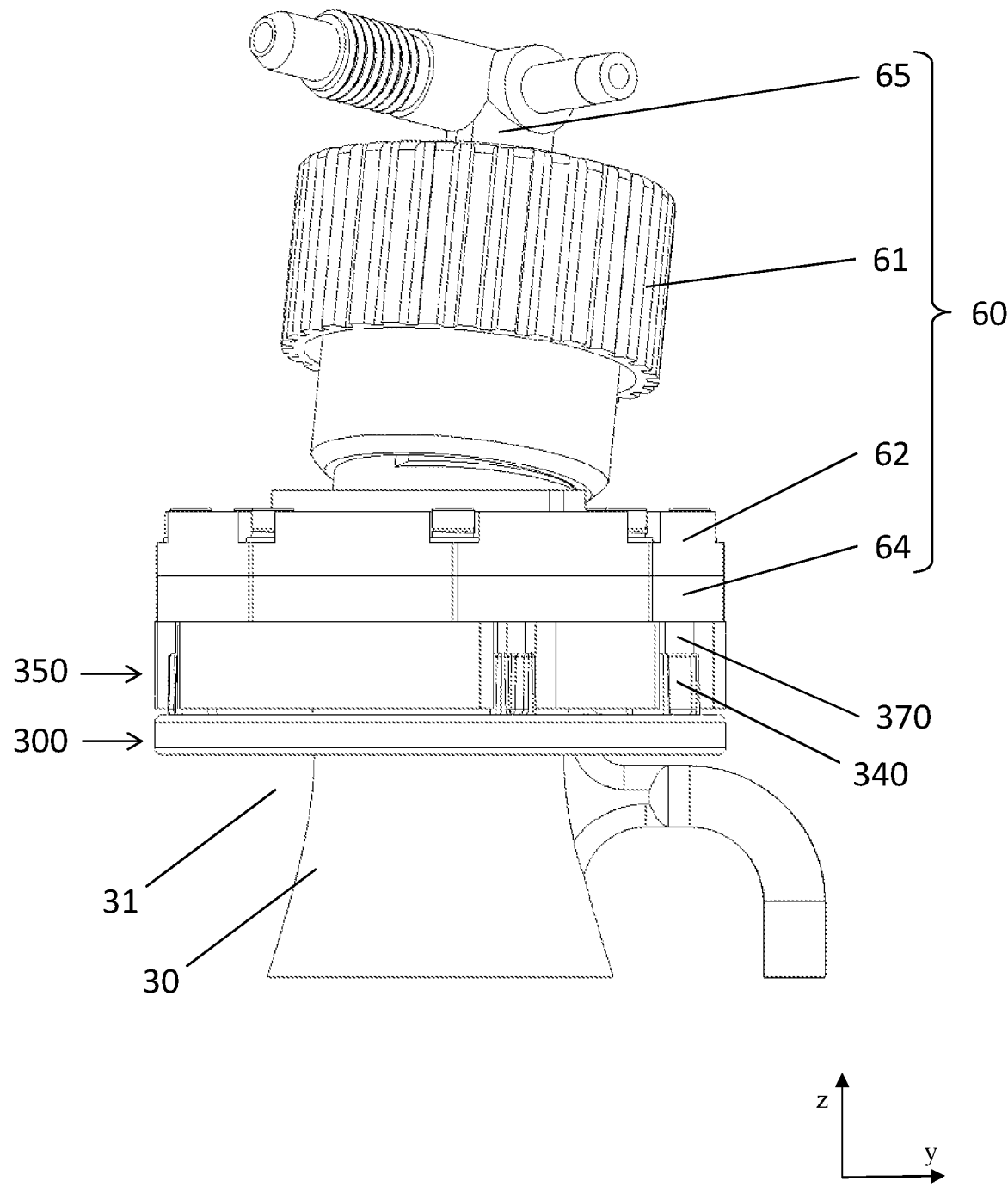
FIG. 3H shows a side view of FIG. 3G, according to an aspect of the present disclosure.
Figure 3I:
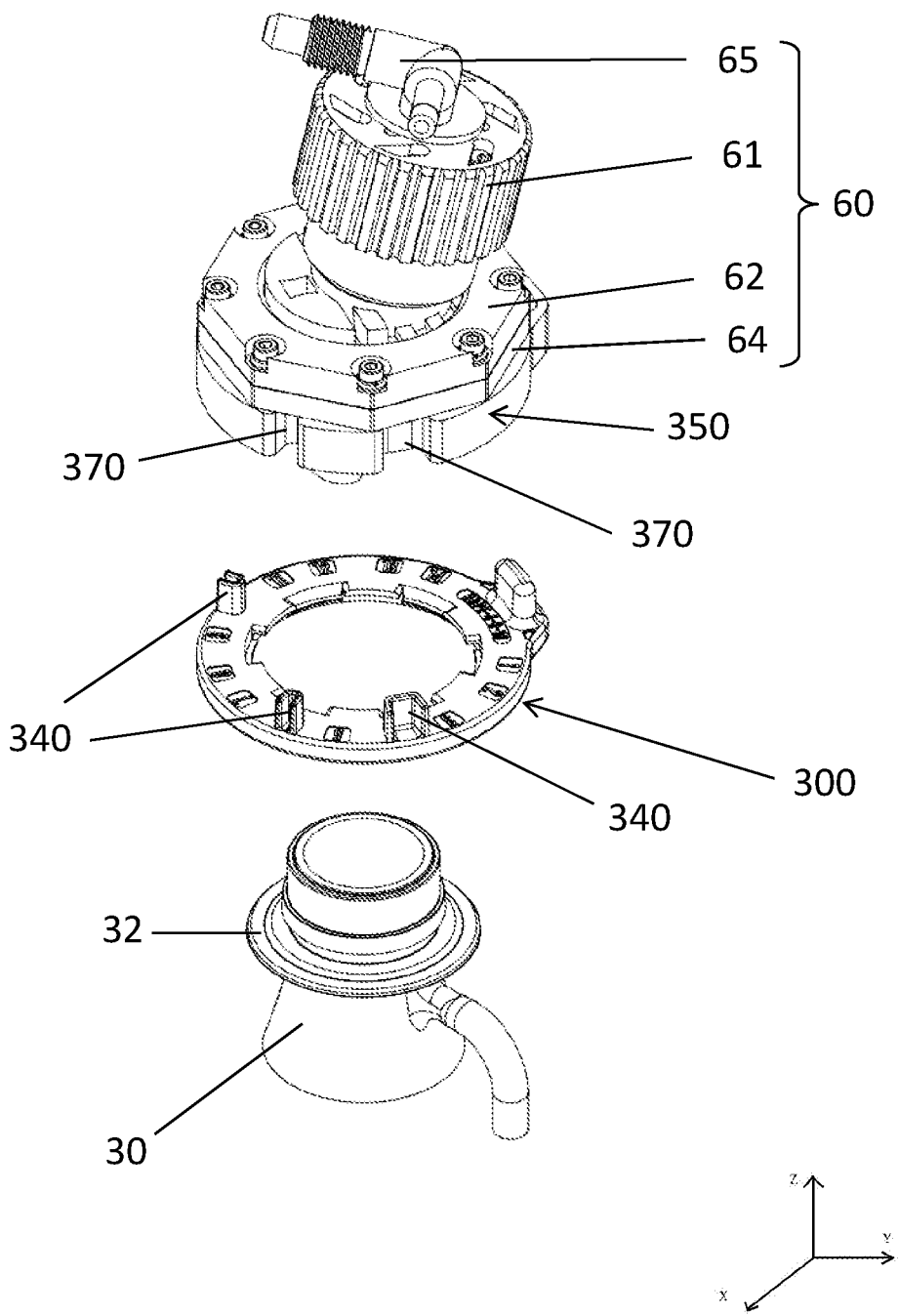
FIG. 3I shows a perspective view of FIG. 3G, with the connector of FIG. 3A detached from both the liquid container and the corresponding key member, according to an aspect of the present disclosure.
Figure 3J:
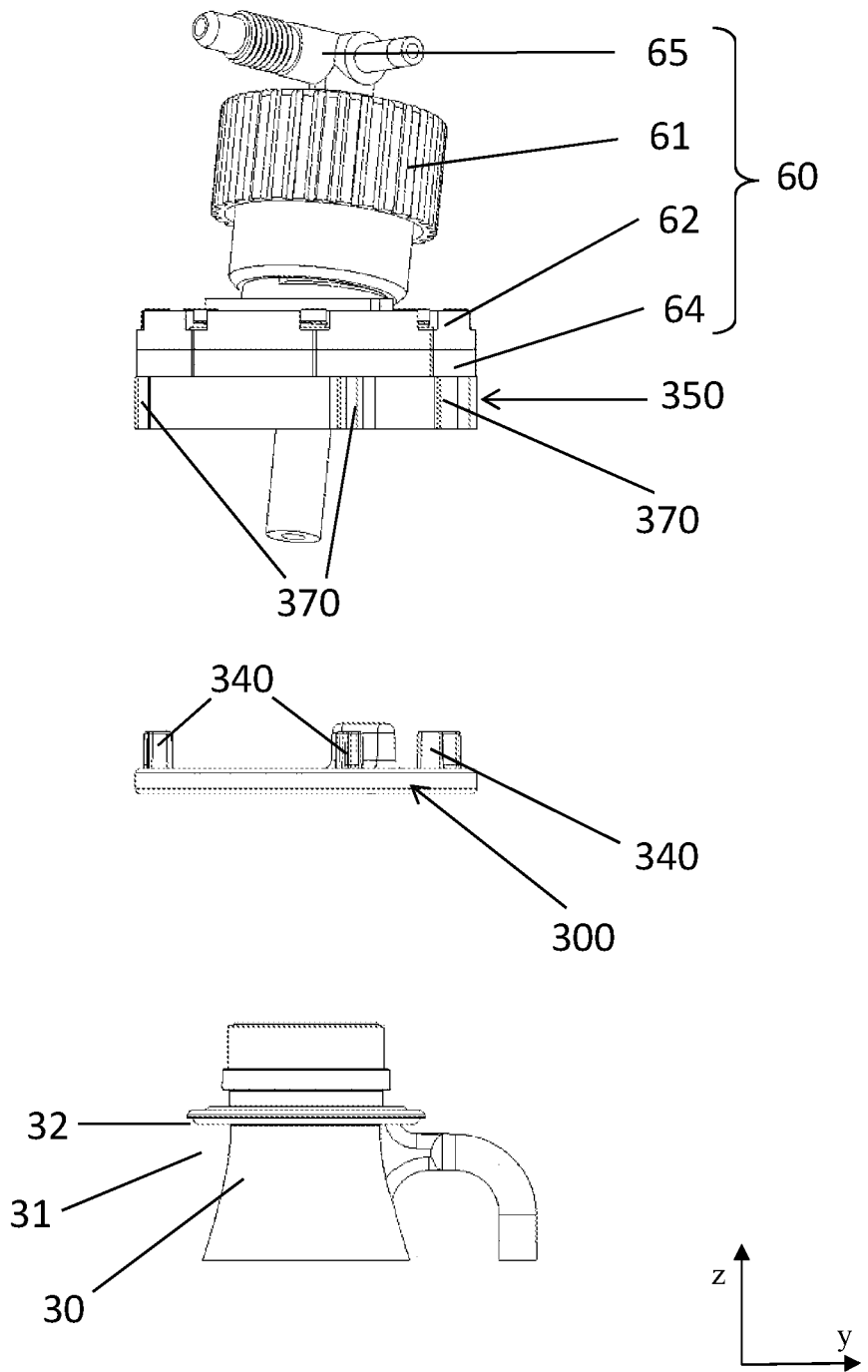
FIG. 3J shows a side view of FIG. 3I, according to an aspect of the present disclosure.

FIG. 3G shows a perspective view of the liquid dispensing assembly 60, together with the corresponding key member 350 mated with the connector 300, according to an aspect of the present disclosure; FIG. 3H shows a side view of FIG. 3G, according to an aspect of the present disclosure; FIG. 3I shows a perspective view of FIG. 3G, with the connector 300 detached from both the liquid container 30 and the corresponding key member 350, according to an aspect of the present disclosure; FIG. 3J shows a side view of FIG. 3I, according to an aspect of the present disclosure; and FIG. 3K shows a cross-sectional side view of FIG. 3G, according to an aspect of the present disclosure.

Figure 3K:
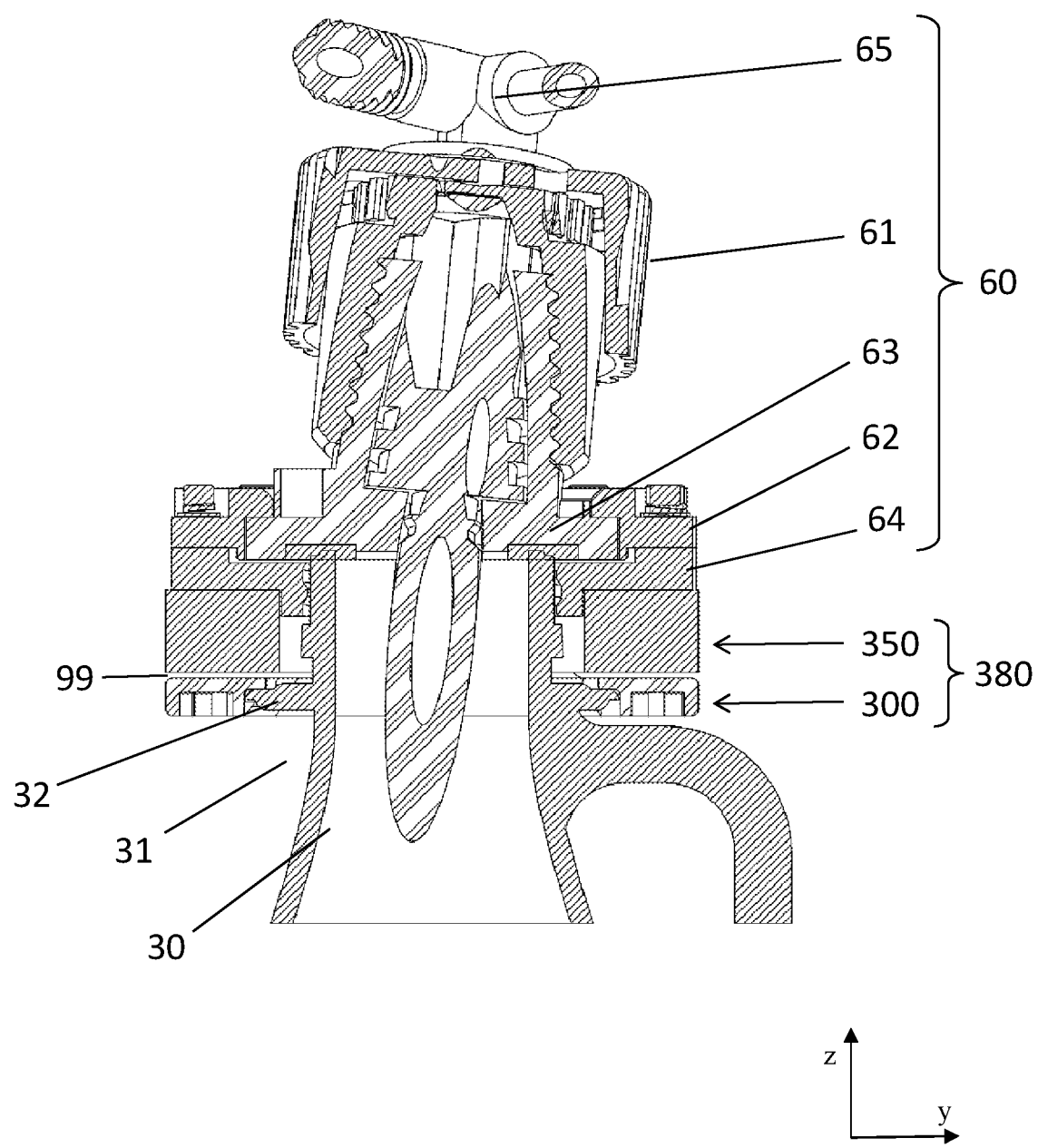
FIG. 3K shows a cross-sectional side view of FIG. 3G, according to an aspect of the present disclosure.

With reference to FIG. 3G and FIG. 3K, in an aspect, the connector 300 and the key member 350 may together form a connection assembly 380.

The key member 350 may be attached to a base of the liquid dispensing assembly 60, while the connector 300 may be restrainably attached to the liquid container 30. Accordingly, by way of the key-to-connector-interface arrangement 370 of the key member 350, which may be configured to interface or mate with the connector-to-key-interface arrangement 340 (e.g., a unique mechanical pattern or code) of the connector 300, thereby forming an interface joint 99, the connection assembly 380 may permit connection of the liquid container 30 to an intended (e.g., predetermined) liquid dispensing assembly 60.

Figure 4A:
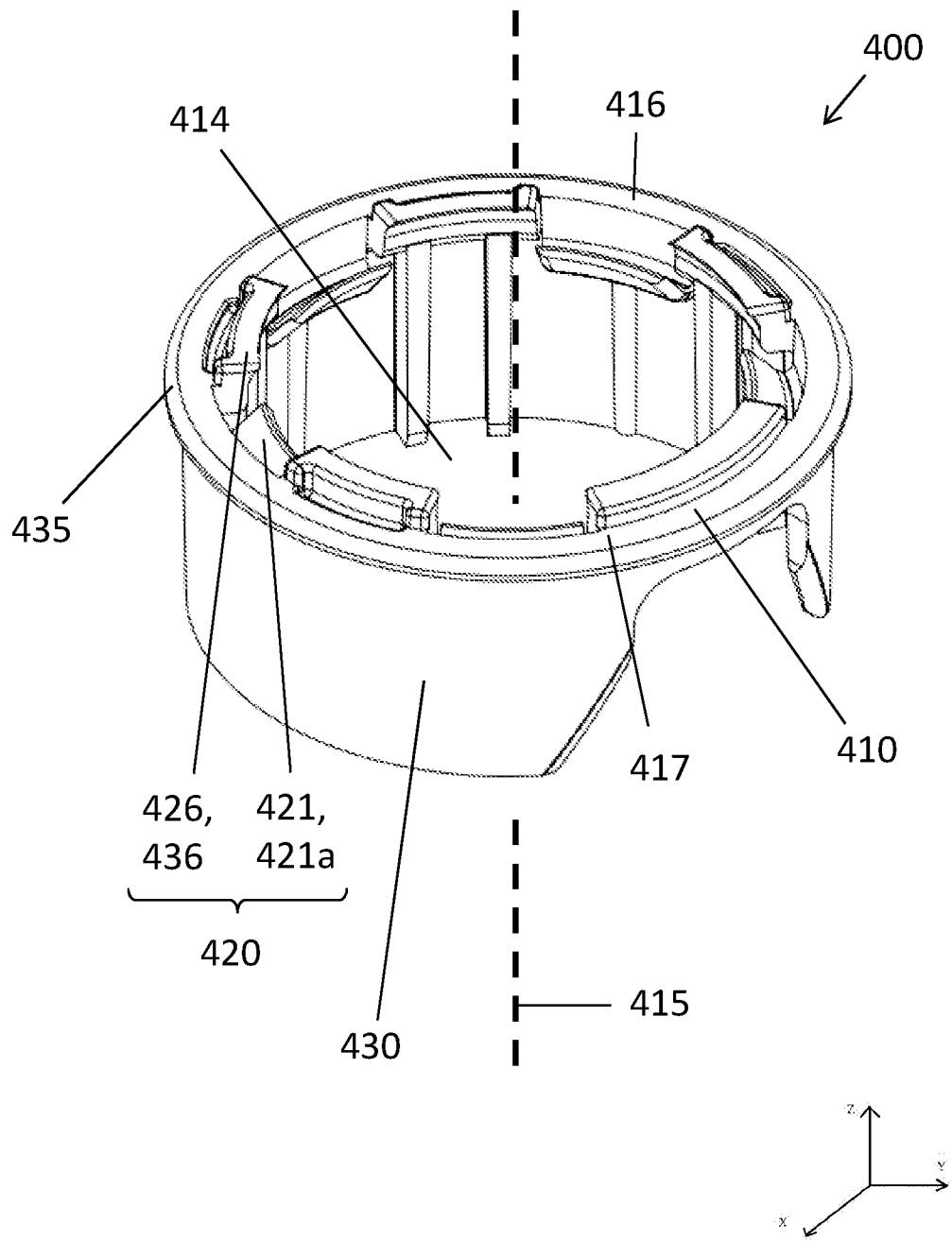
FIG. 4A shows a perspective view of a connector-to-container adaptor, according to an aspect of the present disclosure.
Figure 4B:
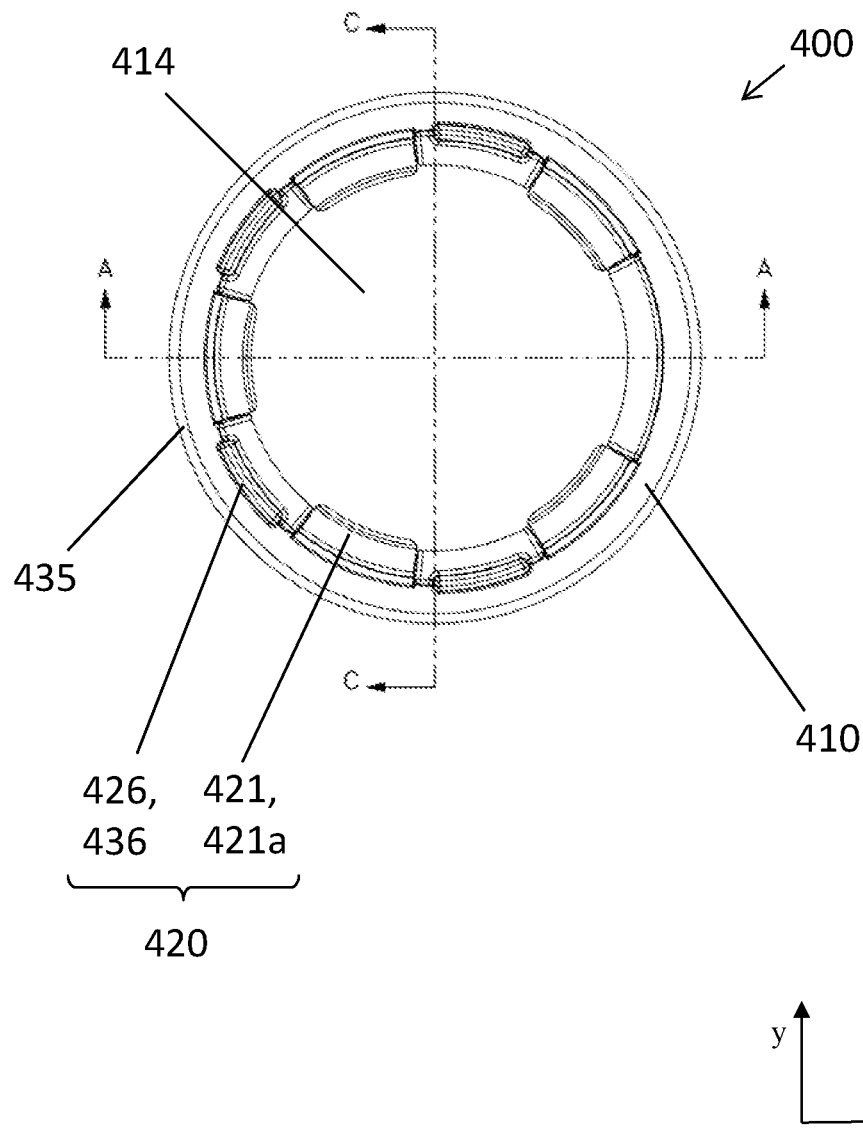
FIG. 4B shows a top view of the connector-to-container adaptor of FIG. 4A, according to an aspect of the present disclosure.
Figure 4C:
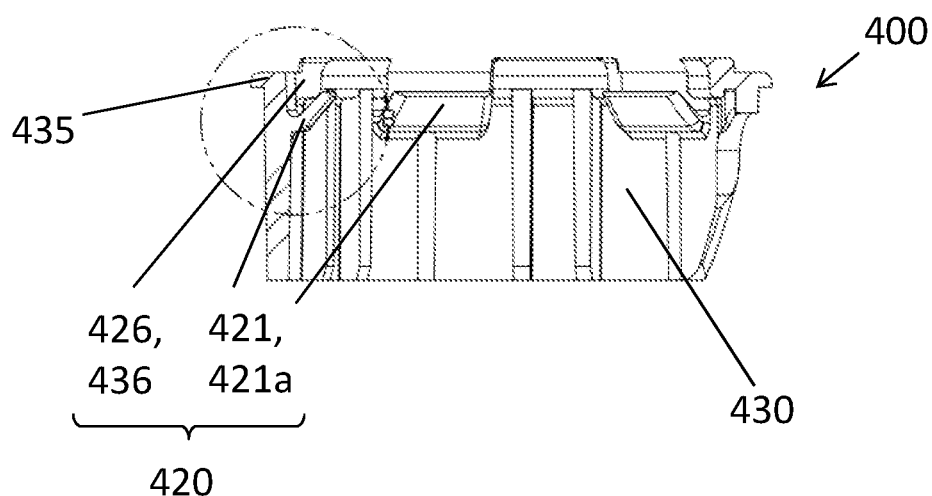
FIG. 4C shows a cross-sectional side view of the connector-to-container adaptor of FIG. 4B taken along A-A, according to an aspect of the present disclosure.
Figure 4D:
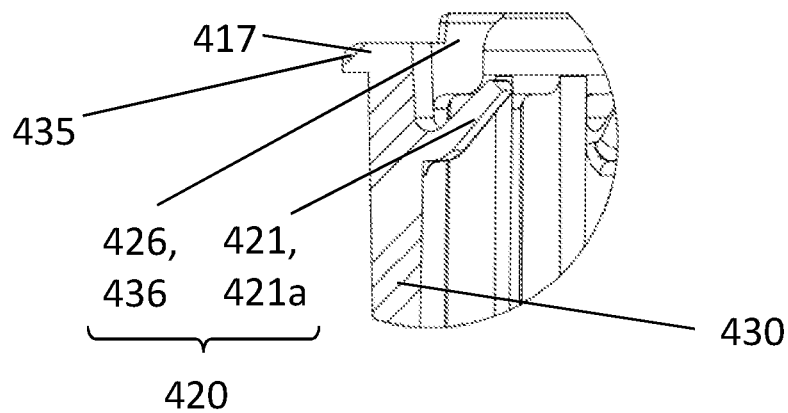
FIG. 4D shows a close-up view of a second restraining member of a restraining arrangement of the connector-to-container adaptor of FIG. 4C, according to an aspect of the present disclosure.
Figure 4E:
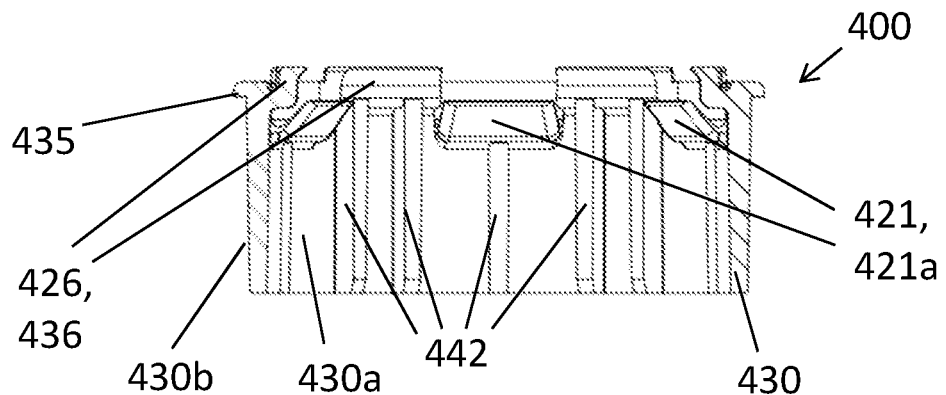
FIG. 4E shows a cross-sectional side view of the connector-to-container adaptor of FIG. 4B taken along C-C, according to an aspect of the present disclosure.
Figure 4F:
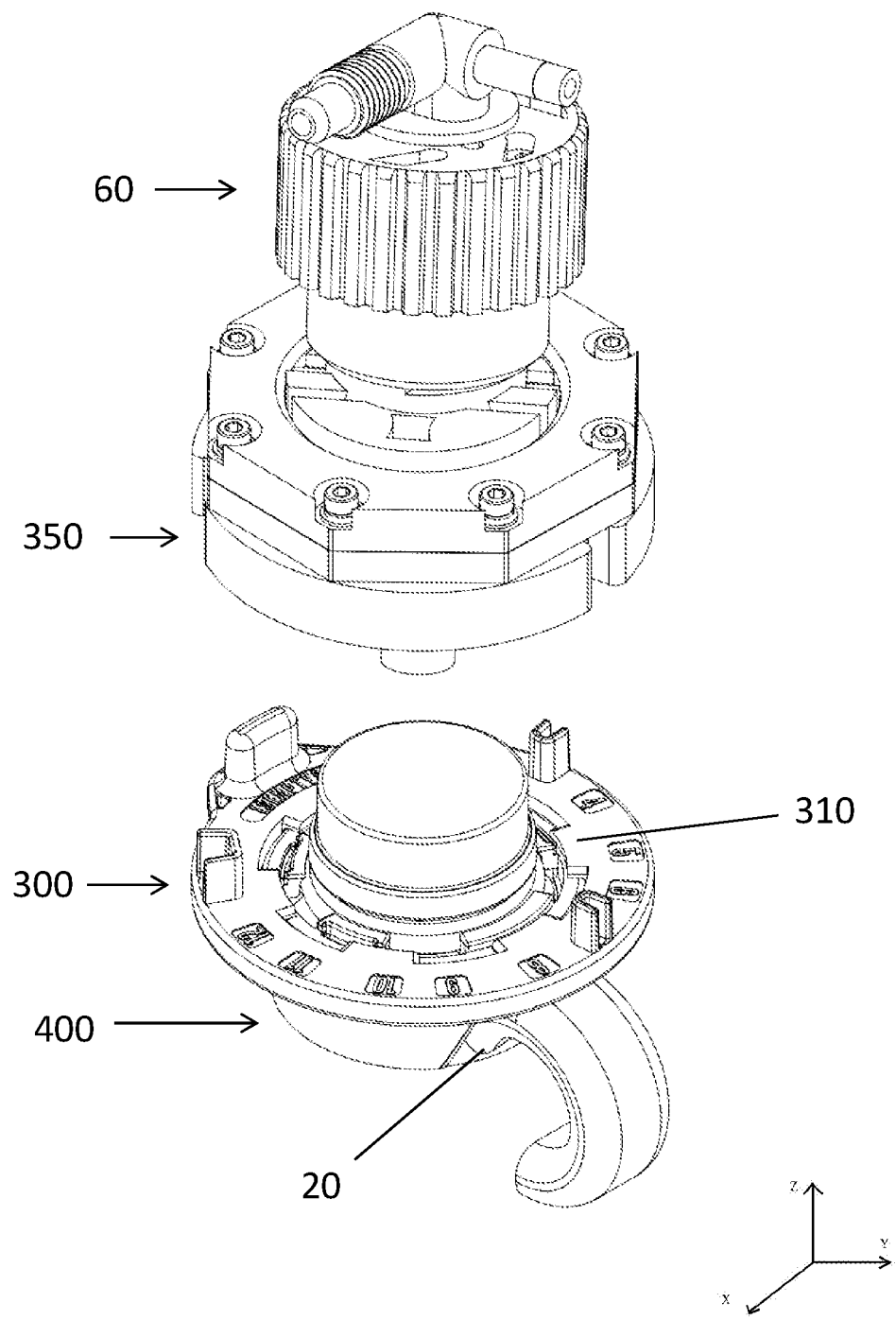
FIG. 4F shows a perspective view of the connector of FIG. 3A attached to a liquid container via the connector-to-container adaptor of FIG. 4A, with a liquid dispensing apparatus and a corresponding key member detached from the connector, according to an aspect of the present disclosure.
Figure 4G:
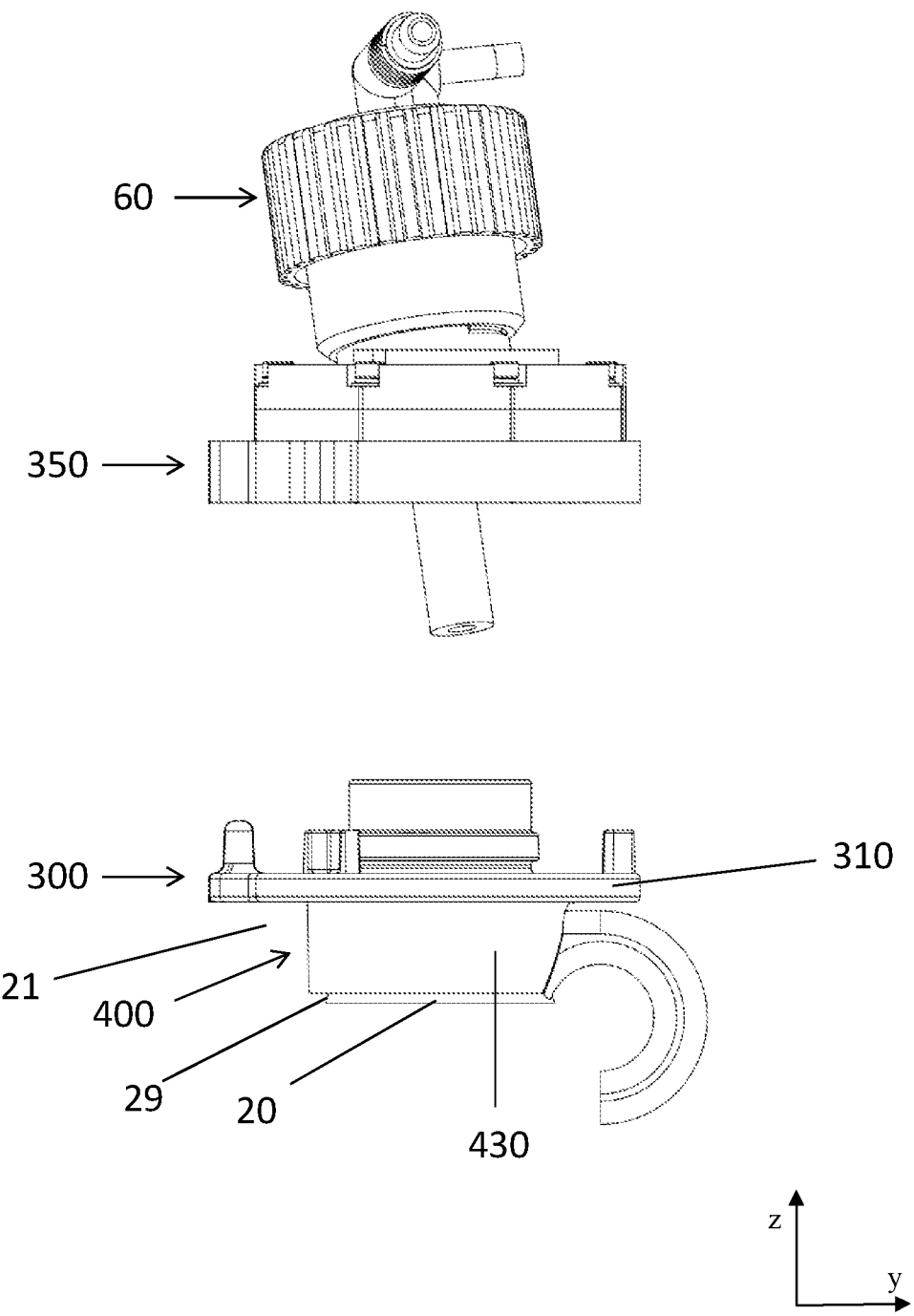
FIG. 4G shows a side view of FIG. 4F, according to an aspect of the present disclosure.
Figure 4H:
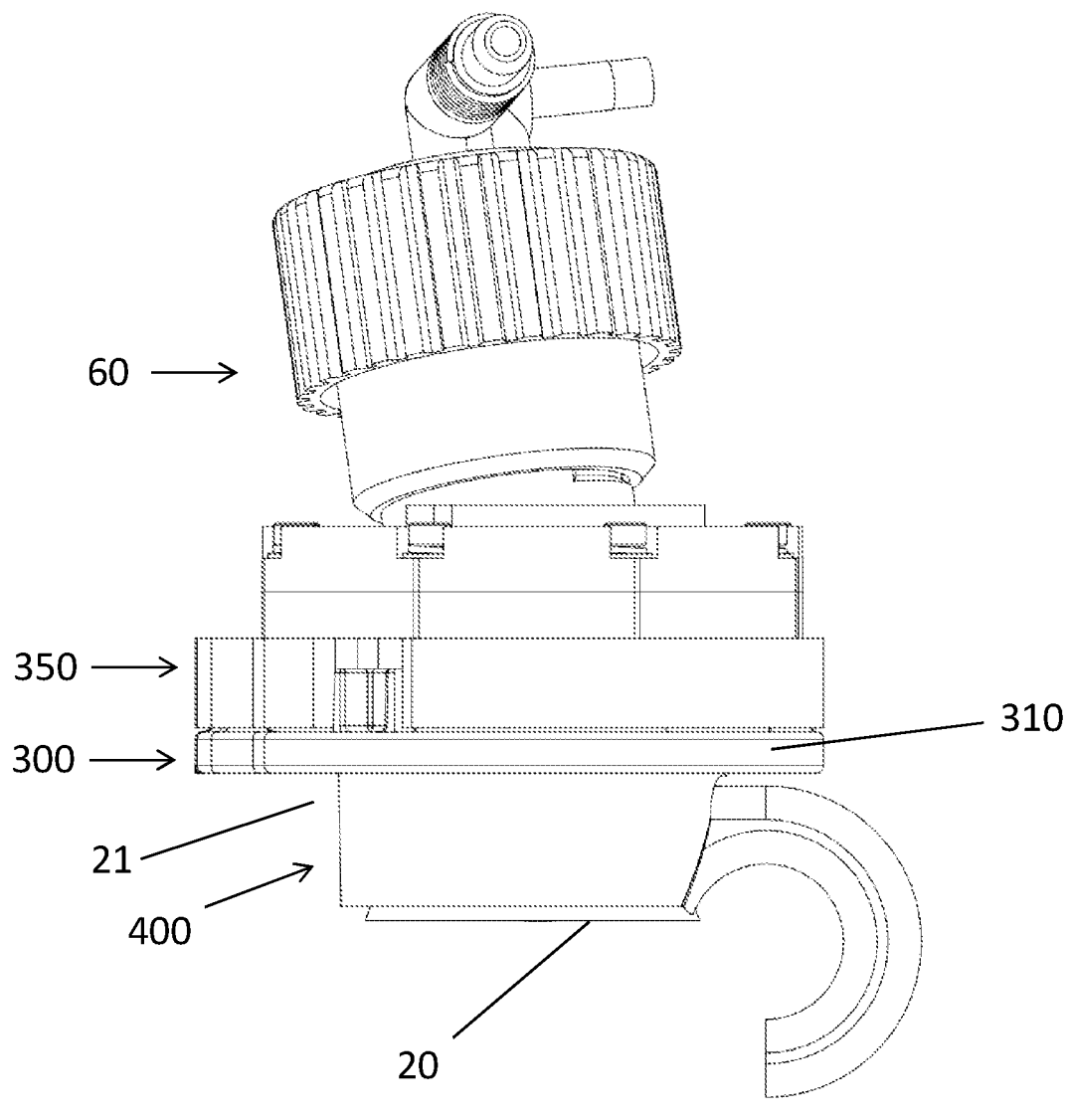
FIG. 4H shows a side view of FIG. 4F, with the corresponding key member mated with the connector, according to an aspect of the present disclosure.
Figure 4I:
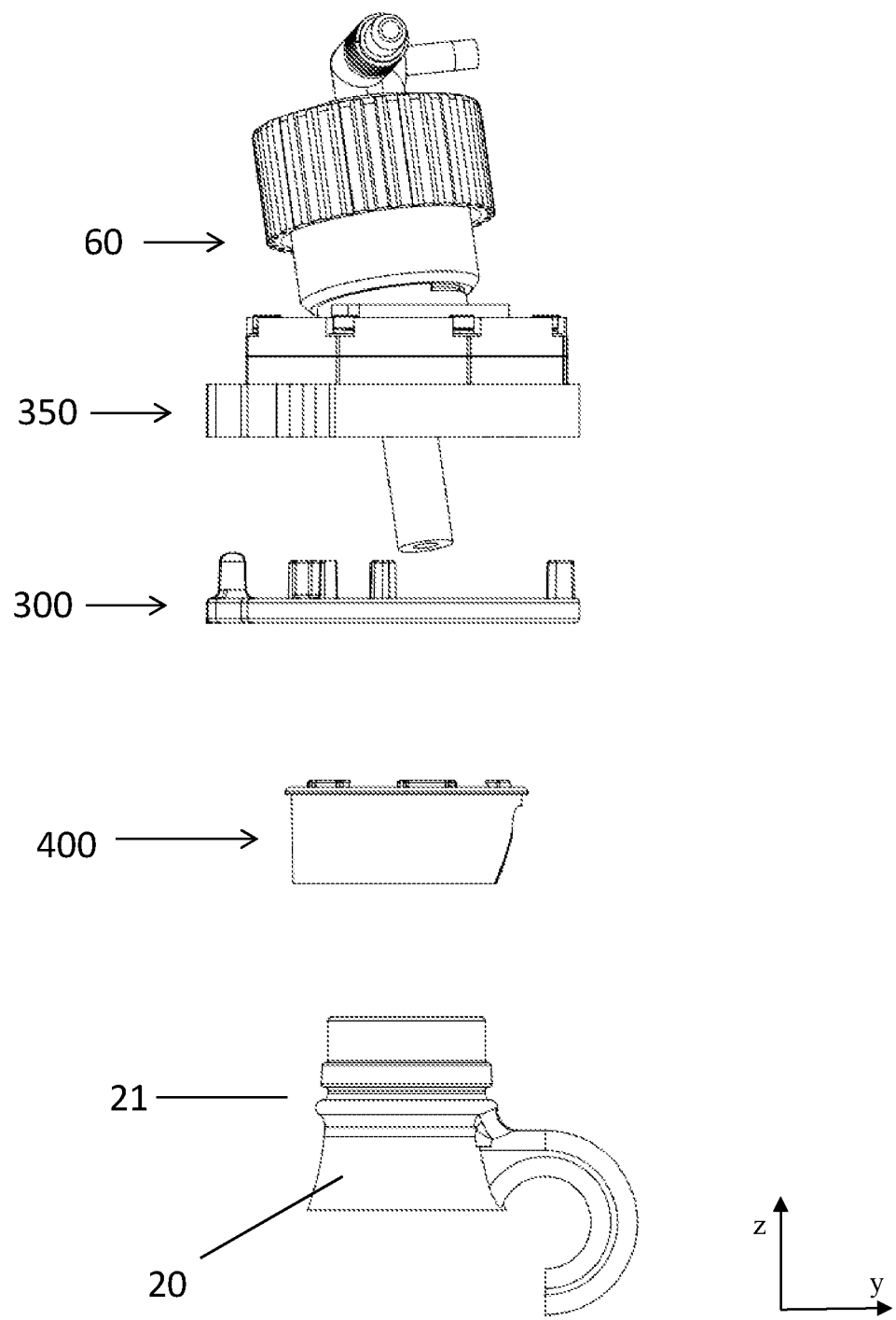
FIG. 4I shows an exploded view of FIG. 4H, according to an aspect of the present disclosure.
Figure 4J:
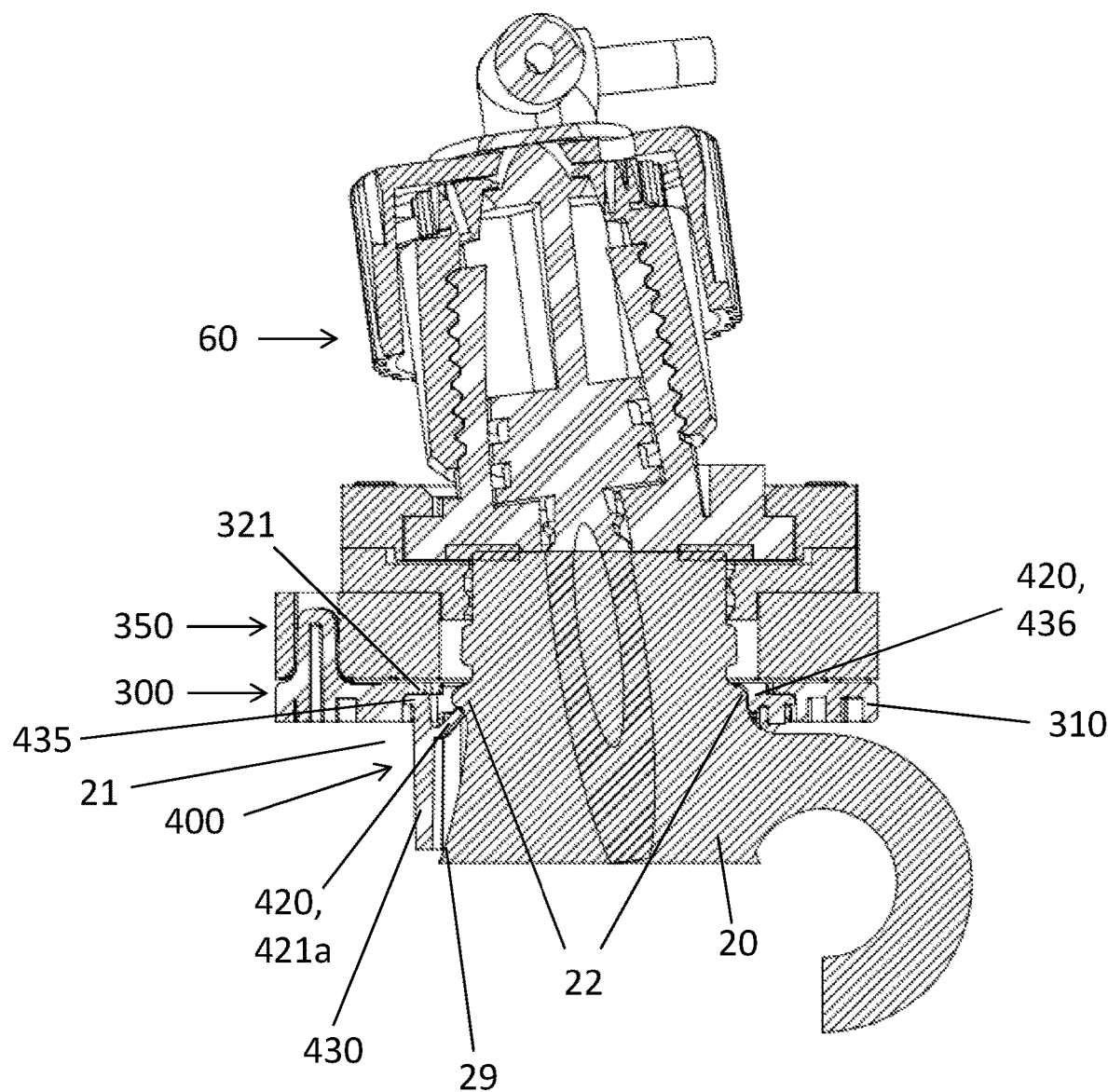
FIG. 4J shows a cross-sectional side view of FIG. 4H, according to an aspect of the present disclosure.

FIG. 4A shows a perspective view of a connector-to-container adaptor 400, according to an aspect of the present disclosure; FIG. 4B shows a top view of the connector-to-container adaptor 400 of FIG. 4A, according to an aspect of the present disclosure; FIG. 4C shows a cross-sectional side view of the connector-to-container adaptor 400 of FIG. 4B taken along A-A, according to an aspect of the present disclosure; FIG. 4D shows a close-up view of a second restraining member 426 of a restraining arrangement 420 of the connector-to-container adaptor 400, according to an aspect of the present disclosure; FIG. 4E shows a cross-sectional side view of the connector-to-container adaptor 400 of FIG. 4B taken along C-C, according to an aspect of the present disclosure; FIG. 4F shows a perspective view of the connector 300 of FIG. 3A attached to the liquid container 20 via the connector-to-container adaptor 400 of FIG. 4A, with the liquid dispensing apparatus 60 and the corresponding key member 350 detached from the connector 300, according to an aspect of the present disclosure; FIG. 4G shows a side view of FIG. 4F, according to an aspect of the present disclosure; FIG. 4H shows a side view of FIG. 4F, with the corresponding key member 350 mated with the connector 300, according to an aspect of the present disclosure; FIG. 4I shows an exploded view of FIG. 4H, according to an aspect of the present disclosure; and FIG. 4J shows a cross-sectional side view of FIG. 4H, according to an aspect of the present disclosure.

In an aspect, there may be provided the connector-to-container adaptor 400 (i.e., an adaptor) configured to couple or connect or attach or secure or fit a connector body according to an aspect of the present disclosure (e.g., the connector body 310 of connector 300) to a liquid container (e.g., the liquid container 10 or 20, which may not include the enlarged lower fastening element 32 and the catch element 32a of the liquid container 30 of FIG. 3E). In other words, in an aspect, a connector body (e.g., the connector body 310 of connector 300) may be coupled or attached to a neck portion of a liquid container (e.g., the neck portion 11 or 12 of the liquid container 10 or 20), via the connector-to-container adaptor 400, with the connector-to-container adaptor 400 disposed or positioned or arranged between the connector body and the neck portion of the liquid container.

Here, for convenience of illustration and discussion, the connector-to-container adaptor 400 is shown as being compatible for use with the connector 300 and the liquid container 20. However, the connector-to-container adaptor 400 is not limited to such use only and may be compatible for use with another connector (e.g., the connector 100) and another liquid container (e.g., the liquid container 10).

With reference to FIG. 4A, in an aspect, the connector-to-container adaptor 400 may include an adaptor body 410 defining a through-hole 414 for fitting over the neck portion 21 of the liquid container 20.

In an aspect, the connector-to-container adaptor 400 may further include a restraining arrangement 420, similar to the restraining arrangement 120, 220, 220B and 320 of the connector 100, 200, 200B and 300, for restraining the adaptor body 410 to the lower fastening element 22 of the liquid container 20 (e.g., to only the lower fastening element 22), at a fixed location on the neck portion 21 of the liquid container 20.

In an aspect, the restraining arrangement 420 may be positioned proximal to the through-hole 414.

In an aspect, the restraining arrangement 420 may extend away from an inner surface or wall 416 of the adaptor body 410.

In an aspect, the restraining arrangement 420 of the connector-to-container adaptor 400 may include a first restraining member 421 and a second restraining member 426. As shown, in an aspect, the first restraining member 421 and the second restraining member 426 may extend from the inner wall 416 of the adaptor body 410 towards a central axis 415 of the adaptor body 410.

In an aspect, the first restraining member 421 of the connector-to-container adaptor 400 may be similar to the first restraining member 121, 221, 221B and 321 of the connector 100, 200, 200B and 300. In an aspect, the first restraining member 421 may contain any or all the features and/or limitations of the first restraining member 121, 221, 221B and 321. Further, in an aspect, the second restraining member 426 of the connector-to-container adaptor 400 may be similar to the second restraining member 126, 226, 226B and 326 of the connector 100, 200, 200B and 300. Further, in an aspect, the second restraining member 426 may contain any or all the features and/or limitations of the second restraining member 126, 226, 226B and 326. Accordingly, the description of the parts/features made with respect to the first restraining member 421 is also applicable with respect to the first restraining member 121, 221, 221B and 321, and vice versa. Further, the description of the parts/features made with respect to the second restraining member 426 is also applicable with respect to the second restraining member 126, 226, 226B and 326, and vice versa.

With reference to FIG. 4C to FIG. 4E, in an aspect, the first restraining member 421 of the restraining arrangement 420 of the connector-to-container adaptor 400 may include a plurality of teeth members 421a (which may be similar to the plurality of teeth members 221a as described in FIG. 2A), extending in an upward direction towards the central axis 415 of the adaptor body 410.

Further, in an aspect, the second restraining member 426 of the restraining arrangement 420 of the connector-to-container adaptor 400 may include a plurality of overhanging catch members 436 (which may be similar to the overhanging catch members 236B as described in FIG. 2H to FIG. 2K), extending in a substantially horizontal direction towards the central axis 415 of the adaptor body 410.

With reference to FIG. 4C and FIG. 4E, a free end (e.g., distal end or tip) of each of the plurality of teeth members 421a of the first restraining member 421 of the restraining arrangement 420 of the connector-to-container adaptor 400 may be positioned at a lower level than (or below) a free end of each of the plurality of overhanging catch members 436 of the second restraining member 426 of the restraining arrangement 420 of the connector-to-container adaptor 400 (i.e., when the connector-to-container adaptor 400 is viewed from the side, in an upright orientation of the connector-to-container adaptor 400, as shown in FIGS. 4C and 4E).

With reference to FIG. 4J, in an aspect, the free end of each of the plurality of teeth members 421a of the first restraining member 421 of the restraining arrangement 420 of the connector-to-container adaptor 400 may be configured to abut or push against a downward-facing side or surface of the lower fastening element 22 of the liquid container 20, and further, a free end portion of each of the plurality of overhanging catch members 436 of the restraining arrangement 420 of the connector-to-container adaptor 400 may be configured to engage or contact or rest on/above/upon an upward-facing side or surface of the lower fastening element 22, in a manner so as to restrain the adaptor body 410 of the connector-to-container adaptor 400 to the lower fastening element 22 the neck portion 21 of the liquid container 20. In other words, in an aspect, the restraining arrangement 420 may sandwich the lower fastening element 22 of the liquid container 20 between the first and the second restraining members 421 and 426 to restrain the adaptor body 410 to the neck portion 21 of the liquid container 20, at a fixed location on the neck portion 21 of the liquid container 20.

In an aspect, the connector-to-container adaptor 400 may further include a downwardly extending support skirt structure 430 from the adaptor body 410. In an aspect, the support skirt structure 430 may be extending in a substantially vertical manner from the adaptor body 410, in a direction substantially parallel with the central axis 415 of the adaptor body 410. As shown, in an aspect, the support skirt structure 430 may be or may include a circumferential wall. In an aspect, the support skirt structure 430 may include one or more reinforcing rib portions 442 (see, for example, FIG. 4E) extending along an inner surface 430*a* or an outer circumferential surface 430*b* of the support skirt structure 430, in a direction substantially parallel with the central axis 415 of the adaptor body 410.

With reference to FIG. 4G and FIG. 4J, when the connector-to-container adaptor 400 is restrained to the lower fastening element 22 of the liquid container 20, via the restraining arrangement 420, a base (or bottom) edge of the downwardly extending support skirt structure 430 may be adapted to contact or engage or rest on an outer surface 29 of the liquid container 20. Accordingly, the support skirt structure 430, contacting or engaging or resting on the outer surface 29 of the liquid container 20, may serve to support (e.g., prop) the connector-to-container adaptor 400 against the outer surface 29 of the liquid container 20.

In an aspect, the adaptor body 410 may include a circumferential rim portion 435 protruding laterally (e.g., substantially horizontally) from an outer surface 417 of the adaptor body 410, in a direction away from the central axis 415 of the adaptor body 410. In an aspect, the circumferential rim portion 435 may serve as an extension piece to the lower fastening element 22 of the liquid container 20. For example, in an aspect, an outer diameter of the circumferential rim portion 435 may be substantially equal to the outer diameter of the lower fastening element 32 of the liquid container 30 (as shown in FIG. 3E, which may be wider than an outer diameter of the lower fastening element 22 of the liquid container 20).

Accordingly, when the adaptor body 410 of the connector-to-container adaptor 400 is restrained to the lower fastening element 22 of the liquid container 20, the connector body 310 of the connector 300 may be restrainably attached to the circumferential rim portion 435 (in a manner similar to the connector body 310 of the connector 300 being restrainably attachable to the lower fastening element 32 of the liquid container 30 as described in FIG. 3D above), without requiring any of the modifications to the liquid container 20 as described in FIG. 3F above.

According to an aspect of the present disclosure, the connector-to-container adaptor 400 may be included in a connector (e.g., the connector 100 or 300).

According to an aspect of the present disclosure, the connector-to-container adaptor 400 may be included in a connection assembly (e.g., the connection assembly 180 or 380).

Various aspects generally provide a connector, having a mechanical code, which may be efficient and low-cost to manufacture, and which may be capable of being restrainably attachable or mountable to a liquid container (e.g., to a neck portion of a glass bottle) in a simple step. The connector may be secured to the liquid container, but may be removed if desired, and may be cleaned and re-used after each use. Furthermore, according to various aspect, the connector may enable continued use of an existing capping solution of the liquid container, while the connector is restrained to a neck portion of the liquid container.

Various aspects may also provide a key member, having a corresponding mechanical code, which enables the key member to mate with the connector. The key member may be attached to a surface (e.g., a base) of a liquid dispensing assembly.

Accordingly, according to various aspects, the connector may function as a lock to an internal volume of the liquid container, while the key member may serve as a key for unlocking the lock, to enable a proper seal (for a fluidic connection) to be created between the liquid dispensing assembly to the internal volume of the liquid container.

Various aspect may also provide an adaptor (e.g., the connector-to-container adaptor) which may enable the connector according to various aspects to be attachable to liquid containers (e.g., existing liquid containers) having various sizes of lower fastening elements, without requiring any modification to such liquid containers.

Various aspects may provide a connection assembly, which may include the connector and the key member, as described above. The connection assembly may permit connection of a liquid dispensing assembly to only an intended liquid container containing a specific solution (e.g., liquid chemical).

While the disclosure has been particularly shown and described with reference to specific aspects, it should be understood by those skilled in the art that various changes, modification, variation in form and detail may be made therein without departing from the scope of the present disclosure as defined by the appended claims. The scope of the present disclosure is thus indicated by the appended claims and all changes which come within the meaning and range of equivalency of the claims are therefore intended to be embraced.

The invention claimed is:

1. A connector comprising:
a connector body comprising a first axial surface, a second axial surface, and a through-hole with an inner surface extending between the first and the second axial surfaces, wherein the through-hole is adapted to fit on a neck portion of a liquid container;
a restraining arrangement positioned proximal to the through-hole, the restraining arrangement comprising a first restraining member and a second restraining member extending toward a central axis of the connector body, wherein the first restraining member comprises a distal end that extends further than a distal end of the second restraining member,
wherein the distal end of the first restraining member is configured to engage the neck portion of the liquid container at a first position, and the distal end of the second restraining member is configured to engage the neck portion of the liquid container at a second position;
wherein the first restraining member is flexible, and the second restraining member is rigid;
and
a connector-to-key-interface arrangement on the second axial surface,
wherein the connector-to-key-interface arrangement is configured to mate with a surface of a key member.

2. The connector of claim 1,
wherein the first restraining member further comprises a plurality of first restraining members, and the second restraining member further comprises a plurality of second restraining members,
wherein the first and second restraining members are arranged in a side-by-side manner along the inner surface.

3. The connector of claim 2,
wherein the plurality of first restraining members and the plurality of second restraining members are arranged in an alternating manner along the inner surface.

4. The connector of claim 1,
wherein the first restraining member extends in an upward manner towards the central axis to engage the neck portion of the liquid container at the first position, and the second restraining member extends in a substantially horizontal manner towards the central axis to engage the neck portion of the liquid container at the second position.

5. The connector of claim 1,
wherein the first restraining member extends in a substantially horizontal manner towards the central axis, and the second restraining member extends in a substantially horizontal manner towards the central axis.

6. The connector of claim 1,
wherein the first restraining member is positioned on a first lateral plane relative to the central axis, and the second restraining member is positioned on a second lateral plane relative to the central axis,
wherein the first lateral plane is closer to the second axial surface of the connector body than the second lateral plane.

7. The connector of claim 1,
wherein the connector-to-key-interface arrangement comprises at least one protrusion element extending away from the second axial surface of the connector body.

8. The connector of claim 7,
wherein each of the at least one protrusion element comprises a reinforcing rib portion protruding laterally from a side surface of the protrusion element.

9. The connector of claim 7,
wherein the connector body comprises an annular shape comprising an outer circumferential surface.

10. The connector of claim 9,
wherein the connector body comprises a side protrusion from a portion of the outer circumferential surface.

11. The connector of claim 10, further comprising:
a guide post at the side protrusion of the connector body,
wherein the guide post is adapted to be insertable into a corresponding opening on the surface of the key member that aligns the key member with respect to the connector.

12. The connector of claim 11,
wherein the guide post is longer than the at least one protrusion element.

13. The connector of claim 11,
wherein the guide post comprises an oblong shape.

14. The connector of claim 1,
wherein the connector body, the restraining arrangement, and the connector-to-key-interface arrangement are made of a plastic material.

15. The connector of claim 1, further comprising:
an adaptor configured to couple the connector body to the neck portion of the liquid container in a manner such that the adaptor is disposed between the connector body and the neck portion of the liquid container.

16. The connector of claim 1, further comprising:
the key member comprising the surface configured to mate with the connector-to-key-interface arrangement of the connector such that the second axial surface of the connector body is in contact with the surface of the key member.

17. A connection assembly comprising:
a connector for a liquid container, the connector comprising a connector body with a first axial surface and a second axial surface, a connector-to-key-interface arrangement on the second axial surface, and a through-hole adapted to fit on a neck portion of the liquid container;
a restraining arrangement positioned proximal to the through-hole, the restraining arrangement comprising a first restraining member and a second restraining member extending toward a central axis of the connector body, wherein the first restraining member comprises a distal end that extends further than a distal end of the second restraining member, and the distal end of the first restraining member is configured to engage the neck portion of the liquid container at a first position and the distal end of the second restraining member is configured to engage the neck portion of the liquid container at a second position; and
a key member detachably connectable to the connector, the key member comprising a key-member body with a first axial surface and a second axial surface, and a key-to-connector-interface arrangement on the first axial surface of the key-member body;
wherein the connector-to-key-interface arrangement of the connector comprises at least one protrusion element extending from the second axial surface of the connector body; and
wherein the key-to-connector-interface arrangement of the key member comprises at least one corresponding protrusion-receiving hole for receiving a corresponding protrusion element therein,
wherein the connector-to-key-interface arrangement of the connector and the key-to-connector-interface arrangement of the key member are configured to mate with each other;
wherein the connector-to-key-interface arrangement of the connector comprises at least one guide post extending perpendicularly from the second axial surface of the connector body, wherein the at least one guide post is taller than the at least one protrusion element; and
wherein the key-to-connector-interface arrangement of the key member comprises at least one corresponding alignment opening for receiving a corresponding guide post therein.

* * * * *